US011952441B2

(12) United States Patent
Kato et al.

(10) Patent No.: US 11,952,441 B2
(45) Date of Patent: Apr. 9, 2024

(54) POLYTETRAFLUOROETHYLENE PRODUCTION METHOD

(71) Applicant: DAIKIN INDUSTRIES, LTD., Osaka (JP)

(72) Inventors: Taketo Kato, Osaka (JP); Yohei Fujimoto, Osaka (JP); Kenji Ichikawa, Osaka (JP); Hiroyuki Sato, Osaka (JP); Yoshinori Nanba, Osaka (JP); Hirotoshi Yoshida, Osaka (JP); Kengo Ito, Osaka (JP); Chiaki Okui, Osaka (JP); Masamichi Sukegawa, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 531 days.

(21) Appl. No.: 17/280,940

(22) PCT Filed: Oct. 3, 2019

(86) PCT No.: PCT/JP2019/039188
§ 371 (c)(1),
(2) Date: Mar. 29, 2021

(87) PCT Pub. No.: WO2020/071504
PCT Pub. Date: Apr. 9, 2020

(65) Prior Publication Data
US 2021/0355254 A1    Nov. 18, 2021

(30) Foreign Application Priority Data

Oct. 3, 2018    (JP) ................................. 2018-188700

(51) Int. Cl.
*C08F 114/26*    (2006.01)
*C08L 27/18*    (2006.01)

(52) U.S. Cl.
CPC ............. *C08F 114/26* (2013.01); *C08L 27/18* (2013.01)

(58) Field of Classification Search
CPC .......... C08F 114/26; C08F 2/26; C08F 14/26; C08F 2/38; C08F 2/30; C08L 27/18
See application file for complete search history.

(56) References Cited

U.S. PATENT DOCUMENTS

| 4,342,675 A | * | 8/1982 | Gangal | ................... B01D 1/26 524/762 |
| 8,563,670 B2 | | 10/2013 | Brothers et al. | |
| 9,074,025 B2 | | 7/2015 | Brothers et al. | |
| 9,255,164 B2 | | 2/2016 | Brothers et al. | |
| 2008/0114121 A1 | | 5/2008 | Brothers et al. | |
| 2012/0116017 A1 | * | 5/2012 | Brothers | ................. C08F 14/18 524/805 |
| 2013/0203950 A1 | | 8/2013 | Imahori et al. | |
| 2014/0200310 A1 | | 7/2014 | Taira et al. | |
| 2016/0108225 A1 | | 4/2016 | Toyoda et al. | |

FOREIGN PATENT DOCUMENTS

| CN | 101605826 A | 12/2009 |
| CN | 103124746 A | 5/2013 |
| CN | 106046219 A | 10/2016 |
| EP | 2 927 247 A1 | 10/2015 |
| JP | 2010-509444 A | 3/2010 |
| JP | 2012-092285 A | 5/2012 |
| WO | 2008/060463 A1 | 5/2008 |
| WO | 2015/008649 A1 | 1/2015 |
| WO | 2017/216035 A1 | 12/2017 |

OTHER PUBLICATIONS

Extended European Search Report dated May 31, 2022 in European Application No. 19869374.9.
International Preliminary Report on Patentability with the translation of Written Opinion dated Mar. 23, 2021 from the International Bureau in International Application No. PCT/JP2019/039188.
International Search Report for PCT/JP2019/039188 dated Dec. 10, 2019 (PCT/ISA/210).

* cited by examiner

*Primary Examiner* — K. Boyle
(74) *Attorney, Agent, or Firm* — Sughrue Mion, PLLC

(57) ABSTRACT

A method for producing polytetrafluoroethylene, which includes polymerizing tetrafluoroethylene in an aqueous medium in the presence of a nucleating agent and a hydrocarbon anionic surfactant to obtain polytetrafluoroethylene. A total amount of the nucleating agent and the hydrocarbon anionic surfactant at the initiation of polymerization is more than 50 ppm based on the aqueous medium.

12 Claims, 1 Drawing Sheet

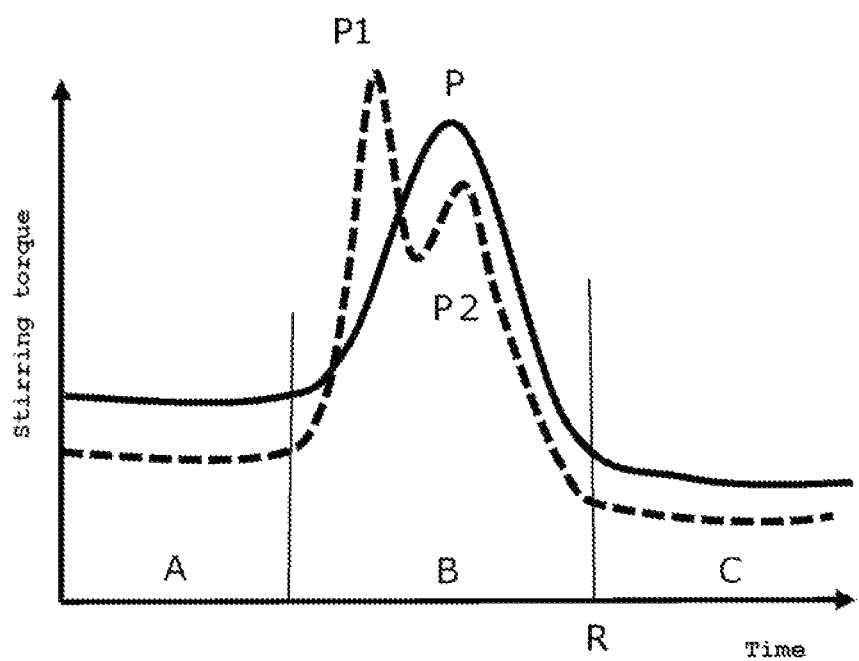

POLYTETRAFLUOROETHYLENE PRODUCTION METHOD

CROSS REFERENCE TO RELATED APPLICATIONS

This application is a National Stage of International Application No. PCT/JP2019/039188 filed Oct. 3, 2019, claiming priority based on Japanese Patent Application No. 2018-188700 filed Oct. 3, 2018.

TECHNICAL FIELD

The present disclosure relates to a method for producing polytetrafluoroethylene.

BACKGROUND ART

Fluorinated anion surfactants have been used in production of polytetrafluoroethylene by emulsion polymerization. Recently, it has been proposed to use hydrocarbon surfactants instead of the fluorinated anion surfactants.

Patent Document 1 discloses a method for polymerizing fluoromonomer to form a dispersion of fluoropolymer particles in an aqueous medium in a polymerization reactor comprising an initial period and a stabilization period subsequent to the initial period, wherein the initial period comprises: preparing an initial dispersion of fluoropolymer particles in the aqueous medium in the polymerization reactor, and the stabilization period comprises: polymerizing fluoromonomer in the polymerization reactor, and adding hydrocarbon-containing surfactant to the polymerization reactor, wherein during the stabilization period no fluorosurfactant is added.

Patent Document 2 discloses a method for polymerizing fluoromonomer to form a dispersion of fluoropolymer particles in an aqueous medium in a polymerization reactor the method comprising an initial period which comprises adding to the polymerization reactor: (a) aqueous medium, (b) water-soluble hydrocarbon-containing compound, (c) degradation agent, (d) fluoromonomer, and (e) polymerization initiator, wherein during the initial period no fluorosurfactant is added, and wherein the degradation agent is added prior to the polymerization initiator.

Patent Document 3 discloses a method for polymerizing fluoromonomer to form a dispersion of fluoropolymer particles in an aqueous medium in a polymerization reactor, which comprises adding to the polymerization reactor: aqueous medium, polymerization initiator, fluoromonomer, and hydrocarbon-containing surfactant, and passivating the hydrocarbon-containing surfactant.

RELATED ART

Patent Documents

Patent Document 1: U.S. Pat. No. 9,255,164
Patent Document 2: U.S. Pat. No. 8,563,670
Patent Document 3: U.S. Pat. No. 9,074,025

SUMMARY OF THE INVENTION

Problem to be Solved by the Invention

An object of the present disclosure is to provide a method capable of producing polytetrafluoroethylene by polymerization using a hydrocarbon anionic surfactant and capable of producing polytetrafluoroethylene having a small average primary particle size in spite of polymerization using a hydrocarbon anionic surfactant.

Means for Solving the Problem

The present disclosure relates to a method for producing polytetrafluoroethylene comprising polymerizing tetrafluoroethylene in an aqueous medium in the presence of a nucleating agent and a hydrocarbon anionic surfactant to obtain polytetrafluoroethylene, wherein a total amount of the nucleating agent and the hydrocarbon anionic surfactant at the initiation of polymerization is more than 50 ppm based on the aqueous medium.

The nucleating agent is preferably at least one selected from the group consisting of a fluoropolyether, a nonionic surfactant, and a chain transfer agent.

The production method of the present disclosure preferably further comprises adding the nucleating agent to the aqueous medium before the initiation of polymerization or when the concentration of polytetrafluoroethylene formed in the aqueous medium is 5.0% by mass or less.

The amount of the nucleating agent added before the initiation of polymerization or when the concentration of polytetrafluoroethylene formed in the aqueous medium is 5.0% by mass or less is preferably 0.001% by mass or more based on the obtained polytetrafluoroethylene.

In the polymerization, the number of polytetrafluoroethylene particles is preferably $0.6 \times 10^{13}$ particles/mL or more.

The polymerization preferably includes continuously adding the hydrocarbon anionic surfactant. In the continuous addition of the hydrocarbon anionic surfactant, the hydrocarbon anionic surfactant is preferably started to be added to the aqueous medium when the concentration of polytetrafluoroethylene formed in the aqueous medium is less than 0.6% by mass.

In the polymerization, the polymerization temperature is preferably 10 to 150° C.

The fluoropolyether preferably has a repeating unit represented by formulas (1a) to (1d):

$(-CFCF_3-CF_2-O-)_n$      (1a)

$(-CF_2-CF_2-CF_2-O-)_n$      (1b)

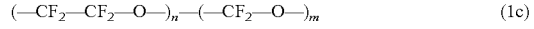

$(-CF_2-CF_2-O-)_n-(-CF_2-O-)_m$      (1c)

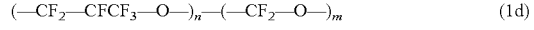

$(-CF_2-CFCF_3-O-)_n-(-CF_2-O-)_m$      (1d)

wherein m and n are integers of 1 or more.

The nonionic surfactant is preferably at least one selected from the group consisting of a compound represented by the following general formula (i):

$R^3-O-A^1-H$      (i)

wherein $R^3$ is a linear or branched primary or secondary alkyl group having 8 to 18 carbon atoms, and $A^1$ is a polyoxyalkylene chain, and a compound represented by the following general formula (ii):

$R^4-C_6H_4-O-A^2-H$      (ii)

wherein $R^4$ is a linear or branched primary or secondary alkyl group having 4 to 12 carbon atoms, and $A^2$ is a polyoxyalkylene chain.

The chain transfer agent is preferably at least one selected from the group consisting of methane, ethane, propane, isobutane, methanol, ethanol, and isopropanol.

The polytetrafluoroethylene preferably has an average primary particle size of 500 nm or less.

The mass ratio of the hydrocarbon anionic surfactant to the nucleating agent, hydrocarbon anionic surfactant:nucleating agent, at the initiation of polymerization is 10:1 to $100 \times 10^4$:1.

Effects of Invention

According to the present disclosure, it is possible to provide a method capable of producing polytetrafluoroethylene by polymerization using a hydrocarbon anionic surfactant and capable of producing polytetrafluoroethylene having a small average primary particle size in spite of polymerization using a hydrocarbon anionic surfactant.

BRIEF DESCRIPTION OF DRAWING

The FIGURE is a diagram schematically showing a change over time in the stirring torque of PTFE aqueous dispersion before and after coagulation.

DESCRIPTION OF EMBODIMENTS

The term "organic group" as used herein, unless otherwise specified, means a group containing one or more carbon atoms or a group obtainable by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
RaSO$_2$—,
RaCOO—,
RaNRaCO—,
RaCONRa—,
RaOCO—, and
RaOSO$_2$—,
wherein each Ra is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents.

The organic group is preferably an alkyl group optionally having one or more substituents.

The term "substituent" as used herein, unless otherwise specified, means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, or a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

Hereinafter, specific embodiments of the present disclosure will be described in detail, but the present disclosure is not limited to the following embodiments.

A method for producing polytetrafluoroethylene [PTFE] of the present disclosure includes a polymerization step of polymerizing tetrafluoroethylene [TFE] in an aqueous medium in the presence of a nucleating agent and a hydrocarbon anionic surfactant to obtain PTFE. Therefore, according to the production method of the present disclosure, polytetrafluoroethylene can be produced by polymerization using a hydrocarbon anionic surfactant. Further, polytetrafluoroethylene having a small average primary particle size can be produced. That is, polymerization of TFE in an aqueous medium usually results in an aqueous dispersion containing particles of polytetrafluoroethylene, but according to the production method of the present disclosure, particles having a small average primary particle size can be obtained in spite of polymerization of TFE using a hydrocarbon anionic surfactant, and an aqueous dispersion having excellent dispersion stability can be obtained. Further, the polytetrafluoroethylene powder can be recovered by coagulating the aqueous dispersion, and the polytetrafluoroethylene (uncoagulated polymer) is unlikely to remain in the discharge water remaining after the powder is recovered.

In the PTFE production method of the present disclosure, the total amount of the nucleating agent and the hydrocarbon anionic surfactant at the initiation of polymerization is more than 50 ppm based on the aqueous medium. The total amount of the nucleating agent and the hydrocarbon anionic surfactant is preferably 60 ppm or more, more preferably 70 ppm or more, still more preferably 80 ppm or more, and particularly preferably 100 ppm or more based on the aqueous medium. The upper limit of the total amount is not limited, but is, for example, 10,000 ppm. When the total amount of the nucleating agent and the hydrocarbon anionic surfactant at the initiation of polymerization is in the above range, it is possible to obtain an aqueous dispersion having a smaller average primary particle size and superior stability. Also, an aqueous dispersion having a smaller amount of uncoagulated polymer can be obtained.

The mass ratio of the hydrocarbon anionic surfactant to the nucleating agent, hydrocarbon anionic surfactant:nucleating agent, at the initiation of polymerization is preferably 10:1 to 100×10$^4$:1, more preferably 100:1 to 15×10$^4$:1, and still more preferably 500:1 to 1×10$^4$:1.

It can be said that the polymerization started when the gas fluoromonomer in the reactor became polytetrafluoroethylene and the pressure drop in the reactor occurred. U.S. Pat. No. 3,391,099 (Punderson) discloses a dispersion polymerization of tetrafluoroethylene in an aqueous medium comprising two separate steps of a polymerization process comprising: first the formation of a polymer nucleus as a nucleation site, and then the growth step comprising polymerization of the established particles. The polymerization is usually initiated when both the monomer to be polymerized and the polymerization initiator are charged in the reactor. Further, in the present disclosure, an additive related to the formation of a nucleation site is referred to as a nucleating agent.

The polymerization step is a step of polymerizing tetrafluoroethylene in an aqueous medium in the presence of a hydrocarbon anionic surfactant, and the step also preferably includes a step of continuously adding the hydrocarbon anionic surfactant.

Adding the hydrocarbon anionic surfactant continuously means, for example, adding the hydrocarbon anionic surfactant not all at once, but adding over time and without interruption or adding in portions.

In the step of continuously adding the hydrocarbon anionic surfactant, the hydrocarbon anionic surfactant is preferably started to be added to the aqueous medium when the concentration of PTFE formed in the aqueous medium is less than 0.60% by mass. Further, the hydrocarbon anionic surfactant is more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, particularly preferably started to be added when the concentration is 0.10% by mass or less, and most preferably started to be added when the polymerization is initiated. The concentration is a concentration based on the total of the aqueous medium and PTFE.

By including the above steps, it is possible to obtain an aqueous dispersion having a smaller average primary particle size and superior stability. Also, an aqueous dispersion having a smaller amount of uncoagulated polymer can be obtained. Furthermore, the aspect ratio of the primary particles can be made smaller.

In the step of continuously adding the hydrocarbon anionic surfactant, the amount of the hydrocarbon anionic surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, and still more preferably 1% by mass.

In the step of polymerizing tetrafluoroethylene in an aqueous medium in the presence of the hydrocarbon anionic surfactant, the amount of the hydrocarbon anionic surfactant is preferably large, and is preferably 0.01 to 10% by mass of the aqueous medium based on 100% by mass of the aqueous medium. The lower limit thereof is more preferably 0.1% by mass, while the upper limit thereof is more preferably 1% by mass.

The nucleating agent is preferably, for example, at least one selected from the group consisting of a fluoropolyether, a nonionic surfactant, and a chain transfer agent.

The fluoropolyether itself provides a polymerization field and can be a nucleation site.

The fluoropolyether is preferably perfluoropolyether.

The fluoropolyether preferably has a repeating unit represented by formulas (1a) to (1d):

(1a)

(1b)

(1c)

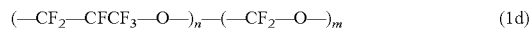

(1d)

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one end or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether acid or its salt is preferably a compound represented by the following formula:

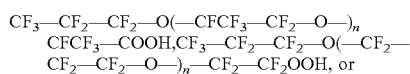

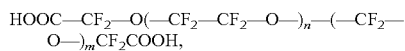

wherein m and n are the same as above,
or a salt thereof.

The fluoropolyether preferably has a number-average molecular weight of 800 g/mol or more. The fluoropolyether acid or the salt thereof preferably has a number-average molecular weight of less than 6,000 g/mol, because the fluoropolyether acid or the salt thereof may be difficult to disperse in an aqueous medium. The fluoropolyether acid or the salt thereof more preferably has a number-average molecular weight of 900 g/mol or more, and still more preferably 1,000 g/mol or more. Further, the number-average molecular weight is preferably 3500 g/mol or less, and more preferably 2500 g/mol or less.

The amount of the fluoropolyether is preferably 5 to 3,000 ppm and more preferably 5 to 2,000 ppm, the lower limit thereof is still more preferably 10 ppm, and the upper limit thereof is still more preferably 100 ppm based on the aqueous medium.

The nonionic surfactants are usually free from charged groups and have hydrophobic moieties that are long chain hydrocarbons. The hydrophilic moiety of the nonionic surfactant contains water-soluble functional groups such as chains of ethylene ether derived from polymerization with ethylene oxide.

Examples of nonionic hydrocarbon surfactants include the followings:

Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of the above derivatives: polyoxyethylene alkylamine, polyoxyethylene alkylphenyl-formaldehyde condensate, polyoxyethylene alkyl ether phosphate, and the like.

The ethers and esters may have an HLB value of 10 to 18.

Examples of nonionic hydrocarbon surfactants include Triton (R) X series (X15, X45, X100, etc.), Tergitol (R) 15-S series, and Tergitol (R) manufactured by Dow Chemical Company, TMN series (TMN-6, TMN-10, TMN-100, etc.), Tergitol (R) L series, Pluronic (R) R series (31R1, 17R2, 10R5, 25R4 (m to 22, n to 23), and Iconol (R) TDA series (TDA-6, TDA-9, TDA-10) manufactured by BASF.

The nonionic surfactant itself provides a polymerization field and can be a nucleation site by giving a large number of low-molecular-weight fluoropolymers by chain transfer of radicals in the initial stage.

The nonionic surfactant is preferably a fluorine-free nonionic surfactant. Examples thereof include ether-type nonionic surfactants such as polyoxyethylene alkylphenyl ethers, polyoxyethylene alkyl ethers, and polyoxyethylene alkylene alkyl ethers; polyoxyethylene derivatives such as ethylene oxide/propylene oxide block copolymers; ester-type nonionic surfactant such as sorbitan fatty acid esters, polyoxyethylene sorbitan fatty acid esters, polyoxyethylene sorbitol fatty acid esters, glycerin fatty acid esters, and polyoxyethylene fatty acid esters; amine-based nonionic surfactants such as polyoxyethylene alkylamines and alkylalkanolamides.

In the nonionic surfactant, the hydrophobic group may be any of an alkylphenol group, a linear alkyl group, and a branched alkyl group.

Examples of the nonionic surfactant include a compound represented by the following general formula (i):

$$R^3\!-\!O\text{-}A^1\text{-}H \qquad (i)$$

wherein $R^3$ is a linear or branched primary or secondary alkyl group having 8 to 18 carbon atoms, and $A^1$ is a polyoxyalkylene chain. $R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R')(R")HC—, where R' and R" are the same or different linear, branched, or cyclic alkyl groups, and the total amount of carbon atoms is at least 5, preferably 7 to 17. Preferably, at least one of R' or R" is a branched or cyclic hydrocarbon group.

Specific examples of the nonionic surfactant include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H.

Examples of the nonionic surfactant include polyethylene glycol-polypropylene glycol-polyethylene glycol block copolymers.

Examples of commercially available products of the nonionic surfactant include Genapol X080 (product name, available from Clariant), NOIGEN TDS series (available from DKS Co., Ltd.) exemplified by NOIGEN TDS-80 (trade name), LEOCOL TD series (available from Lion Corp.) exemplified by LEOCOL TD-90 (trade name), LIONOL (R) TD series (available from Lion Corp.), T-Det A series (available from Harcros Chemicals Inc.) exemplified by T-Det A 138 (trade name), and TERGITOL (R) 15 S series (available from Dow).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, available from Dow Chemical Co., Ltd.).

The hydrophobic group of the nonionic surfactant may be any of an alkylphenol group, a linear alkyl group, and a branched alkyl group.

Examples of the nonionic surfactant also include a polyoxyethylene alkylphenyl ether-based nonionic compound represented by the following general formula (ii):

$$R^4—C_6H_4—O\text{-}A^2\text{-}H \quad \text{(ii)}$$

wherein $R^4$ is a linear or branched primary or secondary alkyl group having 4 to 12 carbon atoms, and $A^2$ is a polyoxyalkylene chain.

Examples of the polyoxyethylene alkylphenyl ether-based nonionic compound include Triton X-100 (trade name, available from Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compound include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by the formula:

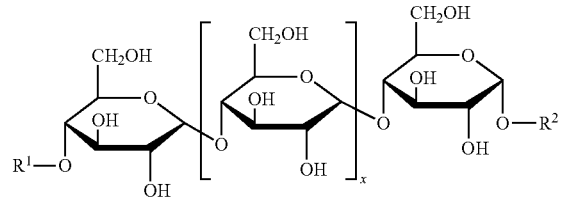

wherein x represents 0, 1, 2, 3, 4, or 5 and $R^1$ and $R^2$ each independently represent H or a long chain unit containing at least 6 carbon atoms, with the proviso that at least one of $R^1$ or $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polyglycylside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic (R) R series, tridecyl alcohol alkoxylates supplied from BASF Corporation as Iconol (R) TDA series, and hydrocarbon-containing siloxane surfactants, preferably hydrocarbon surfactants. In the sense that the hydrocarbyl groups are fully substituted with hydrogen atoms where they can be substituted by halogen such as fluorine, these siloxane surfactants can also be regarded as hydrocarbon surfactants, i.e. the monovalent substituents on the hydrocarbyl groups are hydrogen.

The nonionic surfactant is preferably at least one selected from the group consisting of the compound represented by the general formula (i) and the compound represented by the general formula (ii).

The amount of the nonionic surfactant is preferably 0.1 to 0.0000001% by mass, more preferably 0.01 to 0.000001% by mass, based on the aqueous medium.

The chain transfer agent can be a nucleation site by giving a large number of low-molecular-weight fluoropolymers by chain transfer of radicals in the initial stage.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

$$R^a I_x Br_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, at least one selected from the group consisting of alkanes and alcohols is preferable from the viewpoints of polymerization reactivity, crosslinkablility, availability, and the like. The alkane preferably has 1 to 6, more preferably 1 to 5 carbon atoms. The alcohol preferably has 1 to 5 carbon atoms, and more preferably 1 to 4 carbon atoms. The chain transfer agent is particularly preferably at least one selected from the group consisting of methane, ethane, propane, isobutane, methanol, ethanol, and isopropanol.

The amount of the chain transfer agent is preferably 0.001 to 10000 ppm with respect to the aqueous medium. The amount of the chain transfer agent is more preferably 0.01 ppm or more, still more preferably 0.05 ppm or more, and particularly preferably 0.1 ppm or more based on the aqueous medium. The amount of the chain transfer agent is more preferably 1,000 ppm or less, still more preferably 500 ppm or less, and particularly preferably 100 ppm or less based on the aqueous medium.

The polymerization temperature and the polymerization pressure in the polymerization step are determined as appropriate in accordance with the types of the monomers used, the molecular weight of the target PTFE, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or more, and still more preferably 0.5 MPaG or more. The polymerization pressure is more preferably 5.0 MPaG or less, and still more preferably 3.0 MPaG or less.

The polymerization step preferably further includes a step of adding the nucleating agent to the aqueous medium before the initiation of polymerization or when the concentration of polytetrafluoroethylene formed in the aqueous medium is 5.0% by mass or less. By adding a nucleating agent at the initial stage of polymerization, an aqueous dispersion having a small average primary particle size and excellent stability can be obtained. That is, the nucleating agent may be added before the initiation of the polymerization, may be added at the same time as the initiation of the polymerization, or the nucleating agent may be added during the period in which the nuclei of the PTFE particles are formed after polymerization is initiated, for example, it is preferable to be added when the concentration of the PTFE is 5.0% by mass or less.

The amount of the nucleating agent added before the initiation of polymerization or when the concentration of PTFE formed in the aqueous medium is 5.0% by mass or less is 0.001% by mass or more, preferably 0.01% by mass or more, still more preferably 0.05% by mass or more, and further preferably 0.1% by mass or more based on the resulting polytetrafluoroethylene. The upper limit is not limited, but is, for example, 2000% by mass.

In the polymerization step, the number of PTFE particles is preferably $0.6 \times 10^{13}$ particles/mL or more. By increasing the number of PTFE particles (nuclei) in the initial stage of polymerization, it is possible to obtain an aqueous dispersion having a small average primary particle size, and excellent stability. The number of the PTFE particles is more preferably 0.7×10¹³/mL or more, still more preferably 0.8× 10¹³/mL or more, further preferably 0.9×10¹³/mL or more, and particularly preferably 1.0×10¹³ particles/mL or more. The upper limit is not limited, but is, for example, 7.0×10¹⁴ particles/mL.

In the polymerization step, it is preferable to generate 0.6×10¹³ particles/ml or more of PTFE particles. By generating a large number of particles in the polymerization step, primary particles having a small average primary particle size and a small aspect ratio can be obtained, and an aqueous dispersion having excellent stability can be obtained. The number of PTFE particles to be generated is more preferably 0.7×10¹³/mL or more, still more preferably 0.8×10¹³ particles/mL or more, further preferably 0.9×10¹³ particles/mL or more, and still more preferably 1.0×10¹³ particles/mL or more. The upper limit is not limited, but is, for example, 7.0×10¹⁴ particles/mL.

Since the PTFE particles are concentrated in the first half of the polymerization and are unlikely to be generated in the second half of the polymerization, the number of PTFE particles in the polymerization step is almost the same as the number of particles generated in the first half of the polymerization. Therefore, the number of PTFE particles in the polymerization step can be predicted by measuring the number of primary particles in the finally obtained PTFE aqueous dispersion.

The PTFE may be a TFE homopolymer, or may be a modified PTFE containing 99% by mass or more of a polymerization unit based on TFE and 1% by mass or less of a polymerization unit based on a modifying monomer.

In the modified PTFE, the content of the polymerization unit based on the modifying monomer (hereinafter, also referred to as "modifying monomer unit") is preferably in the range of 0.00001 to 1% by mass based on the total polymerization units of PTFE. The lower limit of the content of the modifying monomer unit is more preferably 0.0001% by mass, still more preferably 0.001% by mass, further preferably 0.005% by mass, and particularly preferably 0.009% by mass. The upper limit of the content of the modifying monomer unit is more preferably 0.5% by mass, still more preferably 0.3% by mass, particularly preferably 0.1% by mass, and particularly preferably 0.05% by mass. The term "modifying monomer unit" as used herein means a portion of the molecular structure of the PTFE as a part derived from the modifying monomer.

The contents of the respective monomers constituting the PTFE can be calculated herein by any appropriate combination of NMR, FT-IR, elemental analysis, and X-ray fluorescence analysis in accordance with the types of the monomers. Further, the content of respective monomers constituting PTFE can also be obtained by calculation from the amount of the modifying monomer added used for the polymerization.

The modifying monomer is not particularly limited as long as it can be copolymerized with TFE, and examples thereof include fluoromonomers and non-fluoromonomers. Further, a plurality of kinds of the modifying monomers may be used.

Examples of the non-fluoromonomer include, but not particularly to, a monomer represented by the general formula:

$$CH_2=CR^{Q1}-LR^{Q2}$$

(wherein $R^{Q1}$ represents a hydrogen atom or an alkyl group; L represents a single bond, —CO—O—*, —O—CO—*, or —O—; * represents the binding position with $R^{Q2}$. $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; and (perfluoroalkyl)ethylenes.

Examples of the perfluorovinyl ether include, but are not limited to, a perfluoro unsaturated compound represented by the following general formula (A):

$$CF_2=CF-ORf \tag{A}$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the perfluorovinyl ether include perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

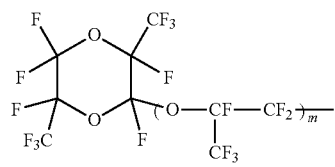

wherein m represents 0 or an integer of 1 to 4; and those in which Rf is a group represented by the following formula:

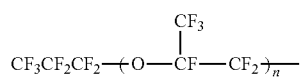

wherein n is an integer of 1 to 4.

Examples of hydrogen-containing fluoroolefins include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

Examples of the (perfluoroalkyl)ethylene (PFAE) include, but are not limited to, (perfluorobutyl) ethylene (PFBE), and (perfluorohexyl) ethylene.

Preferred examples of the modifying monomer also include a comonomer (3) having a monomer reactivity ratio of 0.1 to 8. The presence of the comonomer (3) makes it possible to obtain PTFE particles having a small particle size, and to thereby obtain an aqueous dispersion having high dispersion stability.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with a comonomer. The lower this value is, the more reactive the comonomer is with TFE. The reactivity ratio can be calculated by copolymerizing the TFE and the comonomer, determining the compositional features in the polymer formed immediately after initiation, and calculating the reactivity ratio by Fineman-Ross equation.

The copolymerization is performed using 3,600 g of deionized degassed water, 1,000 ppm of perfluorooctanoate based on the water, and 100 g of paraffin wax contained in an autoclave made of stainless steel with an internal volume of 6.0 L at a pressure of 0.78 MPa and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPa, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The composition in the resulting polymer is calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$$CH_2=CH-Rf^1 \quad (3a)$$

wherein $Rf^1$ is a perfluoroalkyl group having 1 to 10 carbon atoms;

$$CF_2=CF-O-Rf^2 \quad (3b)$$

wherein $Rf^2$ is a perfluoroalkyl group having 1 to 2 carbon atoms;

$$CF_2=CF-O-(CF_2)_nCF=CF_2 \quad (3c)$$

wherein n is 1 or 2; and

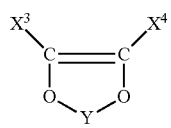

(3d)

wherein $X^3$ and $X^4$ are each F, Cl, or a methoxy group; and Y is represented by the formula Y1 or Y2;

$$-CF=CF- \quad (Y1)$$

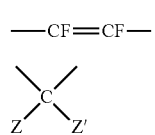

(Y2)

in the formula Y2, Z and Z' are each F or a fluorinated alkyl group having 1 to 3 carbon atoms.

The content of the comonomer (3) unit is preferably in the range of 0.0001 to 1% by mass based on the total polymerization units of PTFE. The lower limit thereof is more preferably 0.001% by mass, still more preferably 0.005% by mass, and particularly preferably 0.009% by mass. The upper limit thereof is more preferably 0.5% by mass, still more preferably 0.3% by mass, particularly preferably 0.1% by mass, and particularly preferably 0.05% by mass.

The modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of polytetrafluoroethylene having a small average primary particle size, and excellent stability. The use of the modifying monomer allows for obtaining an aqueous dispersion of PTFE having a smaller average primary particle size, a smaller aspect ratio of the primary particles, and excellent dispersion stability.

From the viewpoint of reactivity with TFE, the modifying monomer preferably contains at least one selected from the group consisting of hexafluoropropylene, perfluoro(alkyl vinyl ether), and (perfluoroalkyl)ethylene, and more preferably at least one selected from the group consisting of perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1% by mass based on total polymerization units of PTFE. The lower limit of the content is more preferably 0.0001% by mass, still more preferably 0.001% by mass, further preferably 0.005% by mass, and particularly preferably 0.009% by mass. The upper limit of the modifying monomer unit is more preferably 0.5% by mass, still more preferably 0.3% by mass, particularly preferably 0.1% by mass, still further preferably 0.05% by mass, and very particularly preferably 0.01% by mass.

It is also preferable that the modifying monomer contains a modifying monomer having a functional group capable of reacting by radical polymerization and a hydrophilic group (hereinafter, also referred to as "modifying monomer (A)").

The presence of the modifying monomer (A) makes it possible to obtain PTFE particles having a small primary particle size, and to thereby obtain an aqueous dispersion having high dispersion stability. In addition, the amount of uncoagulated polymer can be reduced. Furthermore, the aspect ratio of the primary particles can be made small.

The amount of the modifying monomer (A) used is preferably more than 0.1 ppm of the aqueous medium, more preferably 5 ppm or more, and still more preferably 10 ppm or more. When the amount of the modifying monomer (A) used is too small, the average primary particle size of the obtained PTFE may not be reduced.

The amount of the modifying monomer (A) used may be in the above range, but the upper limit may be, for example, 5,000 ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration or the coagulation/washing in the same manner as the fluorine-containing compound described later.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of PTFE is lowered or PTFE is colored after firing.

Examples of the hydrophilic group in the modifying monomer (A) include $-NH_2$, $-PO_3M$, $-OPO_2M$, $-SO_2M$, $-OSO_3M$, and $-COOM$, wherein M represents H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two of them optionally bind to each other to form a ring. The hydrophilic group is particularly preferably $-SO_2M$ or $-COOM$. The alkyl group is preferable as the organic group in $R^{7y}$. $R^{7y}$ is preferably H or an organic group having 1 to 10 carbon atoms, more preferably H or an organic group having 1 to 4 carbon atoms, and still more preferably H or an alkyl group having 1 to 4 carbon atoms.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

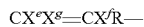

wherein $X^e$, $X^f$ and $X^g$ are each independently F, Cl, H, $CF_3$, $CF_2H$, $CFH_2$ or $CH_3$; and R is a linking group. The linking group R include linking groups as Ra which will be described later. Preferred are groups having an unsaturated bond, such as $-CH=CH_2$, $-CF=CH_2$, $-CH=CF_2$, $-CF=CF_2$, $-CH_2-CH=CH_2$, $-CF_2-CF=CH_2$, $-CF_2-CF=CF_2$, $-(C=O)-CH=CH_2$, $-(C=O)-CF=CH_2$, $-(C=O)-CH=CF_2$, $-(C=O)-CF=CF_2$, $-(C=O)-C(CH_3)=CH_2$, $-(C=O)-C(CF_3)=CH_2$, $-(C=O)-C(CH_3)=CF_2$, $-(C=O)-C(CF_3)=CF_2$, $-O-CH_2-CH=CH_2$, $-O-CF_2-CF=CH_2$, $-O-CH_2-CH=CF_2$, and $-O-CF_2-CF=CF_2$.

Since the modifying monomer (A) has a functional group capable of reacting by radical polymerization, it is presumed that when used in the polymerization, it reacts with a fluorine-containing monomer at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or more of the modifying monomers (A).

In the polymerization, a compound having an unsaturated bond may be used as the modifying monomer (A).

The modifying monomer (A) is preferably a compound represented by the general formula (4):

wherein $X^i$, $X^j$, and $X^k$ are each independently F, Cl, H, or $CF_3$; $Y^3$ is a hydrophilic group; Ra is a linking group; $Z^1$ and $Z^2$ are each independently H, F, or $CF_3$; and k is 0 or 1.

Examples of the hydrophilic group include $-NH_2$, $-PO_3M$, $-OPO_3M$, $-SO_3M$, $-OSO_3M$, and $-COOM$, wherein M represents H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring. Of these, the hydrophilic group is preferably $-SO_3M$ or $-COOM$. The alkyl group is preferable as the organic group in $R^{7y}$. $R^{7y}$ is preferably H or a $C_{1-10}$ organic group, more preferably H or a $C_{1-4}$ organic group, and still more preferably H or a $C_{1-4}$ alkyl group. Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, $-(C=O)-$, $-(C=O)-O-$, or a hydrocarbon group containing —(C═O)—, and these groups optionally contain an oxygen atom, optionally contain a double bond, and optionally contain a functional group.

$R^a$ is preferably —(C═O)—, —(C═O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from —$(CH_2)_a$—, —$(CF_2)_a$—, —O—$(CF_2)_a$—, —$(CF_2)_a$—O—$(CF_2)_b$—, —O$(CF_2)_a$—O—$(CF_2)_b$—, —$(CF_2)_a$—[O—$(CF_2)_b]_c$—, —O$(CF_2)_a$—[O—$(CF_2)_b]_c$—, —[$(CF_2)_a$—O]$_b$—[$(CF_2)_c$—O]$_d$—, —O[$(CF_2)_a$—O]$_b$—[$(CF_2)_c$—O]$_d$—, —O—[$CF_2CF(CF_3)$O]$_a$—$(CF_2)_b$—, —(C═O)—, —(C═O)—O—, —(C═O)—$(CH_2)_a$—, —(C═O)—$(CF_2)_a$—, —(C═O)—O—$(CH_2)_a$—, —(C═O)—O—$(CF_2)_a$—, —(C═O)—[$(CH_2)_a$—O]$_b$—, —(C═O)—[$(CF_2)_a$—O]$_b$—, —(C═O)—O[$(CH_2)_a$—O]$_b$—, —(C═O)—O[$(CF_2)_a$—O]$_b$—, —(C═O)—O[$(CH_2)_a$—O]$_b$—$(CH_2)_c$—, —(C═O)—O[$(CF_2)_a$—O]$_b$—$(CF_2)_c$—, —(C═O)—$(CH_2)_a$—O—$(CH_2)_b$—, —(C═O)—$(CF_2)_a$—O—$(CF_2)_b$—, —(C═O)—O—$(CH_2)_a$—O—$(CH_2)_b$—, —(C═O)—O—$(CF_2)_a$—O—$(CF_2)_b$—, —(C═O)—O—$C_6H_4$—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include —$CF_2$—O—, —$CF_2$—O—$CF_2$—, —$CF_2$—O—$CH_2$—, —$CF_2$—O—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)CH_2$—, —(C═O)—, —(C═O)—O—, —(C═O)—$(CH_2)$—, —(C═O)—$(CF_2)$—, —(C═O)—O—$(CH_2)$—, —(C═O)—O—$(CF_2)$—, —(C═O)—[$(CH_2)_2$—O]$_n$—, —(C═O)—[$(CF_2)_2$—O]$_n$—, —(C═O)—O[$(CH_2)_2$—O]$_n$—, —(C═O)—O[$(CF_2)_2$—O]$_n$—, —(C═O)—O[$(CH_2)_2$—O]$_n$—$(CH_2)$—, —(C═O)—O[$(CF_2)_2$—O]$_n$—$(CF_2)$—, —(C═O)—$(CH_2)_2$—O—$(CH_2)$—, —(C═O)—$(CF_2)_2$—O—$(CF_2)$—, —(C═O)—O—$(CH_2)_2$—O—$(CH_2)$—, —(C═O)—O—$(CF_2)_2$—O—$(CF_2)$—, and —(C═O)—O—$C_6H_4$—. In particular, preferred for Ra among these is —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, —$CF_2$—O—$CF(CF_3)CF_2$—O—, —(C═O)—, —(C═O)—O—, —(C═O)—$(CH_2)$—, —(C═O)—O—$(CH_2)$—, —(C═O)—O[$(CH_2)_2$—O]$_n$—, —(C═O)—O[$(CH_2)_2$—O]$_n$—$(CH_2)$—, —(C═O)—$(CH_2)_2$—O—$(CH_2)$—, or —(C═O)—O—$C_6H_4$—.

In the formula, n is an integer of 1 to 10.

—$R^a$—$(CZ^1Z^2)_k$— in the general formula (4) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—$CF_2CF_2$—$CF(CF_3)$—, —$CF_2$—O—$CF_2CF_2$—$C(CF_3)_2$—, —$CF_2$—O—$CF(CF_3)$—$CF_2$—, —$CF_2$—O—$CF(CF_3)$—$CF(CF_3)$—, —$CF_2$—O—$CF(CF_3)$—$C(CF_3)_2$—, —$CF_2$—O—$CF(CF_3)CF_2$—$CF_2$—, —$CF_2$—O—$CF(CF_3)CF_2$—$CF(CF_3)$—, —$CF_2$—O—$CF(CF_3)CF_2$—$C(CF_3)_2$—, —$CF_2$—O—$CF(CF_3)CF_2$—O—$CF_2$—, —$CF_2$—O—$CF(CF_3)CF_2$—O—$CF(CF_3)$—, —(C═O)—, —(C═O)—O—, —(C═O)—$(CH_2)$—, —(C═O)—O—$(CH_2)$—, —(C═O)—$(CF_2)$—, —(C═O)—O—$(CH_2)$—, —(C═O)—O—$(CH_2)$—, —(C)═O)—O—$(CF_2)$—, —(C═O)—[$(CH_2)_2$—O]$_n$—$(CH_2)$—, —(C═O)—[$(CF_2)_2$—O]$_n$—$(CF_2)$—, —(C═O)—O[$(CH_2)_2$—O]$_n$—$(CH_2)$—, —(C═O)—O[$(CF_2)_2$—O]$_n$—$(CF_2)$—, —(C═O)—O—$(CH_2)_2$—O—$(CH_2)$—$(CH_2)$—, —(C═O)—$(CF_2)_2$—O—$(CF_2)$—$(CF_2)$—, —(C═O)—O[$(CH_2)_2$—O]$_n$—$(CH_2)$—$(CH_2)$—, —(C═O)—O[$(CF_2)_2$—O]$_n$—$(CF_2)$—, —(C═O)—O—$(CH_2)_2$—O—$(CH_2)$—$(CH_2)$—, —(C═O)—O—$(CF_2)_2$—O—$(CF_2)$—$(CF_2)$—, —(C═O)—O—$(CH_2)_2$—O—$(CH_2)$—$C(CF_3)_2$—, —(C═O)—O—$(CF_2)_2$—O—$(CF_2)$—$(CF_2)$—, —(C═O)—O—$(CH_2)_2$—O—$(CH_2)$—$C(CF_3)_2$—, —(C═O)—O—$(CF_2)_2$—O—$(CF_2)$—$C(CF_3)_2$—, or —(C═O)—O—$C_6H_4$—$C(CF_3)_2$—, and is more preferably —$CF_2$—O—$CF(CF_3)$—, —$CF_2$—O—$CF_2$—$CF(CF_3)$—, —$CF_2$—O—$CF_2CF_2$—$CF(CF_3)$—, —$CF_2$—O—$CF(CF_3)$—$CF(CF_3)$—, —$CF_2$—O—$CF(CF_3)CF_2$—$CF(CF_3)$—, —$CF_2$—O—$CF(CF_3)CF_2$—O—$CF(CF_3)$—, —(C═O)—, —(C═O)—O—$(CH_2)$—(C═O)—O—$(CH_2)$—$(CH_2)$—, —(C═O)—O[$(CH_2)_2$—O]$_n$—$(CH_2)$—$(CH_2)$—, —(C═O)—O—$(CH_2)_2$—O—$(CH_2)$—$C(CF_3)_2$—, or —(C═O)—O—$C_6H_4$—$C(CF_3)_2$—.

In the formula, n is an integer of 1 to 10.

Specific examples of the compound represented by the general formula (4) include

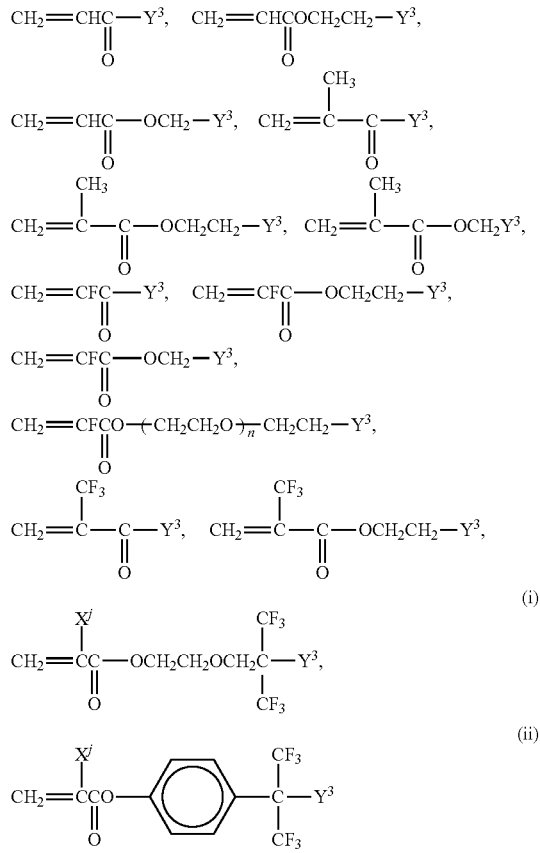

wherein $X^j$ and $Y^3$ are the same as above, and n is an integer from 1 to 10.

$R^a$ is preferably a divalent group represented by the following general formula (r1):

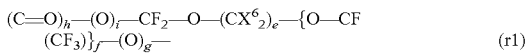

(r1)

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

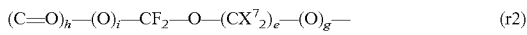

$$-(C=O)_h-(O)_i-CF_2-O-(CX^7_2)_e-(O)_g- \quad (r2)$$

wherein $X^7$ is each independently H, F, or $CF_3$; e is an integer of 0 to 3; g is 0 or 1; h is 0 or 1; and i is 0 or 1.

$-R^a-(CZ^1Z^2)_k-$ in the general formula (4) is also preferably a divalent group represented by the following formula (t1):

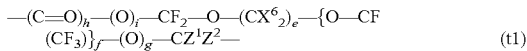

$$-(C=O)_h-(O)_i-CF_2-O-(CX^6_2)_e-\{O-CF(CF_3)\}_f-(O)_g-CZ^1Z^2- \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $-R^a-(CZ^1Z^2)_k-$ is preferably a divalent group represented by the following formula (t2):

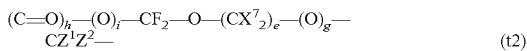

$$-(C=O)_h-(O)_i-CF_2-O-(CX^7_2)_e-(O)_g-CZ^1Z^2- \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently H, F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2=CF-O-Rf^0-Y^3 \quad (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2=CH-O-Rf^0-Y^3 \quad (4b)$$

wherein $Y^3$ is a hydrophilic group; and $Rf^0$ is a perfluorinated divalent linking group as defined in the formula (4a).

In the general formula (4), $Y^3$ is preferably $-OSO_3M$. Examples of the compound represented by the general formula (4) when $Y^3$ is $-OSO_3M$ include $CF_2=CF(OCF_2CF_2CH_2OSO_3M)$, $CH_2=CH((CF_2)_4CH_2OSO_3M)$, $CF_2=CF(O(CF_2)_4CH_2OSO_3M)$, $CF_2=CF(OCF_2CF(CF_3)CH_2OSO_3M)$, $CF_2=CF(OCF_2CF(CF_3)OCF_2CF_2CH_2OSO_3M)$, $CH_2=CH((CF_2)_4CH_2OSO_3M)$, $CF_2=CF(OCF_2CF_2SO_2N(CH_3)CH_2CH_2OSO_3M)$, $CH_2=CH(CF_2CF_2CH_2OSO_3M)$, $CF_2=CF(OCF_2)CF_2CF_2CF_2SO_2N(CH_3)CH_2CH_2OSO_3M)$, and $CH_2=CH(CF_2CF_2CH_2OSO_3M)$. In the formula, M is the same as above.

In a preferred embodiment, in the general formula (4), $Y^3$ is $-SO_3M$. Examples of the compound represented by the general formula (4) when $Y^3$ is $-SO_3M$ include $CF_2=CF(OCF_2CF_2SO_3M)$, $CF_2=CF(O(CF_2)_4SO_3M)$, $CF_2=CF(OCF_2CF(CF_3)SO_3M)$, $CF_2=CF(OCF_2CF(CF_3)OCF_2CF_2SO_3M)$, $CH_2=CH(CF_2CF_2SO_3M)$, $CF_2=CF(OCF_2CF(CF_3)OCF_2CF_2CF_2CF_2SO_3M)$, $CH_2=CH((CF_2)_4SO_3M)$, $CH_2=CH(CF_2CF_2SO_3M)$, and $CH_2=CH((CF_2)_4SO_3M)$. In the formula, M is the same as above.

In a preferred embodiment, in the general formula (4), $Y^3$ is $-COOM$. Examples of the compound represented by the general formula (4) when $Y^3$ is $-COOM$ include $CF_2=CF(OCF_2CF_2COOM)$, $CF_2=CF(OCF_2CF_2CF_2COOM)$, $CF_2=CF(O(CF_2)_5COOM)$, $CF_2=CF(OCF_2CF(CF_3)COOM)$, $CF_2=CF(OCF_2CF(CF_3)O(CF_2)_nCOOM)$ (n is greater than 1), $CH_2=CH(CF_2CF_2COOM)$, $CH_2=CH((CF_2)_4COOM)$, $CH_2=CH(CF_2CF_2COOM)$, $CH_2=CH((CF_2)_4COOM)$, $CF_2=CF(OCF_2CF_2SO_2NR'CH_2COOM)$, $CF_2=CF(O(CF_2)_4SO_2NR'CH_2COOM)$, $CF_2=CF(OCF_2CF(CF_3)SO_2NR'CH_2COOM)$, $CF_2=CF(OCF_2CF(CF_3)OCF_2CF_2SO_2NR'CH_2COOM)$, $CH_2=CH(CF_2CF_2SO_2NR'CH_2COOM)$, $CF_2=CF(OCF_2CF(CF_3)OCF_2CF_2CF_2CF_2SO_2NR'CH_2COOM)$, $CH_2=CH((CF_2)_4SO_2NR'CH_2COOM)$, $CH_2=CH(CF_2CF_2SO_2NR'CH_2COOM)$, and $CH_2=CH((CF_2)_4SO_2NR'CH_2COOM)$. In the formula, R' is an H or $C_1$-4 alkyl group, and M is the same as above.

In a preferred embodiment, in the general formula (4), $Y^3$ is $-OPO_3M$. Examples of the compound represented by the general formula (4) when $Y^3$ is $-OPO_3M$ include $CF_2=CF(OCF_2CF_2CH_2OP(O)(OM)_2)$, $CF_2=CF(O(CF_2)_4CH_2OP(O)(OM)_2)$, $CF_2=CF(OCF_2CF(CF_3)CH_2OP(O)(OM)_2)$, $CF_2=CF(OCF_2CF(CF_3)OCF_2CF_2CH_2OP(O)(OM)_2)$, $CF_2=CF(OCF_2CF_2SO_2N(CH_3)CH_2CH_2OP(O)(OM)_2)$, $CF_2=CF(OCF_2CF_2CF_2CF_2SO_2N(CH_3)CH_2CH_2OP(O)(OM)_2)$, $CH_2=CH(CF_2CF_2CH_2OP(O)(CM)_2$, $CH_2=CH((CF_2)_4CH_2OP(O)(OM)_2)$, $CH_2=CH(CF_2CF_2CH_2OP(O)(OM)_2)$, and $CH_2=CH((CF_2)_4CH_2OP(O)(OM)_2)$. In the formula, M is the same as above.

In a preferred embodiment, in the general formula (4), $Y^3$ is $-PO_3M$. Examples of the compound represented by the general formula (4) when $Y^3$ is $-PO_3M$ include $CF_2=CF(OCF_2CF_2P(O)(OM)_2)$, $CF_2=CF(O(CF_2)_4P(O)(OM)_2)$, $CF_2=CF(OCF_2CF(CF_3)P(O)(OM)_2)$, $CF_2=CF(OCF_2CF(CF_3)OCF_2CF_2P(O)(OM)_2)$, $CH_2=CH((CF_2)_4P(O)(OM)_2)$, $CH_2=CH(CF_2CF_2P(O)(OM)_2)$, and $CH_2=CH((CF_2)_4P(O)(OM)_2)$, and in the formula, M is the same as above.

The compound represented by the general formula (4) is preferably at least one selected from the group consisting of:
a monomer represented by the following general formula (5):

$$CX_2=CY(-CZ_2-O-Rf-Y^3) \quad (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;
a monomer represented by the following general formula (6):

$$CX_2=CY(-O-Rf-Y^3) \quad (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and
a monomer represented by the following general formula (7):

$$CX_2=CY(-Rf-Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is —H or —F. X may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —CF$_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —CF$_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

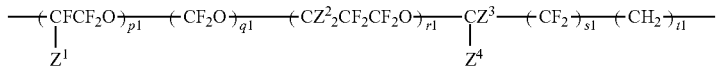

(wherein $Z^1$ is F or CF$_3$; $Z^2$ and $Z^3$ are each H or F; $Z^4$ is H, F, or CF$_3$; p1+q1+r1 is an integer of 1 to 10; s1 is 0 or 1; and t1 is an integer of 0 to 5).

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (where n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (where n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

In the general formula (5), $Y^3$ is —COOM, —SO$_3$M, or —OSO$_3$M, wherein M is H, a metal atom, NR$^{7y}_4$, imidazolium optionally having a substituent, pyridinium optionally having a substituent, or phosphonium optionally having a substituent, wherein R$^{7y}$ is H or an organic group, and may be the same or different, and any two thereof may be bonded to each other to form a ring.

The alkyl group is preferable as the organic group in R$^{7y}$. R$^{7y}$ is preferably H or a C$_{1-10}$ organic group, more preferably H or a C$_{1-4}$ organic group, and still more preferably H or a C$_{1-4}$ alkyl group.

Examples of the metal atom include alkali metals (Group 1) and alkaline earth metals (Group 2), and preferred is Na, K, or Li.

M is preferably —H, a metal atom, or —NR$^{7y}_4$, more preferably —H, an alkali metal (Group 1), an alkaline earth metal (Group 2), or —NR$^{7y}_4$, still more preferably —H, —Na, —K, —Li, or —NH$_4$, further preferably —Na, —K, or —NH$_4$, particularly preferably —Na or —NH$_4$, and most preferably —NH$_4$.

Y$^3$ is preferably —COOM or —SO$_3$M, and more preferably —COOM.

The monomer represented by the general formula (5a) is preferably a monomer (5a) represented by the following general formula (5a):

$$CH_2=CF(-CF_2-O-Rf-Y^3) \quad (5a)$$

wherein Rf and Y$^3$ are as described above.

Specific examples of the monomer represented by the general formula (5a) include a monomer represented by the following formula:

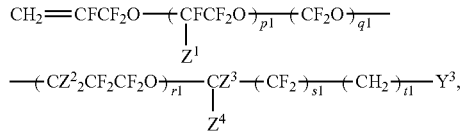

wherein Z$^1$ is F or CF$_3$; Z$^2$ and Z$^3$ are each H or F; Z$^4$ is H, F, or CF$_3$; p1+q1+r1 is an integer of 0 to 10; s1 is 0 or 1; t1 is an integer of 0 to 5; and Y$^3$ is as described above, with the proviso that when Z$^3$ and Z$^4$ are both H, p1+q1+r1+s1 is not 0. More specifically, preferred examples thereof include:

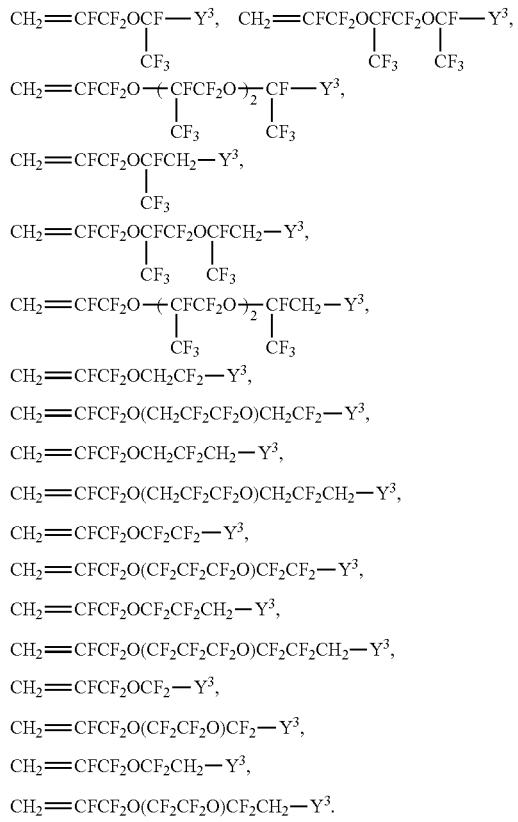

Of these, preferred are:

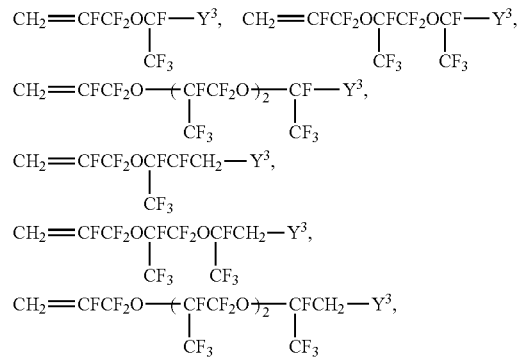

In the monomer represented by the general formula (5a), Y$^3$ in the formula (5a) is preferably —COOM. Specifically, the monomer represented by the general formula (5a) is preferably at least one selected from the group consisting of CH$_2$=CFCF$_2$OCF(CF$_3$)COOM and CH$_2$=CFCF$_2$OCF(CF$_3$)CF$_2$OCF(CF$_3$)COOM (wherein M is as defined above), and more preferably CH$_2$=CFCF$_2$OCF(CF$_3$)COOM.

The monomer represented by the general formula (5b) is preferably a monomer (5b) represented by the following general formula (5b):

$$CX^2_2=CFCF_2-O-(CF(CF_3)CF_2O)_{n5}-CF(CF_3)-Y^3 \quad (5b)$$

wherein each X$^2$ is the same and represents F or H, and n5 represents an integer of 0 or 1 to 10, and Y$^3$ is the same as defined above.

In the formula (5b), n5 is preferably 0 or an integer of 1 to 5, more preferably 0, 1, or 2, and still more preferably 0 or 1 from the viewpoint of stability of the resulting aqueous dispersion. Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

Examples of the perfluorovinylalkyl compound represented by the formula (5b) include CH$_2$=CFCF$_2$OCF(CF$_3$)COOM$^1$ and CH$_2$=CFCF$_2$OCF(CF$_3$)CF$_2$OCF(CF$_3$)COOM$^1$, wherein M$^1$ is as defined above.

Examples of the monomer represented by the general formula (5) further include a monomer represented by the following general formula (5c):

$$CF_2=CFCF_2-O-Rf-Y^3 \quad (5c)$$

wherein Rf and Y$^3$ are as described above.

More specific examples thereof include:

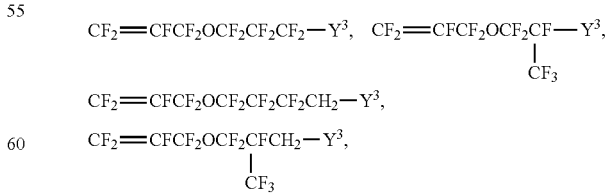

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —CF$_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less, more preferably 20 or less, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The modifying monomer (A) is preferably at least one selected from the group consisting of the compounds represented by the following formulas (6a) to (6f):

$$CF_2=CF-(CF_2)_{n1}-Y^3 \qquad (6a)$$

wherein n1 represents an integer of 1 to 10; Y$^3$ represents —SO$_3$M$^1$ or —COOM$^1$; M$^1$ represents H, a metal atom, NR$^{7y}_4$, imidazolium optionally having a substituent, pyridinium optionally having a substituent, or phosphonium optionally having a substituent; and R$^{7y}$ represents H or an organic group;

$$CF_2=CF-(CF_2C(CF_3)F)_{n2}-Y^3 \qquad (6b)$$

wherein n2 represents an integer of 1 to 5, and Y$^3$ is as defined above;

$$CF_2=CF-O-(CFX^1)_{n3}-Y^3 \qquad (6c)$$

wherein X$^1$ represents F or CF$_3$; n3 represents an integer of 1 to 10; and Y$^3$ is as defined above; and $$CF_2=CF-O-(CF_2CFX^1O)_{n4}-CF_2CF_2-Y^3 \qquad (6d)$$

wherein n4 represents an integer of 1 to 10; and Y$^3$ and X$^1$ are as defined above.

$$CF_2=CF-O-(CF_2CF_2CFX^1O)_{n5}-CF_2CF_2CF_2-Y^3 \qquad (6e)$$

wherein n5 represents an integer of 0 to 10, and Y$^3$ and X$^1$ are the same as defined above. R$^{7y}$ is preferably H or a C$_{1-10}$ organic group, and more preferably H or a C$_{1-4}$ organic group.

Examples of the metal atom include monovalent and divalent metal atoms, and examples thereof include alkali metals (Group 1) and alkaline earth metals (Group 2), and preferred is Na, K or Li.

In the formula (6a), n1 is preferably an integer of 5 or less, and more preferably an integer of 2 or less. Y$^3$ is preferably —COOM$^1$ in terms of moderate water solubility and surface activity can be obtained, and M$^1$ is preferably H or NH$^4$ in terms of hardly remaining as impurities and improving heat resistance of the obtained molded body.

Examples of the monomer represented by the formula (6a) include CF$_2$=CFCF$_2$COOM$^1$ (wherein, M$^1$ is the same as defined above).

In formula (6b), n2 is preferably an integer of 3 or less in terms of emulsifying ability, Y$^3$ is preferably —COOM$^1$ in terms of moderate water solubility and surface activity can be obtained, and M$^1$ is preferably H or NH$^4$ in terms of hardly remaining as impurities and improving heat resistance of the obtained molded body.

In the general formula (6c), n3 is preferably an integer of 5 or less in terms of water solubility, Y$^3$ is preferably —COOM$^1$ in terms of obtaining moderate water solubility and surface activity, and M$^1$ is preferably H or NH$_4$ in terms of improving dispersion stability.

In the general formula (6d), X$^1$ is preferably —CF$^3$ in terms of surfactant function, n4 is preferably an integer of 5 or less in terms of water solubility, Y$^3$ is preferably —COOM$^1$ in terms of obtaining moderate water solubility and surface activity, and M$^1$ is preferably H or NH$_4$.

Examples of the monomer represented by the formula (6d) include CF$_2$=CFOCF$_2$CF(CF$_3$)OCF$_2$CF$_2$COOM$^1$ (wherein M$^1$ represents H, NH$_4$, or an alkali metal).

In the general formula (6e), n5 is preferably an integer of 5 or less in terms of water solubility, Y$^3$ is preferably —COOM$^1$ in terms of obtaining moderate water solubility and stability of the aqueous dispersion, and M$^1$ is preferably H or NH$_4$.

Examples of the monomer represented by the general formula (6e) include CF$_2$=CFOCF$_2$CF$_2$CF$_2$COOM$^1$ (wherein M$^1$ represents H, NH$_4$, or an alkali metal).

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:
a monomer represented by the following general formula (7a):

$$CF_2=CF-(CF_2)_{n1}-Y^3 \qquad (7a)$$

wherein n1 represents an integer of 1 to 10; and Y$^3$ is as defined above; and a monomer represented by the following general formula (7b):

$$CF_2=CF-(CF_2C(CF_3)F)_{n2}-Y^3 \qquad (7b)$$

wherein n2 represents an integer of 1 to 5; and Y$^3$ is as defined above.

Y$^3$ is preferably —SO$_3$M$^1$ or —COOM$^1$, and M$^1$ is preferably H, a metal atom, NR$^7_4$, imidazolium optionally having a substituent, pyridinium optionally having a substituent, or phosphonium optionally having a substituent. R$^7$ represents H or an organic group.

In the formula (7a), n1 is preferably an integer of 5 or less, and more preferably an integer of 2 or less. Y$^3$ is preferably —COOM$^1$ from the viewpoint of obtaining appropriate water-solubility and stability of the aqueous dispersion, and M$^1$ is preferably H or NH$_4$ from the viewpoint of being less likely to remain as impurities and improving the heat resistance of the resulting molded body.

Examples of the perfluorovinylalkyl compound represented by the formula (7a) include CF$_2$=CFCF$_2$COOM$^1$, wherein M$^1$ is as defined above.

In the formula (7b), n2 is preferably an integer of 3 or less from the viewpoint of stability of the resulting aqueous dispersion, $Y^3$ is preferably —COOM$^1$ from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

The modified monomer preferably contains a modifying monomer (A), and preferably contains at least one selected from the group consisting of compounds represented by the general formulas (5c), (6a), (6b), (6c), and (6d), and more preferably contains a compound represented by the general formula (5c).

When the modified monomer contains a modifying monomer (A), the content of the polymerization unit based on the modified monomer (A) is preferably in the range of 0.00001 to 1.0% by mass based on the total polymerization unit of PTFE. The lower limit thereof is more preferably 0.0001% by mass, more preferably 0.0005% by mass, still more preferably 0.001% by mass, further preferably 0.005% by mass, and particularly preferably 0.009% by mass. The upper limit thereof is preferably 0.90% by mass, more preferably 0.50% by mass, still more preferably 0.40% by mass, further preferably 0.30% by mass, still further preferably 0.10% by mass, particularly preferably 0.08% by mass, particularly preferably 0.05% by mass, and more 0.01% by mass.

The PTFE may have a core-shell structure. The core-shell structure is a conventionally known structure, and is a structure of primary particles in an aqueous dispersion that can be produced by the method or the like described in U.S. Pat. No. 6,841,594.

Examples of the polytetrafluoroethylene having a core-shell structure include a core-shell structure including a core portion of a TFE homopolymer and a shell portion of a modified PTFE, a core-shell structure including a core portion of a modified PTFE and a shell portion of a TFE homopolymer, and a core-shell structure including a core portion of a modified PTFE and a shell portion of a modified PTFE having a monomer composition different from that of the modified PTFE constituting the core portion.

The PTFE having a core-shell structure can be obtained, for example, by first polymerizing TFE and optionally a modifying monomer to produce a core portion (TFE homopolymer or modified PTFE), and then polymerizing TFE and optionally a modifying monomer to produce a shell portion (TFE homopolymer or modified PTFE).

The shell portion means a portion constituting a predetermined thickness from the surface of the PTFE primary particle to the inside of the particle, and the core portion means a portion constituting the inside of the shell portion.

In the present specification, the core-shell structure includes all of (1) a core-shell structure including a core portion and a shell portion having different monomer compositions, (2) a core-shell structure including a core portion and a shell portion having the same monomer composition with different number-average molecular weights in both portions, and (3) a core-shell structure including a core portion and a shell portion having different monomer compositions with different number-average molecular weights in both portions.

When the shell portion is modified PTFE, the content of the modifying monomer in the shell portion is preferably 0.0001 to 1% by mass. The content thereof is more preferably 0.001% by mass or more, still more preferably 0.01% by mass or more. Further, the content thereof is more preferably 0.5% by mass or less, and still more preferably 0.3% by mass or less.

When the core portion is modified PTFE, the content of the modifying monomer in the core portion is preferably 0.00001 to 1.0% by mass. The content thereof is more preferably 0.0001% by mass or more, and still more preferably 0.001% by mass or less. Further, the content thereof is more preferably 0.50% by mass or less, and still more preferably 0.30% by mass or less.

The average primary particle size of the PTFE is preferably 500 nm or less, more preferably 400 nm or less, and still more preferably 350 nm or less. By the production method of the present disclosure, PTFE having a small average primary particle size can be obtained. The lower limit of the average primary particle size may be, for example, but not limited to, 50 nm or 100 nm. From the viewpoint of molecular weight, it is preferably 100 nm or more, and more preferably 150 nm or more.

The average primary particle size can be determined by a dynamic light scattering. The average primary particle size may be determined by preparing a PTFE aqueous dispersion with a solids concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. The dynamic light scattering may be performed by, for example, ELSZ-1000S (manufactured by Otsuka Electronics Co., Ltd.).

In the PTFE, the aspect ratio of the primary particles is preferably 1.45 or less. The aspect ratio is more preferably 1.40 or less, still more preferably 1.35 or less, further preferably 1.30 or less, still further preferably 1.25 or less, particularly preferably 1.20 or less, and very particularly preferably 1.10 or less.

When measuring in an aqueous dispersion, the aspect ratio is determined by observing the PTFE aqueous dispersion diluted to have a solid content concentration of about 1% by mass with a scanning electron microscope (SEM), performing image processing on 400 or more particles selected at random, and averaging the ratios of the major axis to the minor axis. When measuring PTFE powder, the aspect ratio is obtained by irradiating PTFE powder with an electron beam, adding the PTFE powder to a fluorosurfactant aqueous solution, and redispersing the PTFE powder with ultrasonic waves to obtain a PTFE aqueous dispersion. The aspect ratio is determined from the PTFE aqueous dispersion by the same method as the method for measuring the PTFE aqueous dispersion.

The PTFE of the present disclosure preferably has a standard specific gravity (SSG) of 2.280 or less, more preferably 2.200 or less, still more preferably 2.190 or less, and further preferably 2.180 or less. The SSG is preferably 2.130 or more. The SSG is determined by the water replacement method in conformity with ASTM D 792 using a sample molded in conformity with ASTM D 4895-89.

The PTFE may have a thermal instability index (TII) of 20 or more. Such PTFE can be obtained by using a hydrocarbon anionic surfactant. The TII is preferably 25 or more, more preferably 30 or more, and still more preferably 35 or more. The TII is particularly preferably 40 or more. The TII is measured in conformity with ASTM D 4895-89.

The PTFE of the present disclosure may have a 0.1% mass loss temperature of 400° C. or lower. Such PTFE can be obtained by using a hydrocarbon anionic surfactant. The 0.1% mass loss temperature is a value measured by the following method.

Approximately 10 mg of PTFE powder, which has no history of heating to a temperature of 300° C. or more, is precisely weighed and stored in a dedicated aluminum pan, and the 0.1% mass loss temperature is measured using TG/DTA (thermogravimetric-differential thermal analyzer). The 0.1% mass loss temperature is the temperature corresponding to the point at which the weight of the aluminum pan is reduced by 0.1% by mass by heating the aluminum pan under the condition of 10° C./min in the temperature range from 25° C. to 600° C. in the air atmosphere.

The PTFE of the present disclosure may have a 1.0% mass loss temperature of 492° C. or lower. Such PTFE can be obtained by using a hydrocarbon anionic surfactant. The 1.0% mass loss temperature is a value measured by the following method.

Approximately 10 mg of PTFE powder, which has no history of heating to a temperature of 300° C. or more, is precisely weighed and stored in a dedicated aluminum pan, and the 0.1% mass loss temperature is measured using TG/DTA (thermogravimetric-differential thermal analyzer). The 1.0% mass loss temperature is the temperature corresponding to the point at which the weight of the aluminum pan is reduced by 1.0% by mass by heating the aluminum pan under the condition of 10° C./min in the temperature range from 25° C. to 600° C. in the air atmosphere.

The PTFE preferably has a melting point of 342° C. or lower, more preferably 341° C. or lower, and still more preferably 340° C. or lower. The melting point is a value measured by the following method.

Approximately 10 mg of powder, which has no history of heating to a temperature of 300° C. or more, is precisely weighed and stored in a dedicated aluminum pan, and the 1.0% mass loss temperature is measured using TG/DTA (thermogravimetric-differential thermal analyzer). The melting point is the temperature corresponding to the minimum value of the differential thermal (DTA) curve obtained by heating the aluminum pan under the condition of 10° C./min in the temperature range from 25° C. to 600° C. in the air atmosphere.

The extrusion pressure of the PTFE is preferably 50.0 MPa or lower, more preferably 40.0 MPa or lower, and preferably 5.0 MPa or higher, more preferably 10.0 MPa or higher, and still more preferably 15.0 MPa or higher. The extrusion pressure is a value determined by the following method.

To 100 g of PTFE powder, 21.7 g of a lubricant (trade name: Isopar H (R), manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The PTFE is usually stretchable, fibrillatable and non-molten secondary processible.

The non-molten secondary processible means a property that the melt flow rate cannot be measured at a temperature higher than the crystal melting point, that is, a property that does not easily flow even in the melting temperature region, in conformity with ASTM D-1238 and D 2116.

A method for producing polytetrafluoroethylene of the present disclosure includes polymerizing tetrafluoroethylene in an aqueous medium in the presence of a nucleating agent and a hydrocarbon anionic surfactant to obtain polytetrafluoroethylene.

The hydrocarbon anionic surfactant may be, for example, those disclosed in National Publication of International Patent Application No. 2013-542308, National Publication of International Patent Application No. 2013-542309, and National Publication of International Patent Application No. 2013-542310.

The hydrocarbon anionic surfactant may be a surfactant having a hydrophilic moiety and a hydrophobic moiety on the same molecule.

Hydrocarbon anionic surfactants usually have a hydrophilic moiety such as a carboxylate, a sulfonate or a sulfate and a hydrophobic moiety that is a long chain hydrocarbon moiety such as alkyl.

Examples of the hydrocarbon anionic surfactant include an anionic surfactant represented by R-L-M, wherein R is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4^-$, $-PO_3^-$ or $-COO^-$, and, M is, H, a metal atom, $NR^5_4$, imidazolium optionally having a substituent, pyridinium optionally having a substituent, or phosphonium optionally having a substituent, where each $R^5$ is H or an organic group, and $-ArSO_3^-$ is an aryl sulfonate.

Specific examples thereof include a compound represented by $CH_3-(CH_2)_n$-L-M, wherein n is an integer of 6 to 17, as represented by lauryl acid. L and M are the same as described above.

Mixtures of those in which R is an alkyl group having 12 to 16 carbon atoms and L is sulfate or sodium dodecyl sulfate (SDS) can also be used.

Examples of other compounds having a surfactant function include an anionic surfactant represented by $R^6$-(L-M)$_2$, wherein $R^6$ is H, a linear or branched alkylene group having 1 or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4^-$, $-PO_3^-$ or $-COO^-$, and, M is, H, a metal atom, $NR^5_4$, imidazolium optionally having a substituent, pyridinium optionally having a substituent, or phosphonium optionally having a substituent, where each $R^5$ is H or an organic group, and $-ArSO_3^-$ is an aryl sulfonate.

Examples of the hydrocarbon anionic surfactant include an anionic surfactant represented by $R^7$(-L-M)$_3$, wherein $R^7$ is a linear or branched alkylidine group having 1 or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4^-$, $-PO_3^-$ or $-COO^-$, and, M is, H, a metal atom, $NR^5_4$, imidazolium optionally having a substituent, pyridinium optionally having a substituent, or phosphonium optionally having a substituent, each $R^5$ are H or an organic group; and $-ArSO_3^-$ is an aryl sulfonate.

The term "substituent" as used herein, unless otherwise specified, means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, or a diaromatic oxyphosphinyl group.

The hydrocarbon anionic surfactant also includes a siloxane hydrocarbon anionic surfactant. Examples of the siloxane hydrocarbon anionic surfactant include those described in Silicone Surfactants, R. S. M. Hill, Marcel Dekker, Inc., ISBN: 0-8247-00104. The structure of the siloxane surfactant includes defined hydrophobic and hydrophilic moieties. The hydrophobic moiety contains one or more dihydrocarbyl siloxane units, where the substituents on the silicone atoms are completely hydrocarbon.

In the sense that the carbon atoms of the hydrocarbyl groups are fully substituted with hydrogen atoms where they can be substituted by halogen such as fluorine, these siloxane hydrocarbon anionic surfactants can also be regarded as hydrocarbon surfactants, i.e. the monovalent substituents on the carbon atoms of the hydrocarbyl groups are hydrogen.

The hydrophilic moiety of the siloxane hydrocarbon anionic surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such siloxane hydrocarbon anionic surfactants include polydimethylsiloxane-graft-(meth)acrylic acid salts, polydimethylsiloxane-graft-polyacrylate salts, and polydimethylsiloxane-grafted quaternary amines. The polar moieties of the hydrophilic moiety of the siloxane hydrocarbon anionic surfactant may contain nonionic groups formed by polyethers, such as polyethylene oxide (PEO), and mixed polyethylene oxide/propylene oxide polyethers (PEO/PPO). The ratio of ethylene oxide to propylene oxide (EO/PO) may be varied in mixed polyethylene oxide/propylene oxide polyethers.

The arrangement of the hydrophobic and hydrophilic moieties of the structure of a siloxane hydrocarbon anionic surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon anionic surfactants also include those disclosed in U.S. Pat. No. 6,841,616.

Examples of the siloxane-based hydrocarbon anionic surfactant include Noveon (R) by Lubrizol Advanced Materials, Inc. and SilSense™ PE-100 silicone and SilSense™ CA-1 silicone available from Consumer Specialties.

Examples of the hydrocarbon anionic surfactant also include a sulfosuccinate surfactant Lankropol (R) K8300 by Akzo Nobel Surface Chemistry LLC.

Examples of the sulfosuccinate surfactant include sodium diisodecyl sulfosuccinate (Emulsogen (R) SB10 by Clariant) and sodium diisotridecyl sulfosuccinate (Polirol (R) TR/LNA by Cesapinia Chemicals).

Examples of the hydrocarbon anionic surfactants also include PolyFox (R) surfactants by Omnova Solutions, Inc. (PolyFox™ PF-156A, PolyFox™ PF-136A, etc.).

Examples of the hydrocarbon anionic surfactant also include Versatic (R) 10 manufactured by Resolution Performance Products, and Avanel S series (S-70, S-74, etc.) manufactured by BASF.

The hydrocarbon anionic surfactant used may be those described above, including the following preferred hydrocarbon anionic surfactants.

Examples of the hydrocarbon anionic surfactant include a compound (α) represented by the following formula (α):

$$R^{100}\text{—COOM} \qquad (\alpha)$$

wherein $R^{100}$ is a monovalent organic group containing 1 or more carbon atoms; and M is H, a metal atom, $NR^{11}{}_4$, imidazolium optionally having a substituent, pyridinium optionally having a substituent, or phosphonium optionally having a substituent, wherein $R^{11}$ is H or an organic group and may be the same or different. $R^{11}$ is preferably H or an organic group having $C_{1-10}$, more preferably H or an organic group having $C_{1-4}$.

From the viewpoint of surfactant function, the number of carbon atoms in $R^{100}$ is preferably 2 or more, and more preferably 3 or more. From the viewpoint of water-solubility, the number of carbon atoms in $R^{100}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or $NR^{101}{}_4$, more preferably H, an alkali metal (Group 1), an alkaline earth metal (Group 2), or $NR^{101}{}_4$, still more preferably H, Na, K, Li, or $NH_4$, further preferably Na, K, or $NH_4$, particularly preferably Na or $NH_4$, and most preferably $NH_4$.

Examples of the compound (α) include $R^{12}$—COOM, wherein $R^{12}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{102}$ optionally contains a monovalent or divalent heterocycle, or optionally forms a ring; and M is as described above.

Specific examples thereof include a compound represented by $CH_3$—$(CH_2)_n$—COOM, wherein n is an integer of 2 to 28, and M is as described above.

From the viewpoint of emulsion stability, the compound (α) is preferably free from a carbonyl group which is not in a carboxyl group.

Preferred examples of the hydrocarbon-containing surfactant free from a carbonyl group include a compound of the following formula (A):

$$R\text{—COO-M} \qquad (A)$$

wherein R is an alkyl group, an alkenyl group, an alkylene group, or an alkenylene group containing 6 to 17 carbon atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms. In the formula (A), R is preferably an alkyl group or an alkenyl group, each of which optionally contains an ether group. The alkyl group or alkenyl group for R may be linear or branched. The number of carbon atoms in R may be, but is not limited to, 2 to 29.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23.

When the alkenyl group is linear, the number of carbon atoms in R is preferably 2 to 29, and more preferably 9 to 23. When the alkenyl group is branched, the number of carbon atoms in R is preferably 2 to 29, and more preferably 9 to 23.

Examples of the alkyl group and alkenyl group include a methyl group, an ethyl group, an isobutyl group, a t-butyl group, and a vinyl group.

Examples of compound (α) (carboxylic acid-type hydrocarbon surfactant) include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

Particularly, preferred is at least one selected from the group consisting of lauric acid, capric acid, myristic acid, pentadecylic acid, palmitic acid, and salts thereof.

Examples of the salts include, but are not limited to, those in which hydrogen of the carboxyl group is a metal atom, $NR^{11}_4$, imidazolium optionally having a substituent, pyridinium optionally having a substituent, or phosphonium optionally having a substituent as M in the formula described above.

The compound (α) (carboxylic acid-type hydrocarbon surfactant) is preferably at least one selected from the group consisting of lauric acid, capric acid, myristic acid, pentadecylic acid, palmitic acid, and salts thereof, still more preferably lauric acid and salts thereof, particularly preferably lauric acid salts, and most preferably sodium laurate and ammonium laurate, because particles having a small average primary particle size can be obtained by polymerization, a large number of particles can be generated during polymerization to efficiently produce polytetrafluoroethylene.

Examples of the hydrocarbon anionic surfactant include a surfactant represented by the following general formula (1):

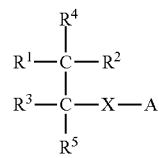

wherein $R^1$ to $R^5$ each represent H or a monovalent substituent, with the proviso that at least one of $R^1$ and $R^3$ represents a group represented by the general formula: $-Y-R^6$ and at least one of $R^2$ and $R^5$ represents a group represented by the general formula: $-X-A$ or a group represented by the general formula: $-Y-R^6$;

X is the same or different at each occurrence and represents a divalent linking group or a bond;

A is the same or different at each occurrence and represents $-COOM$, $-SO_3M$, or $-OSO_2M$, wherein M is H, a metal atom, $NR^7_4$, imidazolium optionally having a substituent, pyridinium optionally having a substituent, or phosphonium optionally having a substituent, wherein $R^7$ is H or an organic group; and Y is the same or different at each occurrence and represents a divalent linking group selected from the group consisting of $-S(=O)_2-$, $-O-$, $-COO-$, $-OCO-$, $-CONR^8-$, and $-NR^8CO-$, or a bond, wherein $R^8$ is H or an organic group;

$R^6$ is the same or different at each occurrence and represents an alkyl group having 2 or more carbon atoms and optionally containing, between carbon atoms, at least one selected from the group consisting of a carbonyl group, an ester group, an amide group, and a sulfonyl group; and any two of $R^1$ to $R^5$ optionally bind to each other to form a ring (hereinafter also referred to as a surfactant (1)).

The surfactant (1) will be described.

In the formula, $R^1$ to $R^5$ each represent H or a monovalent substituent, with the proviso that at least one of $R^1$ and $R^3$ represents a group represented by the general formula: $-Y-R^6$ and at least one of $R^2$ and $R^5$ represents a group represented by the general formula: $-X-A$ or a group represented by the general formula: $-Y-R^6$. Any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^1$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

The monovalent substituent is preferably a group represented by the general formula: —Y—R$^6$, a group represented by the general formula: —X-A, —H, and an alkyl group having 1 to 20 carbon atoms and optionally having a substituent, —NH$_2$, —NHR$^9$ (wherein R$^9$ is an organic group), —OH, —COORS (wherein R$^9$ is an organic group) or —OR$^9$ (R$^9$ is an organic group). The alkyl group preferably has 1 to 10 carbon atoms.

R$^9$ is preferably an alkyl group having 1 to 10 carbon atoms or an alkylcarbonyl group having 1 to 10 carbon atoms, and more preferably an alkyl group having 1 to 4 carbon atoms or an alkylcarbonyl group having 1 to 4 carbon atoms.

In the formula, X is the same or different at each occurrence and represents a divalent linking group or a bond.

When R$^6$ does not contain none of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, —S(=O)$_2$—, —O—, —COO—, —OCO—, —S(=O)$_2$—O—, —O—S(=O)$_2$—, —CONR$^8$—, and —NR$^8$CO—, a C$_{1-10}$ alkylene group, or a bond. R$^8$ represents H or an organic group.

The alkyl group is preferable as the organic group in R$^8$. R$^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

In the formula, A is the same or different at each occurrence and represents —COOM, —SO$_3$M, or —OSO$_3$M, wherein M is H, a metal atom, NR$^7_4$, imidazolium optionally having a substituent, pyridinium optionally having a substituent, or phosphonium optionally having a substituent, wherein R$^7$ is H or an organic group; and the four R$^7$ may be the same as or different from each other. In a preferred embodiment, in the general formula (1), A is —COOM.

The alkyl group is preferable as the organic group in R$^7$. R$^7$ is preferably H or an organic group having 1 to 10 carbon atoms, more preferably H or an organic group having 1 to 4 carbon atoms, and still more preferably H or an alkyl group having 1 to 4 carbon atoms.

Examples of the metal atom include alkali metals (Group 1) and alkaline earth metals (Group 2), and preferred is Na, K, or Li.

M is preferably H, a metal atom, or NR$^7_4$, more preferably H, an alkali metal (Group 1), an alkaline earth metal (Group 2), or NR$^7_4$, still more preferably H, Na, K, Li, or NH$_4$, further preferably Na, K, or NH$_4$, particularly preferably Na or NH$_4$, and most preferably NH$_4$.

In the formula, Y is the same or different at each occurrence and represents a divalent linking group selected from the group consisting of —S(=O)$_2$—, —O—, —COO—, —OCO—, —CONR$^8$—, and —NR$^8$CO—, or a bond, wherein R$^8$ represents H or an organic group.

Y is preferably a divalent linking group selected from the group consisting of a bond, —O—, —COO—, —OCO—, —CONR$^8$—, and —NR$^8$CO—, more preferably a divalent linking group selected from the group consisting of a bond, —COO—, and —OCO—.

The alkyl group is preferable as the organic group in R$^8$. R$^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

In the formula, R$^6$ is the same or different at each occurrence and represents an alkyl group having 2 or more carbon atoms and optionally containing, between carbon atoms, at least one selected from the group consisting of a carbonyl group, an ester group, an amide group, and a sulfonyl group. The organic group represented by R$^6$ preferably has 2 to 20 carbon atoms, more preferably 2 to 10 carbon atoms.

The alkyl group for R$^6$ optionally contains, between carbon atoms, one or two or more of at least one selected from the group consisting of a carbonyl group, an ester group, an amide group, and a sulfonyl group, but the alkyl group contains no such groups at ends. In the alkyl group for R$^6$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

R$^6$ is preferably
- a group represented by the general formula: —R$^{10}$—CO—R$^{11}$,
- a group represented by the general formula: —R$^{10}$—COO—R$^{11}$,
- a group represented by the general formula: —R$^{11}$,
- a group represented by the general formula: —R$^{10}$—NR$^8$CO—R$^{11}$, or
- a group represented by the general formula: —R$^{10}$—CONR$^8$—R$^{11}$,
- wherein R$^8$ is H or an organic group; R$^{10}$ is an alkylene group; and R$^{11}$ is an alkyl group optionally having a substituent.

R$^6$ is more preferably a group represented by the general formula: —R$^{10}$—CO—R$^{11}$.

The alkyl group is preferable as the organic group in R$^8$. R$^8$ is preferably H or an organic group having 1 to 10 carbon atoms, more preferably H or an organic group having 1 to 4 carbon atoms, still more preferably H or an alkyl group having 1 to 4 carbon atoms, and further preferably H.

The alkylene group for R$^{10}$ preferably has 1 or more, and more preferably 3 or more carbon atoms, and preferably 20 or less, more preferably 12 or less, still more preferably 10 or less, and particularly preferably 8 or less carbon atoms. Further, the alkylene group for R$^{10}$ preferably has 1 to 20, more preferably 1 to 10, and still more preferably 3 to 10 carbon atoms.

The alkyl group for R$^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for R$^{11}$ preferably consists only of primary carbons, secondary carbons, and tertiary carbons, and particularly preferably consists only of primary carbons and secondary carbons. In other words, R$^{11}$ is preferably a methyl group, an ethyl group, an n-propyl group, or an isopropyl group, and most preferably a methyl group.

In a preferred embodiment, in the general formula (1), at least one of $R^2$ and $R^5$ is a group represented by the general formula: —X-A, and A is —COOM.

The surfactant (1) is preferably a compound represented by the following general formula (1-1), a compound represented by the following general formula (1-2), or a compound represented by the following general formula (1-3), more preferably a compound represented by the general formula (1-1) or a compound represented by the general formula (1-2):

General Formula (1-1):

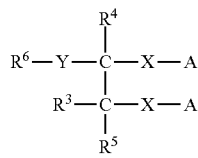

(wherein $R^3$ to $R^6$, X, A, and Y are defined as described above).

General Formula (1-2):

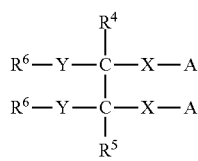

(wherein $R^4$ to $R^6$, X, A, and Y are defined as described above).

General Formula (1-3):

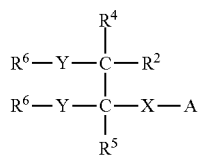

(wherein $R^2$, $R^4$ to $R^6$, X, A, and Y are defined as described above).

The group represented by the general formula: —X-A is preferably
—COOM,
—$R^{12}$COOM,
—$SO_3M$,
—$OSO_3M$, —$R^{12}SO_3M$,
—$R^{12}OSO_3M$,
—OCO—$R^{12}$—COOM,
—OCO—$R^{12}$—$SO_3M$,
—OCO—$R^{12}$—$OSO_3M$
—COO—$R^{12}$—COOM,
—COO—$R^{12}$—$SO_3M$,
—COO—$R^{12}$—$OSO_3M$,
—$CONR^8$—$R^{12}$—COOM,
—$CONR^8$—$R^{12}$—$SO_3M$,
—$CONR^8$—$R^{12}$—$OSO_3M$,
—$NR^8CO$—$R^{12}$—COOM,
—$NR^8CO$—$R^{12}$—$SO_3M$,
—$NR^8CO$—$R^{12}$—$OSO_3M$,
—OS(=O)$_2$—$R^{12}$—COOM,
—OS(=O)$_2$—$R^{12}$—$SO_3M$, or
—OS(=O)$_2$—$R^{12}$—$OSO_3M$ (wherein $R^8$ and M are defined as described above; and $R^{12}$ is an alkylene group having 1 to 10 carbon atoms).

In the alkylene group for $R^{12}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free of halogen atoms such as fluorine atoms and chlorine atoms.

The group represented by the general formula: —Y—$R^6$ is preferably
a group represented by the general formula: —$R^{10}$—CO—$R^{11}$,
a group represented by the general formula: —OCO—$R^{10}$—CO—$R^{11}$,
a group represented by the general formula: —COO—$R^{10}$—CO—$R^{11}$,
a group represented by the general formula: —OCO—$R^{10}$—COO—$R^{11}$,
a group represented by the general formula: —COO—$R^{11}$,
a group represented by the general formula: —$NR^8CO$—$R^{10}$—CO—$R^{11}$, or
a group represented by the general formula: —$CONR^8$—$R^{10}$—$NR^8CO$—$R^{11}$ (wherein $R^8$, $R^{10}$, and $R^{11}$ are as described above).

In the formula, $R^4$ and $R^5$ are each independently preferably H or an alkyl group having 1 to 4 carbon atoms.

In the alkyl group for $R^4$ and $R^5$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the general formula (1-1) is preferably H or an alkyl group having 1 to 20 carbon atoms and optionally having a substituent, more preferably H or an alkyl group having 1 to 20 carbon atoms and having no substituent, and still more preferably H.

In the alkyl group for $R^3$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the general formula (1-3) is preferably H, OH, or an alkyl group having 1 to 20 carbon atoms and optionally having a substituent, more preferably H, OH, or an alkyl group having 1 to 20 carbon atoms and having no substituent, and still more preferably H or OH.

In the alkyl group for $R^2$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

Examples of the hydrocarbon anionic surfactant also include a surfactant (1-0A) represented by the following formula (1-0A):

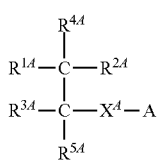

wherein $R^{1A}$ to $R^{5A}$ are H, a monovalent hydrocarbon group optionally containing, between carbon atoms, an ester group, or a group represented by general formula: —$X^A$-A, with the proviso that at least one of $R^{2A}$ or $R^{5A}$ represents a group represented by the general formula: —$X^A$-A;

$X^A$ is the same or different at each occurrence and represents a divalent hydrocarbon group or a bond;

A is the same or different at each occurrence and represents —COOM, wherein M is H, a metal atom, $NR^7{}_4$, imidazolium optionally having a substituent, pyridinium optionally having a substituent, or phosphonium optionally having a substituent, wherein $R^7$ is H or an organic group; and any two of $R^{1A}$ to $R^{5A}$ may be bonded to each other to form a ring.

In the general formula (1-0A), in $R^{1A}$ to $R^{5A}$, the monovalent hydrocarbon group optionally containing, between carbon atoms, an ester group preferably has 1 to 50 carbon atoms, and more preferably 5 to 20 carbon atoms. Any two of $R^{1A}$ to $R^{5A}$ optionally bind to each other to form a ring. The monovalent hydrocarbon group optionally containing, between carbon atoms, an ester group is preferably an alkyl group.

In the formula, in $X^A$, the number of carbon atoms in the divalent hydrocarbon group is 1 to 50, and more preferably 5 to 20. Examples of the divalent hydrocarbon group include an alkylene group and an alkanediyl group, and preferred is an alkylene group.

In the general formula (1-0A), any one of $R^{2A}$ and $R^{5A}$ is preferably a group represented by the formula: —$X^A$-A, and more preferably, $R^{2A}$ is a group represented by the formula: —$X^A$-A.

In a preferred embodiment, in the general formula (1-0A), $R^{2A}$ is a group represented by the general formula: —$X^A$-A, and $R^{1A}$, $R^{3A}$, $R^{4A}$ and $R^{5A}$ are H. In this case, $X^A$ is preferably a bond or an alkylene group having 1 to 5 carbon atoms.

Another preferred embodiment is an embodiment in which in general formula (1-0A), $R^{2A}$ is a group represented by general formula: —$X^A$-A, $R^{1A}$ and $R^{3A}$ are groups represented by —$Y^A$—$R^6$, $Y^A$ is the same or different at each occurrence, and is —COO—, —OCO—, or a bond, and $R^6$ is the same or different at each occurrence, and is an alkyl group having 2 or more carbon atoms. In this case, it is preferable that $R^{4A}$ and $R^{5A}$ are H.

Examples of the hydrocarbon anionic surfactant represented by the general formula (1-0A) include glutaric acid or a salt thereof, adipic acid or a salt thereof, pimelic acid or a salt thereof, suberic acid or a salt thereof, azelaic acid or a salt thereof, and sebacic acid or a salt thereof.

The aliphatic carboxylic acid-type hydrocarbon surfactant represented by the general formula (1-0A) may be a 2-chain 2-hydrophilic type synthetic surfactant, and examples of the gemini type surfactant include geminiserf (CHUKYO YUSHI CO., LTD.), Gemsurf α142 (carbon number: 12, lauryl group), Gemsurf α102 (carbon number: 10), and Gemsurf α182 (carbon number: 14).

Examples of the hydrocarbon anionic surfactant also include a hydrocarbon anionic surfactant having one or more carbonyl groups which are not in a carboxyl group.

Further, a hydrocarbon anionic surfactant obtained by subjecting the hydrocarbon anionic surfactant having one or more carbonyl groups which are not in a carboxyl group to a radical treatment or an oxidation treatment may also be used.

The radical treatment may be any treatment that generates radicals in the hydrocarbon anionic surfactant having one or more carbonyl groups which are not in carboxyl group, for example, a treatment in which deionized water and the hydrocarbon anionic surfactant are added to the reactor, the reactor is sealed, the system is purged with nitrogen, the reactor is heated and pressurized, a polymerization initiator is charged, the reactor is stirred for a certain time, and then the pressure is released until the pressure in the reactor decreases to the atmospheric pressure, and the reactor is cooled. The oxidation treatment is a treatment in which an oxidizing agent is added to a hydrocarbon anionic surfactant having one or more carbonyl groups which are not in a carboxyl group. Examples of the oxidizing agent include oxygen, ozone, hydrogen peroxide solution, manganese(IV) oxide, potassium permanganate, potassium dichromate, nitric acid, and sulfur dioxide.

The hydrocarbon anionic surfactant having one or more carbonyl groups which are not in a carboxyl group is preferably a surfactant represented by the formula: R—X, wherein R is a fluorine-free organic group having one or more carbonyl groups which are not in a carboxyl group and having 1 to 2,000 carbon atoms, X is, —$OSO_3X^1$, —$COOX^1$, or —$SO_3X^1$, wherein $X^1$ is H, a metal atom, $NR^1{}_4$, imidazolium optionally having a substituent, pyridinium optionally having a substituent, or phosphonium optionally having a substituent, wherein $R^1$ is H or an organic group and may be the same or different. R preferably has 500 or less carbon atoms, more preferably 100 or less, still more preferably 50 or less, and further preferably 30 or less.

The hydrocarbon anionic surfactant is more preferably at least one selected from the group consisting of a surfactant represented by the following formula (a):

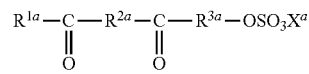

wherein $R^{1a}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2a}$ and $R^{3a}$ are each independently a single bond or a divalent linking group; the total number of carbon atoms of $R^{1a}$, $R^{2a}$, and $R^{3a}$ is 6 or more; $X^a$ is H, a metal atom, $NR^{4a}{}_4$, imidazolium optionally having a substituent, pyridinium optionally having a substituent, or phosphonium optionally having a substituent, wherein $R^{4a}$ is H or an organic group and may be the same or different; and any two of $R^{1a}$, $R^{2a}$, and $R^{3a}$ optionally bind to each other to form a ring;

a surfactant (b) represented by the following formula (b):

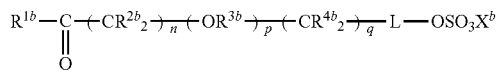

wherein $R^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2b}$ and $R^{4b}$ are each independently H or a substituent; $R^{3b}$ is an alkylene group having 1 to 10 carbon atoms and optionally having a substituent; n is an integer of 1 or more; p and q are each independently an integer of 0 or more; $X^b$ is H, a metal atom, $NR^{5b}_4$, imidazolium optionally having a substituent, pyridinium optionally having a substituent, or phosphonium optionally having a substituent, wherein $R^{5b}$ is H or an organic group and may be the same or different; any two of $R^{1b}$, $R^{2b}$, $R^{3b}$, and $R^{4b}$ optionally bind to each other to form a ring; L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, wherein B is a single bond or an alkylene group having 1 to 10 carbon atoms and optionally having a substituent, $R^{6b}$ is H or an alkyl group having 1 to 4 carbon atoms and optionally having a substituent; and indicates the side bonded to —$OSO_3X^b$ in the formula;

a surfactant (c) presented by the following formula (c):

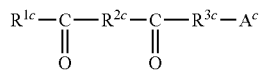

wherein $R^{1c}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; $R^{2c}$ and $R^{3c}$ are each independently a single bond or a divalent linking group; the total number of carbon atoms of $R^{1c}$, $R^{2c}$, and $R^{3c}$ is 5 or more; $A^c$ is —$COOX^c$ or —$SO_2X^c$, wherein $X^c$ is H, a metal atom, $NR^{4c}_4$, imidazolium optionally having a substituent, pyridinium optionally having a substituent, or phosphonium optionally having a substituent, wherein $R^{4c}$ is H or an organic group and may be the same or different; and any two of $R^{1c}$, $R^{2c}$, and $R^{3c}$ optionally bind to each other to form a ring; and a surfactant (d) represented by the following formula (d):

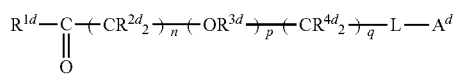

wherein $R^{1d}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2d}$ and $R^{4d}$ are each independently H or a substituent; $R^{3d}$ is an alkylene group having 1 to 10 carbon atoms and optionally having a substituent; n is an integer of 1 or more; p and q are each independently an integer of 0 or more; $A^d$ is —$SO_2X^d$ or —$COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different; any two of $R^{1d}$, $R^{2d}$, $R^{3d}$, and $R^{4d}$ optionally bind to each other to form a ring; L is a single bond, —$CO_2$—B—*, —OCO—B—*, —$CONR^{6c}$—B—*, —$NR^{6d}CO$—B—*, or —CO— other than the carbonyl groups in —$CO_2$—B—, —OCO—B—, —$CONR^{6d}$—B—, and —$NR^{6d}CO$—B—, wherein B is a single bond or an alkylene group having 1 to 10 carbon atoms and optionally having a substituent, $R^{6d}$ is H or an alkyl group having 1 to 4 carbon atoms and optionally having a substituent; and indicates the side bonded to $A^d$ in the formula.

The surfactant (a) is described below.

In the formula (a), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group (—C(=O)—) between two carbon atoms. When having 2 or more carbon atoms, the alkyl group optionally contains the carbonyl group at an end of the alkyl group. In other words, acyl groups such as an acetyl group represented by $CH_3$—C(=O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(=O)—$CH_2$— is 3, the number of carbon atoms in the group represented by $CH_3$—C(=O)—$C_2H_4$—C(=O)—$C_2H_4$— is 7, and the number of carbon atoms in the group represented by $CH_3$—C(=O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{101a}$, wherein $R^{101a}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula, $R^{2a}$ and $R^{3a}$ are each independently a single bond or a divalent linking group.

Preferably, $R^{2a}$ and $R^{3a}$ are each independently a single bond, or a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{102a}$, wherein $R^{102a}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1a}$, $R^{2a}$, and $R^{3a}$ is 6 or more. The total number of carbon atoms is preferably 8 or more, more preferably 9 or more, still more preferably 10 or more, and preferably 20 or less, more preferably 18 or less, still more preferably 15 or less.

Any two of $R^{1a}$, $R^{2a}$, and $R^{3a}$ optionally bind to each other to form a ring.

In the formula (α), $X^a$ is H, a metal atom, $NR^{4a}_4$, imidazolium optionally having a substituent, pyridinium optionally having a substituent, or phosphonium optionally having a substituent, wherein $R^{4a}$ is H or an organic group. The four $R^{4a}$ may be the same as or different from each other. $R^{4a}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the solubility of the surfactant in an aqueous medium is excellent, and the metal component is unlikely to remain in the PTFE or the final product.

$R^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1a}$ is more preferably a group represented by the following formula:

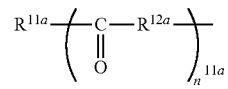

wherein $n^{11a}$ is an integer of 0 to 10; $R^{11a}$ is a linear or branched alkyl group having 1 to 5 carbon atoms or a cyclic alkyl group having 3 to 5 carbon atoms; $R^{12a}$ is an alkylene group having 0 to 3 carbon atoms; and when $n^{11a}$ is an integer of 2 to 10, each $R^{12a}$ may be the same or different.

$n^{11a}$ is preferably an integer of 0 to 5, more preferably an integer of 0 to 3, and still more preferably an integer of 1 to 3.

The alkyl group for $R^{11a}$ is preferably free from a carbonyl group.

In the alkyl group for $R^{11a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103a}$, wherein $R^{103a}$ is an alkyl group.

In the alkyl group for $R^{11a}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12a}$ is an alkylene group having 0 to 3 carbon atoms. The alkylene group preferably has 1 to 3 carbon atoms.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—), In the alkylene group for $R^{12a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104a}$, wherein $R^{104a}$ is an alkyl group.

In the alkylene group for $R^{12a}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2a}$ and $R^{3a}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (α) include the following surfactants. In each formula, $X^a$ is defined as described above.

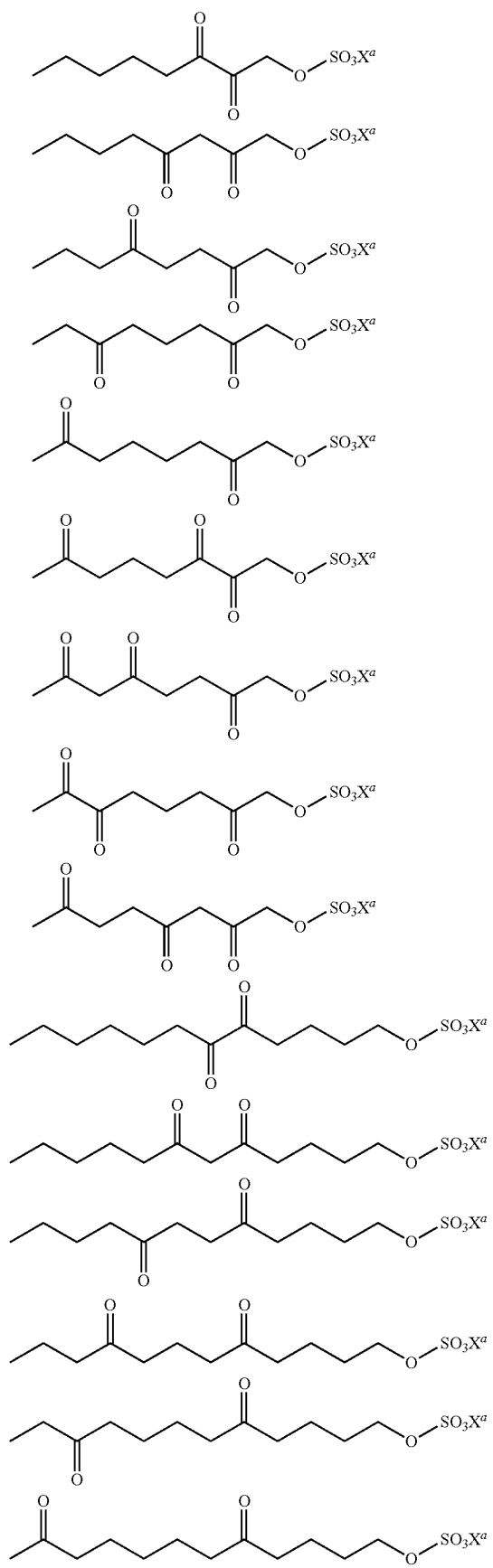
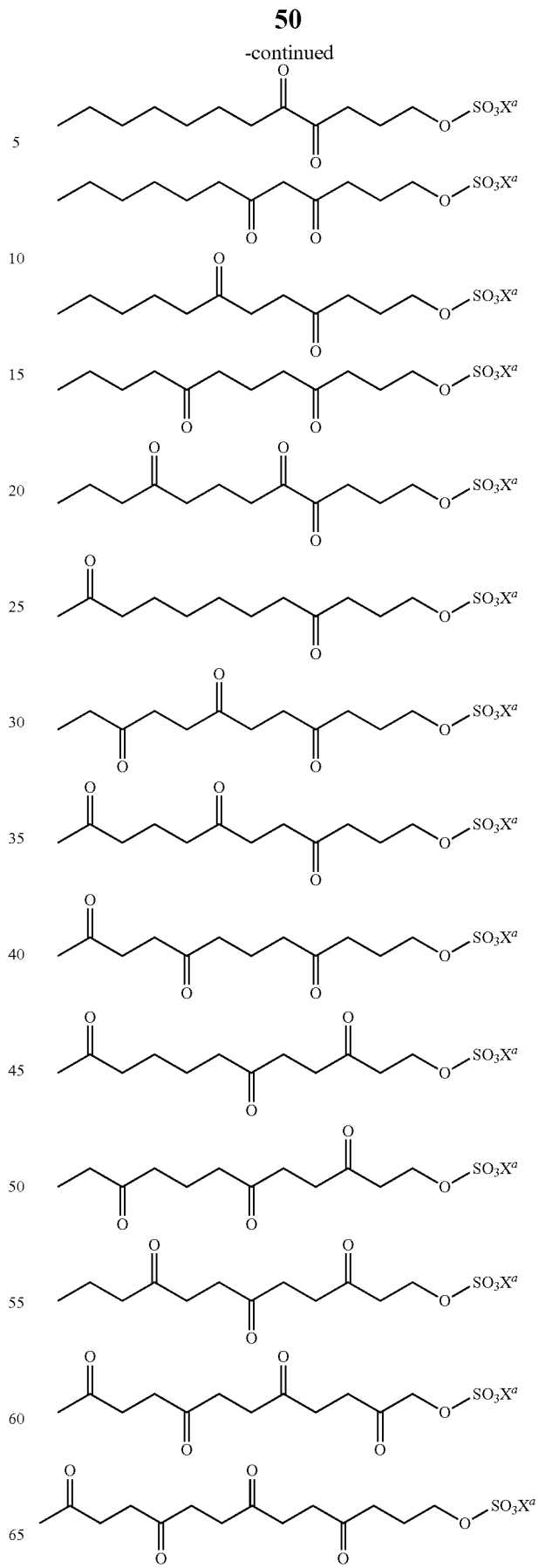
-continued

-continued
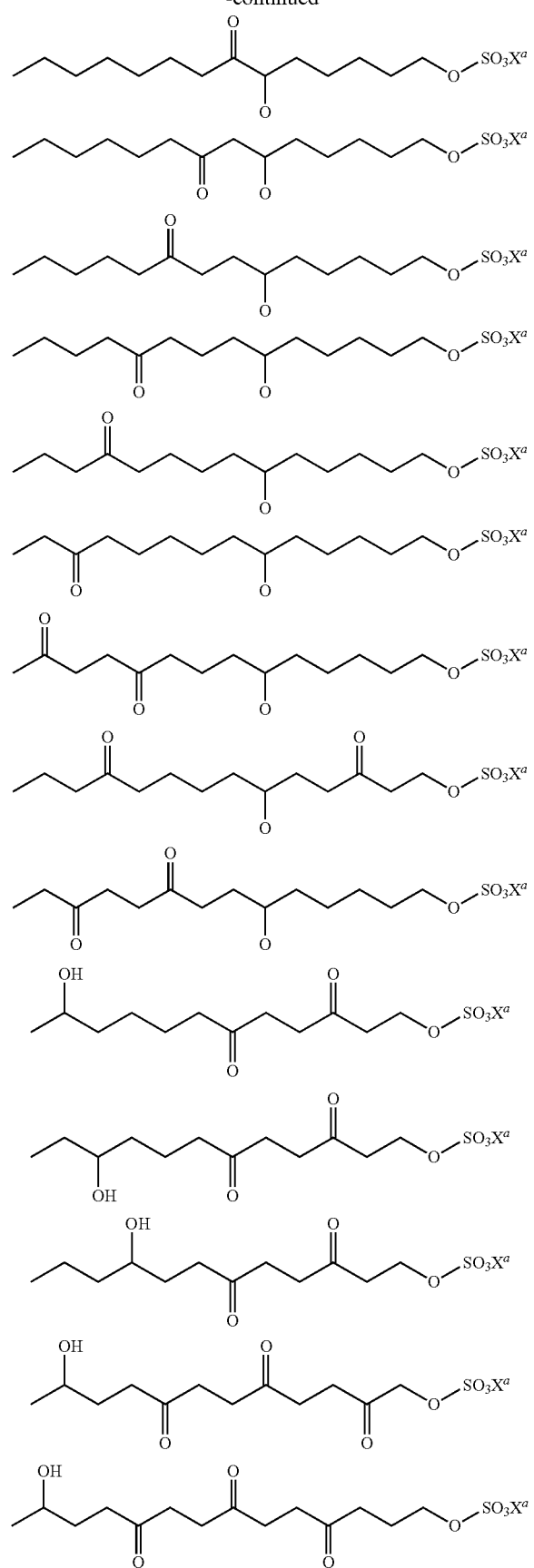
-continued
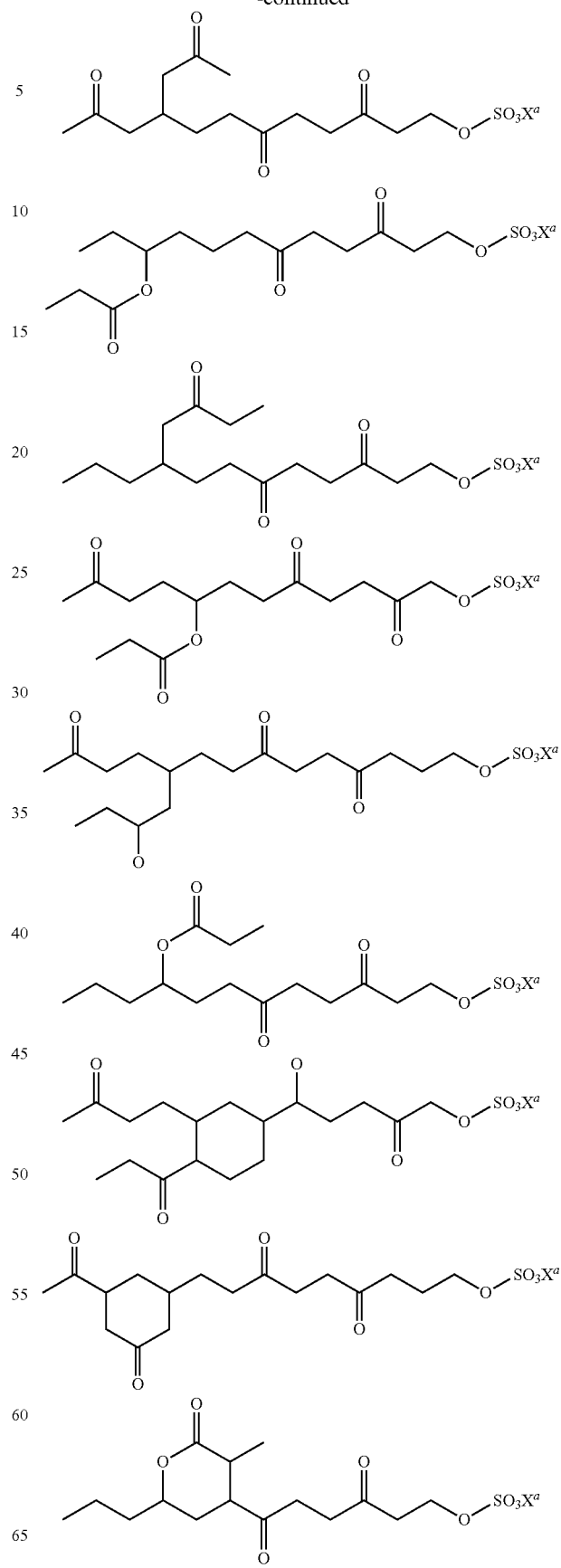

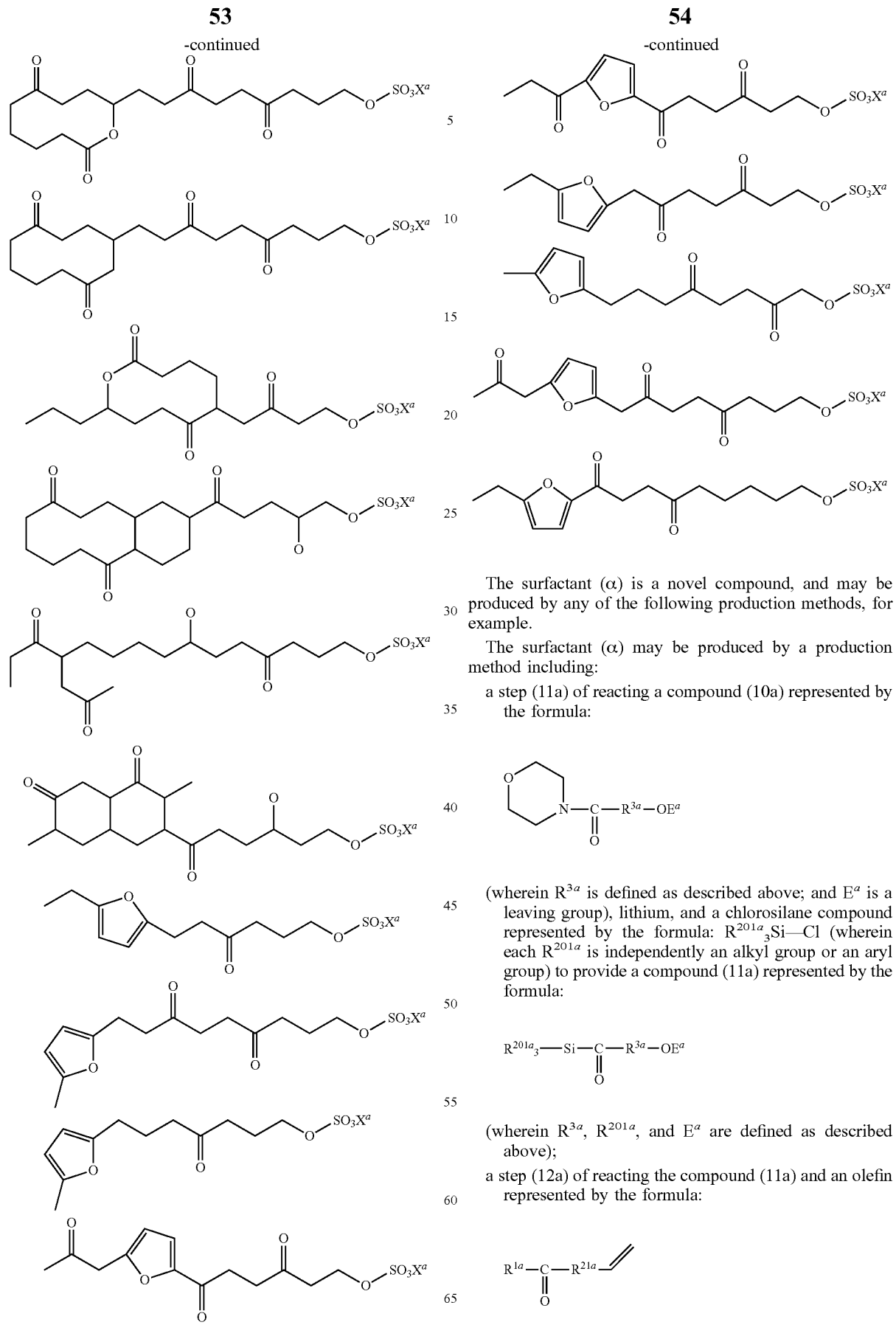

The surfactant (α) is a novel compound, and may be produced by any of the following production methods, for example.

The surfactant (α) may be produced by a production method including:

a step (11a) of reacting a compound (10a) represented by the formula:

$$\text{morpholine-N}-\underset{\underset{O}{\|}}{C}-R^{3a}-OE^a$$

(wherein $R^{3a}$ is defined as described above; and $E^a$ is a leaving group), lithium, and a chlorosilane compound represented by the formula: $R^{201a}_3\text{Si}-\text{Cl}$ (wherein each $R^{201a}$ is independently an alkyl group or an aryl group) to provide a compound (11a) represented by the formula:

$$R^{201a}_3-\text{Si}-\underset{\underset{O}{\|}}{C}-R^{3a}-OE^a$$

(wherein $R^{3a}$, $R^{201a}$, and $E^a$ are defined as described above);

a step (12a) of reacting the compound (11a) and an olefin represented by the formula:

$$R^{1a}-\underset{\underset{O}{\|}}{C}-R^{21a}\diagup$$

(wherein $R^{1a}$ is defined as described above; and $R^{21a}$ is a single bond or a divalent linking group) to provide a compound (12a) represented by the formula:

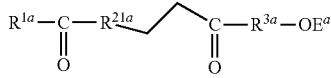

(wherein $R^{1a}$, $R^{21a}$, $R^{3a}$, and $E^a$ are defined as described above);

a step (13a) of eliminating the leaving group in the compound (12a) to provide a compound (13a) represented by the formula:

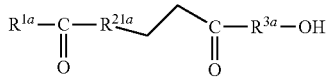

(wherein $R^{1a}$, $R^{21a}$, and $R^{3a}$ are defined as described above); and a step (14a) of reacting the compound (13a) and a chlorosulfonic acid represented by the formula:

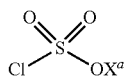

(wherein $X^a$ is defined as described above) to provide a compound (14a) represented by the formula:

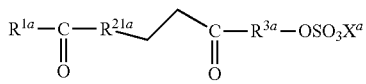

wherein $R^{1a}$, $R^{21a}$, $R^{3a}$, and $X^a$ are defined as described above.

When $R^{1a}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

In the step (11a), it is preferable that lithium and the chlorosilane compound are reacted in advance to obtain a syroxylithium compound, and then the syroxylithium compound and the compound (10a) are reacted to obtain the compound (11a).

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{21a}$ is preferably a single bond or a linear or branched alkylene group having 1 or more carbon atoms.

Examples of the chlorosilane compound include:

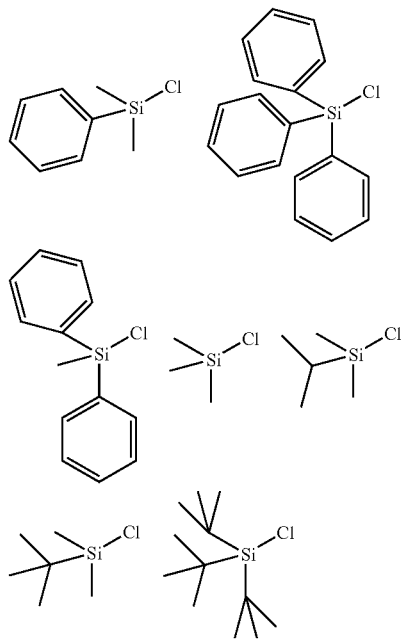

Any of the reactions in the step (11a) may be performed in a solvent. The solvent is preferably an organic solvent, more preferably an aprotic polar solvent, and still more preferably an ether. Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature of lithium and the chlorosilane compound in the step (11a) is preferably 10 to 40° C., and more preferably 20 to 30° C.

The reaction temperature of the siloxylithium compound and the compound (10a) in the step (11a) is preferably −100 to 0° C., and more preferably −80 to −50° C.

The reaction pressure of lithium and the chlorosilane compound in the step (11a) is preferably 0.1 to 5 MPa, and more preferably 0.1 to 1 MPa.

The reaction pressure of the siloxylithium compound and the compound (10a) in the step (11a) is preferably 0.1 to 5 MPa, and more preferably 0.1 to 1 MPa.

The reaction time of lithium and the chlorosilane compound in the step (11a) is preferably 0.1 to 72 hours, and more preferably 6 to 10 hours.

The reaction time of the siloxylithium compound and the compound (10a) in the step (11a) is preferably 0.1 to 72 hours, and more preferably 1 to 2 hours.

Regarding the reaction ratio between the compound (11a) and the olefin in the step (12a), the amount of the olefin is preferably 1 to 2 mol, and more preferably 1 to 1.1 mol, based on 1 mol of the compound (11a) in consideration of the improvement of the yield and the reduction of the waste.

The reaction in the step (12a) may be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent is preferably an organic solvent, more preferably an aprotic polar solvent, and still more preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (12a) is preferably 40 to 60° C., and more preferably 50 to 55° C.

The reaction pressure in the step (12a) is preferably 0.1 to 5 MPa, and more preferably 0.1 to 1 MPa.

The reaction duration in the step (12a) is preferably 0.1 to 72 hours, and more preferably 6 to 10 hours.

The elimination reaction for the leaving group in the step (13a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF$_4$), or ammonium fluoride; and a method using an organic salt such as tetrabutylammonium fluoride (TBAF).

The elimination reaction for the leaving group in the step (13a) may be performed in a solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (13a) is preferably 0 to 40° C., and more preferably 0 to 20° C.

The reaction pressure in the step (13a) is preferably 0.1 to 5 MPa, and more preferably 0.1 to 1 MPa.

The reaction duration in the step (13a) is preferably 0.1 to 72 hours, and more preferably 3 to 8 hours.

Regarding the reaction ratio between the compound (13a) and the chlorosulfonic acid in the step (14a), the amount of the chlorosulfonic acid is preferably 1 to 2 mol, and more preferably 1 to 1.1 mol, based on 1 mol of the compound (13a) in consideration of the improvement of the yield and the reduction of the waste.

The reaction in the step (14a) is preferably performed in the presence of a base. Examples of the base include alkali metal hydroxides, alkaline earth metal hydroxides, and amines, of which amines are preferred.

Examples of the amines in the step (14a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Of these, triethylamine and pyridine are preferred.

The amount of the base used in the step (14a) is preferably 1 to 2 mol, and more preferably 1 to 1.1 mol, based on 1 mol of the compound (13a) in consideration of the improvement of the yield and the reduction of the waste.

The reaction in the step (14a) may be performed in a polar solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which diethyl ether is preferred.

The reaction temperature in the step (14a) is preferably 0 to 40° C., and more preferably 0 to 20° C.

The reaction pressure in the step (14a) is preferably 0.1 to 5 MPa, and more preferably 0.1 to 1 MPa.

The reaction duration in the step (14a) is preferably 0.1 to 72 hours, and more preferably 3 to 12 hours.

When the reaction in step (14a) is performed in a solvent, a solution containing compound (14a) is obtained after the reaction is completed. High-purity compound (14a) may be recovered by adding water to the above solution, allowing it to stand to separate it into two phases, recovering the aqueous phase, and distilling off the solvent. When the compound (14a) has a group represented by —OSO$_3$H (that is, when X is H), it is also possible to convert the —OSO$_3$H to sulfate groups by using an alkaline aqueous solution such as aqueous sodium hydrogen carbonate or aqueous ammonia instead of water.

After the completion of each step, the solvent may be distilled off, or distillation, purification or the like may be performed to increase the purity of each resulting compound.

The surfactant (α) may also be produced by a production method including:

a step (21a) of reacting a ketone represented by the formula:

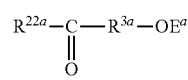

(wherein $R^{3a}$ is defined as described above; $R^{22a}$ is a monovalent organic group; and $E^a$ is a leaving group) and a carboxylate represented by the formula:

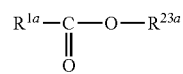

(wherein $R^{1a}$ is defined as described above; and $R^{23a}$ is a monovalent organic group) to provide a compound (21a) represented by the formula:

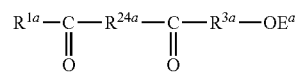

(wherein $R^{1a}$, $R^{3a}$, and $E^a$ are defined as described above; and $R^{24a}$ is a single bond or a divalent linking group);

a step (22a) of eliminating the leaving group in the compound (21a) to provide a compound (22a) represented by the formula:

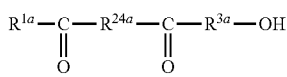

(wherein $R^{1a}$, $R^{24a}$, and $R^{3a}$ are defined as described above); and a step (23a) of reacting the compound (22a) and a chlorosulfonic acid represented by the formula:

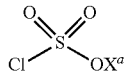

(wherein $X^a$ is defined as described above) to provide a compound (23a) represented by the formula:

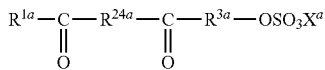

(wherein $R^{1a}$, $R^{24a}$, $R^{3a}$, and $X^a$ are defined as described above).

When $R^{1a}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{22a}$ is preferably a linear or branched alkyl group having 1 or more carbon atoms, and more preferably a methyl group.

$R^{23a}$ is preferably a linear or branched alkyl group having 1 or more carbon atoms, and more preferably a methyl group.

$R^{24a}$ is preferably a linear or branched alkylene group having 1 or more carbon atoms, and more preferably a methylene group (—$CH_2$—).

The reaction in the step (21a) may be performed in a solvent in the presence of a base.

Examples of the base include sodium amide, sodium hydride, sodium methoxide, and sodium ethoxide.

The solvent is preferably an organic solvent, more preferably an aprotic polar solvent, and still more preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (21a) is preferably 0 to 40° C., and more preferably 0 to 20° C.

The reaction pressure in the step (21a) is preferably 0.1 to 5 MPa, and more preferably 0.1 to 1 MPa.

The reaction duration in the step (21a) is preferably 0.1 to 72 hours, and more preferably 3 to 8 hours.

The elimination reaction for the leaving group in the step (22a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (22a) may be performed in a solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (22a) is preferably 0 to 40° C., and more preferably 0 to 20° C.

The reaction pressure in the step (22a) is preferably 0.1 to 5 MPa, and more preferably 0.1 to 1 MPa.

The reaction duration in the step (22a) is preferably 0.1 to 72 hours, and more preferably 3 to 8 hours.

Regarding the reaction ratio between the compound (22a) and the chlorosulfonic acid in the step (23a), the amount of the chlorosulfonic acid is preferably 1 to 2 mol, and more preferably 1 to 1.1 mol, based on 1 mol of the compound (22a) in consideration of the improvement of the yield and the reduction of the waste.

The reaction in the step (23a) is preferably performed in the presence of a base. Examples of the base include alkali metal hydroxides, alkaline earth metal hydroxides, and amines, of which amines are preferred.

Examples of the amines in the step (23a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Of these, triethylamine and pyridine are preferred.

The amount of the base used in the step (23a) is preferably 1 to 2 mol, and more preferably 1 to 1.1 mol, based on 1 mol of the compound (22a) in consideration of the improvement of the yield and the reduction of the waste.

The reaction in the step (23a) may be performed in a polar solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which diethyl ether is preferred.

The reaction temperature in the step (23a) is preferably 0 to 40° C., and more preferably 0 to 20° C.

The reaction pressure in the step (23a) is preferably 0.1 to 5 MPa, and more preferably 0.1 to 1 MPa.

The reaction duration in the step (23a) is preferably 0.1 to 72 hours, and more preferably 3 to 12 hours.

When the reaction in step (23a) is performed in a solvent, a solution containing compound (23a) is obtained after the reaction is completed. High-purity compound (23a) may be recovered by adding water to the above solution, allowing it to stand to separate it into two phases, recovering the aqueous phase, and distilling off the solvent. When the compound (23a) has a group represented by —OSO$_3$H (that is, when X is H), it is also possible to convert the —OSO$_3$H to sulfate groups by using an alkaline aqueous solution such as aqueous sodium hydrogen carbonate or aqueous ammonia instead of water.

After the completion of each step, the solvent may be distilled off, or distillation, purification or the like may be performed to increase the purity of each resulting compound.

The surfactant (α) may also be produced by a production method including:

a step (31a) of reacting an alkyl halide represented by the formula: Y$^a$—R$^{3a}$—OE$^a$ (wherein R$^{3a}$ is defined as described above; Y$^a$ is a halogen atom; and E$^a$ is a leaving group) and lithium acetylide represented by the formula:

(wherein R$^{1a}$ is defined as described above) to provide a compound (31a) represented by the formula:

(wherein R$^{1a}$, R$^{3a}$, and E$^a$ are defined as described above);

a step (32a) of oxidizing the compound (31a) to provide a compound (32a) represented by the formula:

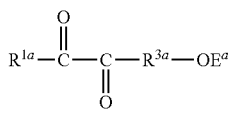

(wherein R$^{1a}$, R$^{3a}$, and E$^a$ are defined as described above);

a step (33a) of eliminating the leaving group in the compound (32a) to provide a compound (33a) represented by the formula:

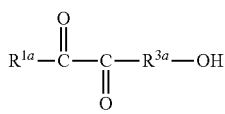

(wherein R$^{1a}$ and R$^{3a}$ are defined as described above); and a step (34a) of reacting the compound (33a) and a chlorosulfonic acid represented by the formula:

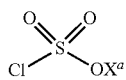

(wherein X$^a$ is defined as described above) to provide a compound (42a) represented by the formula:

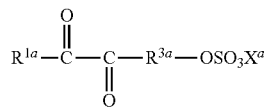

(wherein R$^{1a}$, R$^{3a}$, and X$^a$ are defined as described above).

When R$^{1a}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

E$^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

Regarding the reaction ratio between the alkyl halide and the lithium acetylide in the step (31a), the lithium acetylide is preferably used in an amount of 1 to 2 mol, and more preferably 1 to 1.2 mol, based on 1 mol of the alkyl halide in consideration of the improvement of the yield and the reduction of the waste.

The reaction in the step (31a) may be performed in a solvent. Hexane is preferable as the solvent.

The reaction temperature in the step (31a) is preferably −100 to −40° C., and more preferably −80 to −50° C.

The reaction pressure in the step (31a) is preferably 0.1 to 5 MPa, and more preferably 0.1 to 1 MPa.

The reaction duration in the step (31a) is preferably 0.1 to 72 hours, and more preferably 6 to 10 hours.

The oxidation in the step (32a) may be performed in a nitrile solvent using a complex generated by treating [(Cn*)Ru$^{III}$(CF$_3$CO$_2$)$_3$]·H$_2$O (wherein Cn* is 1,4,7-trimethyl-1,4,7-triazabicyclononane) with (NH$_4$)$_2$Ce(NO$_3$)$_6$ and trifluoroacetic acid and then adding sodium perchlorate thereto.

After the completion of the oxidation, the product may be neutralized with an alkali, and then an organic solvent such as an ether may be used to extract the compound (32a).

The reaction temperature in the step (32a) is preferably 30 to 100° C., and more preferably 40 to 90° C.

The reaction pressure in the step (32a) is preferably 0.1 to 5 MPa, and more preferably 0.1 to 1 MPa.

The reaction duration in the step (32a) is preferably 0.1 to 72 hours, and more preferably 3 to 8 hours.

The elimination reaction for the leaving group in the step (33a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF$_4$), or ammonium fluoride; and a method using an organic salt such as tetrabutylammonium fluoride (TBAF).

The elimination reaction for the leaving group in the step (33a) may be performed in a solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (33a) is preferably 0 to 40° C., and more preferably 0 to 20° C.

The reaction pressure in the step (33a) is preferably 0.1 to 5 MPa, and more preferably 0.1 to 1 MPa.

The reaction duration in the step (33a) is preferably 0.1 to 72 hours, and more preferably 3 to 8 hours.

Regarding the reaction ratio between the compound (33a) and the chlorosulfonic acid in the step (34a), the amount of the chlorosulfonic acid is preferably 1 to 2 mol, and more preferably 1 to 1.1 mol, based on 1 mol of the compound (33a) in consideration of the improvement of the yield and the reduction of the waste.

The reaction in the step (34a) is preferably performed in the presence of a base. Examples of the base include alkali metal hydroxides, alkaline earth metal hydroxides, and amines, of which amines are preferred.

Examples of the amines in the step (34a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Of these, triethylamine and pyridine are preferred.

The amount of the base used in the step (34a) is preferably 1 to 2 mol, and more preferably 1 to 1.1 mol, based on 1 mol of the compound (33a) in consideration of the improvement of the yield and the reduction of the waste.

The reaction in the step (34a) may be performed in a polar solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which diethyl ether is preferred.

The reaction temperature in the step (34a) is preferably 0 to 40° C., and more preferably 0 to 20° C.

The reaction pressure in the step (34a) is preferably 0.1 to 5 MPa, and more preferably 0.1 to 1 MPa.

The reaction duration in the step (34a) is preferably 0.1 to 72 hours, and more preferably 3 to 12 hours.

When the reaction in step (34a) is performed in a solvent, a solution containing compound (34a) is obtained after the reaction is completed. High-purity compound (34a) may be recovered by adding water to the above solution, allowing it to stand to separate it into two phases, recovering the aqueous phase, and distilling off the solvent. When the compound (34a) has a group represented by —OSO$_3$H (that is, when X is H), it is also possible to convert the —OSO$_3$H to sulfate groups by using an alkaline aqueous solution such as aqueous sodium hydrogen carbonate or aqueous ammonia instead of water.

After the completion of each step, the solvent may be distilled off, or distillation, purification or the like may be performed to increase the purity of each resulting compound.

The surfactant (α) may also be produced by a production method including:

a step (41a) of reacting an alkene represented by the formula:

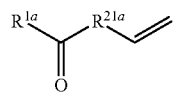

(wherein $R^{1a}$ is defined as described above; and $R^{21a}$ is a single bond or a divalent linking group) and an alkyne represented by the formula:

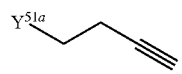

(wherein $Y^{51a}$ is an alkoxyl group) to provide a compound (41a) represented by the formula:

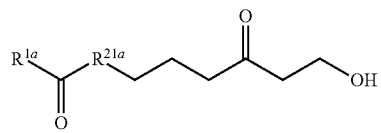

(wherein $R^{1a}$ and $R^{21a}$ are defined as mentioned above); and a step (42a) of reacting the compound (41a) and a chlorosulfonic acid represented by the formula:

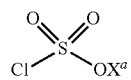

(wherein $X^a$ is defined as described above) to provide a compound (23a) represented by the formula:

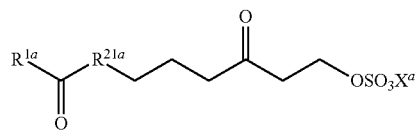

(wherein $R^{1a}$, $R^{21a}$, and $X^a$ are defined as described above).

When $R^{1a}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

$R^{21a}$ is preferably a single bond or a linear or branched alkylene group having 1 or more carbon atoms.

Regarding the reaction ratio between the alkene and the alkyne in the step (41a), the alkene is preferably used in an amount of 0.5 to 2 mol, and more preferably 0.6 to 1.2 mol, based on 1 mol of the alkyne in consideration of the improvement of the yield and the reduction of the waste.

The reaction in the step (41a) is preferably performed in the presence of a metal catalyst. An example of the metal is ruthenium.

The amount of the metal catalyst used in the step (41a) is preferably 0.01 to 0.4 mol, and more preferably 0.05 to 0.1 mol, based on 1 mol of the alkene in consideration of the improvement of the yield and the reduction of the waste.

The reaction in the step (41a) may be performed in a polar solvent. The solvent is preferably water, acetonitrile, dimethylacetamide, or dimethylformamide.

The reaction temperature in the step (41a) is preferably 20 to 160° C., and more preferably 40 to 140° C.

The reaction pressure in the step (41a) is preferably 0.1 to 5 MPa, and more preferably 0.1 to 1 MPa.

The reaction duration in the step (41a) is preferably 0.1 to 72 hours, and more preferably 4 to 8 hours.

Regarding the reaction ratio between the compound (41a) and the chlorosulfonic acid in the step (42a), the amount of the chlorosulfonic acid is preferably 1 to 2 mol, and more preferably 1 to 1.1 mol, based on 1 mol of the compound (41a) in consideration of the improvement of the yield and the reduction of the waste.

The reaction in the step (42a) is preferably performed in the presence of a base. Examples of the base include alkali metal hydroxides, alkaline earth metal hydroxides, and amines, of which amines are preferred.

Examples of the amines in the step (42a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Of these, triethylamine and pyridine are preferred.

The amount of the base used in the step (42a) is preferably 1 to 2 mol, and more preferably 1 to 1.1 mol, based on 1 mol of the compound (41a) in consideration of the improvement of the yield and the reduction of the waste.

The reaction in the step (42a) may be performed in a polar solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which diethyl ether is preferred.

The reaction temperature in the step (42a) is preferably 0 to 40° C., and more preferably 0 to 20° C.

The reaction pressure in the step (42a) is preferably 0.1 to 5 MPa, and more preferably 0.1 to 1 MPa.

The reaction duration in the step (42a) is preferably 0.1 to 72 hours, and more preferably 3 to 12 hours.

When the reaction in step (42a) is performed in a solvent, a solution containing compound (42a) is obtained after the reaction is completed. High-purity compound (42a) may be recovered by adding water to the above solution, allowing it to stand to separate it into two phases, recovering the aqueous phase, and distilling off the solvent. When the compound (42a) has a group represented by —OSO$_3$H (that is, when X is H), it is also possible to convert the —OSO$_3$H to sulfate groups by using an alkaline aqueous solution such as aqueous sodium hydrogen carbonate or aqueous ammonia instead of water.

After the completion of each step, the solvent may be distilled off, or distillation, purification or the like may be performed to increase the purity of each resulting compound.

Next, the surfactant (b) is described below.

In the formula (b), $R^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group (—CH$_3$) or an ethyl group (—C$_2$H$_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, still more preferably H, a methyl group (—CH$_3$), or an ethyl group (—C$_2$H$_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group (—CH$_2$—), an ethylene group (—C$_2$H$_4$—), an isopropylene group (—CH(CH$_3$)CH$_2$—), or a propylene group (—C$_3$H$_6$—).

Any two of $R^{1b}$, $R^{2b}$, $R^{3b}$, and $R^{4b}$ optionally bind to each other to form a ring, but preferably not to form a ring.

In the formula (b), n is an integer of 1 or more. In the formula, n is preferably an integer of 1 to 40, more preferably an integer of 1 to 30, still more preferably an integer of 5 to 25, and particularly preferably an integer of 5 to 9 and 11 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 5 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $X^b$ is H, a metal atom, $NR^{5b}_4$, imidazolium optionally having a substituent, pyridinium optionally having a substituent, or phosphonium optionally having a substituent, wherein $R^{5b}$ is H or an organic group. The four $R^{5b}$ may be the same as or different from each other. $R^{5b}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or NH$_4$ because they are easily dissolved in water, still more preferably Na, K, or NH$_4$ because they are more easily dissolved in water, particularly preferably Na or NH$_4$, and most preferably NH$_4$ because it can be easily removed. When $X^b$ is NH$_4$, the solubility of the surfactant in an aqueous medium is excellent, and the metal component is unlikely to remain in the PTFE or the final product.

In the formula (b), L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^6$—B—, and —NR$^{6b}$CO—B—, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^{6b}$ is more preferably H or a methyl group; and indicates the side bonded to —OSO$_3$X$^b$ in the formula.

L is preferably a single bond.

The surfactant (b) is preferably a compound represented by the following formula:

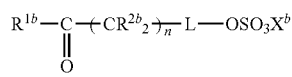

(wherein $R^{1b}$, $R^{2b}$, L, n, and $X^b$ are defined as described above).

The surfactant (b) preferably has a $^1$H-NMR spectrum in which all peak intensities observed in a chemical shift range of 2.0 to 5.0 ppm give an integral value of 10% or higher.

The surfactant (b) preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant (b) is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (b) include: CH$_3$C(O)CH$_2$CH$_2$CH$_2$CH$_2$CH$_2$CH$_2$CH$_2$CH$_2$CH$_2$OSO$_3$Na, CH$_3$C(O)CH$_2$CH$_2$CH$_2$CH$_2$CH$_2$CH$_2$CH$_2$CH$_2$OSO$_3$Na, CH$_3$C(O)CH$_2$CH$_2$CH$_2$CH$_2$CH$_2$CH$_2$CH$_2$OSO$_3$Na, CH$_3$C(O)CH$_2$CH$_2$ CH$_2$ CH$_2$CH$_2$CH$_2$OSO$_3$Na, CH$_3$C(O)CH$_2$CH$_2$CH$_2$CH$_2$ CH$_2$ OSO$_3$Na, CH$_3$C(O)CH$_2$CH$_2$CH$_2$CH$_2$OSO$_3$Na, (CH$_3$)$_3$CC(O)CH$_2$CH$_2$CH$_2$CH$_2$CH$_2$CH$_2$CH$_2$CH$_2$CH$_2$OSO$_3$Na, (CH$_3$)$_2$ CHC(O)CH$_2$CH$_2$CH$_2$CH$_2$CH$_2$CH$_2$CH$_2$ CH$_2$ OSO$_3$Na, (CH$_2$)$_5$CHC(O)CH$_2$CH$_2$CH$_2$CH$_2$CH$_2$CH$_2$CH$_2$ CH$_2$ CH$_2$OSO$_3$Na, CH$_3$CH$_2$C(O)CH$_2$CH$_2$CH$_2$CH$_2$CH$_2$CH$_2$CH$_2$OSO$_3$Na, CH$_3$CH$_2$CH$_2$C(O)CH$_2$CH$_2$CH$_2$CH$_2$CH$_2$CH$_2$OSO$_3$Na, CH$_3$CH$_2$CH$_2$CH$_2$C(O)CH$_2$CH$_2$CH$_2$CH$_2$CH$_2$OSO$_3$Na, CH$_3$CH$_2$CH$_2$CH$_2$CH$_2$C(O)CH$_2$CH$_2$CH$_2$CH$_2$OSO$_3$Na, CH$_3$CH$_2$CH$_2$CH$_2$CH$_2$CH$_2$C (O) CH$_2$CH$_2$CH$_2$CH$_2$OSO$_3$Na, CH$_3$CH$_2$CH$_2$CH$_2$CH$_2$CH$_2$C(O) CH$_2$CH$_2$CH$_2$OSO$_3$Na, CH$_3$CH$_2$CH$_2$CH$_2$CH$_2$CH$_2$CH$_2$C(O)CH$_2$CH$_2$OSO$_3$Na, CH$_3$CH$_2$CH$_2$CH$_2$CH$_2$CH$_2$CH$_2$CH$_2$C(O)CH$_2$OSO$_3$Na, CH$_3$C(O)CH$_2$CH$_2$CH$_2$CH$_2$CH$_2$CH$_2$CH$_2$CH$_2$OCH$_2$CH$_2$OSO$_3$Na, CH$_3$C(O)CH$_2$CH$_2$CH$_2$CH$_2$CH$_2$CH$_2$CH$_2$CH$_2$C(O)NHCH$_2$ OSO$_3$Na, CH$_3$C(O)CH$_2$CH$_2$CH$_2$CH$_2$CH$_2$CH$_2$ CH$_2$CH$_2$NHC(O)CH$_2$OSO$_3$Na, CH$_3$C(O)CH$_2$CH$_2$CH$_2$CH$_2$CH$_2$ $CH_2CH_2CH_2CH_2C(O)OSO_3Na$, $CH_3C(O)CH_2CH_2CH_2$ $CH_2CH_2$ $CH_2CH_2CH_2CH_2C(O)OCH_2OSO_3Na$, $CH_3C(O)$ $CH_2CH_2CH_2CH_2CH_2CH_2CH_2CH_2OC(O)CH_2OSO_3$ Na, $CH_3C(O)CH_2CH_2CH_2CH_2CH_2CH_2CH_2CH_2$ $OSO_3H$, $CH_3C(O)CH_2CH_2CH_2CH_2CH_2CH_2CH_2CH_2$ $CH_2$ $OSO_3Li$, $CH_3C(O)CH_2CH_2CH_2CH_2CH_2CH_2CH_2CH_2$ $CH_2$ $OSO_3K$, $CH_3C(O)CH_2CH_2CH_2CH_2CH_2CH_2CH_2CH_2CH_2$ $OSO_3NH_4$, $CH_3C(O)CH_2CH_2CH_2CH_2CH_2CH_2CH_2CH_2$ $CH(CH_3)_2$ $OSO_3Na$, $CH_3C(O)CH_2CH_2CH_2CH_2CH_2CH_2$ $CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2$ $CH_2CH_2CH_2CH_2CH_2OSO_3Na$, $CH_3C(O)CH_2CH_2CH_2CH_2$ $CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2CH_2CH_2CH_2CH_2$ $CH_2CH_2CH_2OSO_3Na$, $CH_3C(O)CH_2CH_2CH_2CH_2CH_2$ $CH_2$ $CH_2CH_2CH_2CH_2CH_2CH_2CH_2OSO_3Na$, $CH_3C(O)CH_2CH_2$ $CH_2CH_2CH_2CH_2CH_2CH_2CH_2CH_2CH_2CH_2CH_2OSO_3Na$, $CH_3C(O)CH_2CH_2CH_2CH_2CH_2CH_2CH_2$ $CH_2CH_2$ $CH_2OSO_3Na$, $CH_3C(O)CH_2CH_2CH_2CH_2CH_2CH_2CH_2CH_2$ $CH_2$ $CH_2OSO_3Na$, $(CH_3)_3CC(O)CH_2CH_2CH_2CH_2$ $CH_2$ $CH_2CH_2CH_2CH_2CH_2CH_2CH_2CH_2CH_2CH_2CH_2OSO_3$ Na, $(CH_3)_2CHC(O)CH_2CH_2CH_2CH_2CH_2CH_2CH_2CH_2CH_2CH_2$ $CH_2$ $CH_2CH_2CH_2CH_2CH_2CH_2CH_2OSO_3Na$, $(CH_2)_5CHC$ $(O)CH_2CH_2CH_2CH_2CH_2CH_2CH_2CH_2CH_2CH_2CH_2$ $CH_2CH_2CH_2CH_2CH_2OSO_3Na$, $CH_3CH_2C(O)CH_2CH_2$ $CH_2CH_2CH_2CH_2CH_2CH_2CH_2CH_2CH_2CH_2CH_2$ $CH_2OSO_3Na$, $CH_3CH_2CH_2CH_2CH_2C(O)CH_2CH_2$ $CH_2$ $CH_2CH_2CH_2CH_2CH_2CH_2CH_2CH_2CH_2CH_2OSO_3Na$, $CH_3$ $CH_2CH_2CH_2CH_2CH_2CH_2C(O)CH_2CH_2CH_2CH_2$ $CH_2$ $CH_2CH_2CH_2CH_2CH_2OSO_3Na$, $CH_3CH_2CH_2CH_2CH_2CH_2$ $CH_2CH_2CH_2CH_2CH_2C(O)CH_2CH_2CH_2CH_2CH_2$ $CH_2$ $OSO_3Na$, $CH_3CH_2CH_2CH_2CH_2CH_2CH_2CH_2CH_2$ $CH_2$ $CH_2CH_2CH_2C(O)CH_2CH_2CH_2CH_2OSO_3Na$, $CH_3CH_2C$ $(O)CH_2CH_2CH_2CH_2CH_2CH_2CH_2CH_2CH_2CH_2CH_2$ $CH_2CH_2CH_2CH_2OCH_2CH_2OSO_3Na$, $CH_3CH_2C(O)CH_2$ $CH_2CH_2CH_2CH_2CH_2CH_2CH_2CH_2CH_2CH_2CH_2CH_2$ $CH_2CH_2C(O)NHCH_2CH_2OSO_3Na$, $CH_3CH_2C(O)CH_2$ $CH_2CH_2$ $CH_2CH_2CH_2CH_2CH_2CH_2CH_2CH_2CH_2CH_2$ $CH_2CH_2NHC(O)$ $CH_2CH_2OSO_3Na$, $CH_3CH_2C(O)CH_2$ $CH_2CH_2CH_2CH_2CH_2CH_2CH_2CH_2CH_2CH_2CH_2CH_2$ $CH_2CH_2C(O)$ O $CH_2CH_2OSO_3Na$, $CH_3CH_2C(O)$ $CH_2CH_2CH_2CH_2CH_2CH_2CH_2CH_2CH_2CH_2CH_2CH_2$ $CH_2CH_2CH_2OC(O)$ $CH_2CH_2OSO_3Na$, $CH_3CH_2C(O)$ $CH_2CH_2$ $CH_2CH_2CH_2CH_2CH_2CH_2CH_2CH_2CH_2CH_2$ $CH_2CH_2CH_2CH_2CH_2CH_2C(O)OSO_3Na$, $CH_3CH_2C(O)CH_2CH_2$ $CH_2CH_2CH_2CH_2CH_2CH_2CH_2CH_2CH_2CH_2CH_2CH_2$ $CH_2OSO_3H$, $CH_3CH_2C(O)CH_2CH_2CH_2CH_2CH_2CH_2CH_2$ $CH_2CH_2CH_2CH_2CH_2CH_2CH_2CH_2OSO_3Li$ $CH_3CH_2C$ $(O)CH_2CH_2CH_2CH_2CH_2CH_2CH_2CH_2CH_2CH_2CH_2$ $CH_2CH_2CH_2CH_2OSO_3K$, $CH_3CH_2C(O)CH_2CH_2CH_2CH_2$ $CH_2CH_2CH_2CH_2CH_2CH_2CH_2CH_2CH_2CH_2CH_2OSO_3$ $NH_4$, and $CH_3C(O)CH_2CH_2CH_2CH_2CH_2CH_2CH_2CH_2$ $CH_2CH_2CH_2CH_2CH_2CH_2CH_2CH_2CH_2OSO_3$ Na.

The surfactant (b) is a novel compound, and may be produced by any of the following production methods, for example.

The surfactant (b) may be produced by a production method including:

a step (11b) of hydroxylating a compound (10b) represented by the following formula:

$$R^{11b}-CH=CH-(CR^{2b}_2)_n-(OR^{3b})_p-(CR^{4b}_2)_q-L-OH$$

(wherein $R^{2b}$ to $R^{4b}$, n, p, and q are defined as described above; $R^{11b}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is a single bond, $-CO_2-B-*$, $-OCO-B-*$, $-CONR^{6b}-B-*$, $-NR^{6b}CO-B-*$, or $-CO-$ other than the carbonyl groups in $-CO_2-B-$, $-OCO-B-$, $-CONR^{6b}-B-$, and $-NR^{6b}CO-B-$, wherein B is a single bond or an alkylene group having 1 to 10 carbon atoms and optionally having a substituent, $R^{6b}$ is H or an alkyl group having 1 to 4 carbon atoms and optionally having a substituent; * indicates the side bonded to $-OH$ in the formula) to provide a compound (11b) represented by the following formula:

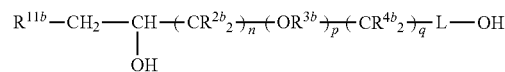

(wherein L, $R^{2b}$ to $R^{4b}$, $R^{11b}$, n, p, and q are defined as described above);

a step (12b) of oxidizing the compound (11b) to provide a compound (12b) represented by the following formula:

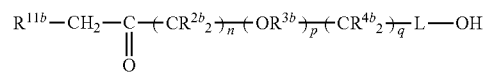

(wherein L, $R^{2b}$ to $R^{4b}$, $R^{11b}$, n, p, and q are defined as described above); and a step (13b) of sulfuric-esterifying the compound (12b) to provide a compound (13b) represented by the following formula:

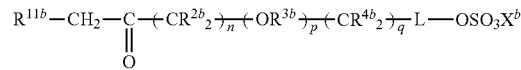

wherein L, $R^{2b}$ to $R^{4b}$, $R^{11b}$, n, p, q, and $X^b$ are defined as described above.

The alkyl group for $R^{11b}$ is preferably free from a carbonyl group.

In the alkyl group for $R^{11b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{11b}$ is preferably H, a linear or branched alkyl group having 1 to 9 carbon atoms and optionally having a substituent, or a cyclic alkyl group having 3 to 9 carbon atoms and optionally having a substituent, more preferably H, a linear or branched alkyl group having 1 to 9 carbon atoms and free from a carbonyl group, or a cyclic alkyl group having 3 to 9 carbon atoms and free from a carbonyl group, still more preferably H or a linear or branched alkyl group having 1 to 9 carbon atoms and not having a substituent, further preferably H, a methyl group (—$CH_3$), or an ethyl group (—$C_2H_5$), particularly preferably H or a methyl group (—$CH_3$), and most preferably H.

The hydroxylation in the step (11b) may be performed by a method (1) in which iron(II) phthalocyanine (Fe(Pc)) and sodium borohydride are caused to act on the compound (10b) in an oxygen atmosphere or a method (2) in which isopinocampheylborane ($IpcBH_2$) is caused to act on the compound (10b) and then the resulting intermediate (dialkyl borane) is oxidized.

In the method (1), iron(II) phthalocyanine may be used in a catalytic amount, and may be used in an amount of 0.001 to 1.2 mol based on 1 mol of the compound (10b).

In the method (1), sodium borohydride may be used in an amount of 0.5 to 20 mol based on 1 mol of the compound (10b).

The reaction in the method (1) may be performed in a solvent. The solvent is preferably an organic solvent, and examples thereof include ethers, halogenated hydrocarbons, aromatic hydrocarbons, nitriles, and nitrogen-containing polar organic compounds.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

The reaction temperature in the method (1) is preferably −78 to 200° C., and more preferably 0 to 150° C.

The reaction pressure in the method (1) is preferably 0 to 5.0 MPa, and more preferably 0.1 to 1.0 MPa.

The reaction duration in the method (1) is preferably 0.1 to 72 hours, and more preferably 0.1 to 48 hours.

In the method (2), isopinocampheylborane may be used in an amount of 1.0 to 10.0 mol based on 1 mol of the compound (10b).

The reaction of the compound (10b) and isopinocampheylborane may be performed in a solvent. The solvent is preferably an organic solvent, and examples thereof include ethers, halogenated hydrocarbons, and aromatic hydrocarbons.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature of the compound (10b) and isopinocampheylborane is preferably −78 to 200° C., and more preferably 0 to 150° C.

The reaction pressure of the compound (10b) and isopinocampheylborane is preferably 0 to 5.0 MPa, and more preferably 0.1 to 1.0 MPa.

The duration of the reaction of the compound (10b) and isopinocampheylborane is preferably 0.1 to 72 hours, and more preferably 0.1 to 48 hours.

The oxidation in the method (2) may be performed by causing an oxidizing agent to act on the intermediate. An example of the oxidizing agent is hydrogen peroxide. The oxidizing agent may be used in an amount of 0.7 to 10 mol based on 1 mol of the intermediate.

The oxidation in the method (2) may be performed in a solvent. Examples of the solvent include water, methanol, and ethanol, of which water is preferred.

The oxidation temperature in the method (2) is preferably 0 to 100° C., and more preferably 0 to 80° C.

The oxidation pressure in the method (2) is preferably 0 to 5.0 MPa, and more preferably 0.1 to 1.0 MPa.

The oxidation duration in the method (2) is preferably 0.1 to 72 hours, and more preferably 0.1 to 48 hours.

Examples of the method of oxidizing the compound (11b) in the step (12b) include (α) a method of using Jones reagent ($CrO_3/H_2SO_4$) (Jones oxidation), (b) a method of using Dess-Martin periodinane (DMP) (Dess-Martin oxidation), (c) a method of using pyridinium chlorochromate (PCC), (d) a method of causing a bleaching agent (about 5% to 6% aqueous solution of NaOCl) to act in the presence of a nickel compound such as $NiCl_2$, and (e) a method of causing a hydrogen acceptor such as an aldehyde or a ketone to act in the presence of an aluminum catalyst such as $Al(CH_3)_3$ or $Al[OCH(CH_3)_2]_3$ (Oppenauer oxidation).

The oxidation in the step (12b) may be performed in a solvent. The solvent is preferably water or an organic solvent, and examples thereof include water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol, of which acetone is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

The oxidation temperature in the step (12b) is preferably −78 to 200° C., and may appropriately be selected in accordance with the method used.

The oxidation pressure in the step (12b) is preferably 0 to 5.0 MPa, and may appropriately be selected in accordance with the method used.

The oxidation duration in the step (12b) is preferably 0.1 to 72 hours, and may appropriately be selected in accordance with the method used.

The sulfuric-esterification in the step (13b) may be performed by reacting the compound (12b) and a sulfating reagent. Examples of the sulfating reagent include sulfur trioxide amine complexes such as a sulfur trioxide pyridine complex, a sulfur trioxide trimethylamine complex, and a sulfur trioxide triethylamine complex, sulfur trioxide amide complexes such as a sulfur trioxide dimethylformamide complex, sulfuric acid-dicyclohexylcarbodiimide, chlorosulfuric acid, concentrated sulfuric acid, and sulfamic acid. The amount of the sulfating reagent used is preferably 0.5 to 10 mol, more preferably 0.5 to 5 mol, and still more preferably 0.7 to 4 mol, based on 1 mol of the compound (12b).

The sulfuric-esterification in the step (13b) may be performed in a solvent. The solvent is preferably an organic solvent, and examples thereof include ethers, halogenated hydrocarbons, aromatic hydrocarbons, pyridines, dimethyl sulfoxide, sulfolane, and nitriles.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

The sulfuric-esterification temperature in the step (13b) is preferably −78 to 200° C., and more preferably −20 to 150° C.

The sulfuric-esterification pressure in the step (13b) is preferably 0 to 10 MPa, and more preferably 0.1 to 5 MPa.

The sulfuric-esterification duration in the step (13b) is preferably 0.1 to 72 hours, and more preferably 0.1 to 48 hours.

The surfactant (b) may also be produced by a production method including a step (21b) of ozonolyzing a compound (20b) represented by the following formula:

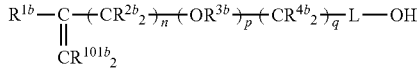

(wherein L, $R^{1b}$ to $R^{4b}$, n, p, and q are defined as described above; and $R^{101b}$ is an organic group) to provide a compound (21b) represented by the following formula:

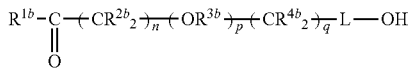

(wherein L, $R^{1b}$ to $R^{4b}$, n, p, and q are defined as described above); and a step (22b) of sulfuric-esterifying the compound (21b) to provide a compound (22b) represented by the following formula:

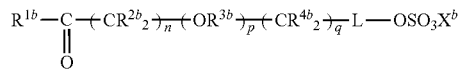

(wherein L, $R^{1b}$ to $R^{4b}$, n, p, q, and $X^b$ are defined as described above).

$R^{101b}$ is preferably an alkyl group having 1 to 20 carbon atoms. The two $R^{101b}$ may be the same as or different from each other.

The ozonolysis in the step (21b) may be performed by causing ozone to act on the compound (20b), followed by post-treatment with a reducing agent.

The ozone may be generated by dielectric barrier discharge in oxygen gas.

Examples of the reducing agent used in the post-treatment include zinc, dimethyl sulfide, thiourea, and phosphines, of which phosphines are preferred.

The ozonolysis in the step (21b) may be performed in a solvent. The solvent is preferably water or an organic solvent, and examples thereof include water, alcohols, carboxylic acids, ethers, halogenated hydrocarbons, and aromatic hydrocarbons.

Examples of the alcohol include methanol, ethanol, 1-propanol, and isopropanol. Of these, methanol and ethanol are preferred.

Examples of the carboxylic acids include acetic acid and propionic acid. Of these, acetic acid is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The ozonolysis temperature in the step (21b) is preferably −78 to 200° C., and more preferably 0 to 150° C.

The ozonolysis pressure in the step (21b) is preferably 0 to 5.0 MPa, and more preferably 0.1 to 1.0 MPa.

The ozonolysis duration in the step (21b) is preferably 0.1 to 72 hours, and more preferably 0.1 to 48 hours.

The sulfate esterification in the step (22b) may be performed by reacting the compound (21b) and the sulfating reagent under the same conditions as in the sulfuric-esterification in the step (13b).

The surfactant (b) may also be produced by a production method including:

a step (31b) of epoxidizing a compound (30b) represented by the formula:

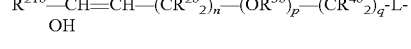

(wherein L, $R^{2b}$ to $R^{4b}$, n, p, and q are defined as described above; $R^{21b}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms) to provide a compound (31b) represented by the following formula:

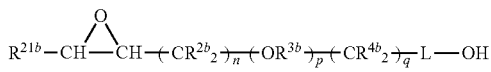

(wherein L, $R^{2b}$ to $R^{4b}$, $R^{21b}$, n, p, and q are defined as described above);

a step (32b) of reacting the compound (31b) with a lithium dialkylcopper represented by $R^{22b}{}_2$CuLi (wherein $R^{22b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms) to provide a compound (32b) represented by the following formula:

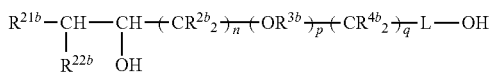

(wherein L, $R^{2b}$ to $R^{4b}$, $R^{21b}$, $R^{22b}$, n, p, and q are defined as described above);

a step (33b) of oxidizing the compound (32b) to provide a compound (33b) represented by the following formula:

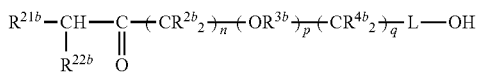

(wherein L, $R^{2b}$ to $R^{4b}$, $R^{21b}$, $R^{22b}$, n, p, and q are defined as described above); and a step (33b) of sulfuric-esterifying a compound (33b) to provide a compound (34b) represented by the following formula:

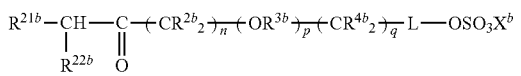

(wherein L, $R^{2b}$ to $R^{4b}$, L, $R^{21b}$, $R^{22b}$, n, p, q, and $X^b$ are defined as described above).

The alkyl group for $R^{21b}$ is preferably free from a carbonyl group.

In the alkyl group for $R^{21b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{21b}$ is preferably H, a linear or branched alkyl group having 1 to 8 carbon atoms and optionally having a substituent, or a cyclic alkyl group having 3 to 8 carbon atoms and optionally having a substituent, more preferably H, a linear or branched alkyl group having 1 to 8 carbon atoms and free from a carbonyl group, or a cyclic alkyl group having 3 to 8 carbon atoms and free from a carbonyl group, still more preferably H or a linear or branched alkyl group having 1 to 8 carbon atoms and not having a substituent, particularly preferably H or a methyl group (—$CH_3$), and most preferably H.

The alkyl group for $R^{22b}$ is preferably free from a carbonyl group.

In the alkyl group for $R^{22b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{22b}$ is preferably a linear or branched alkyl group having 1 to 9 carbon atoms and optionally having a substituent or a cyclic alkyl group having 3 to 9 carbon atoms and optionally having a substituent, more preferably a linear or branched alkyl group having 1 to 9 carbon atoms and free from a carbonyl group or a cyclic alkyl group having 3 to 9 carbon atoms and free from a carbonyl group, still more preferably a linear or branched alkyl group having 1 to 9 carbon atoms and not having a substituent, particularly preferably a methyl group (—$CH_3$) or an ethyl group (—$C_2H_5$), and most preferably a methyl group (—$CH_3$).

The two $R^{22b}$ may be the same as or different from each other.

The total number of carbon atoms of $R^{21b}$ and $R^{22b}$ is preferably 1 to 7, more preferably 1 to 2, and most preferably 1.

The epoxidation in the step (31b) may be performed by causing an epoxidizing agent to act on the compound (30b).

Examples of the epoxidizing agent include peroxy acids such as meta-chloroperbenzoic acid (m-CPBA), perbenzoic acid, hydrogen peroxide, and tert-butyl hydroperoxide, dimethyl dioxolane, and methyl trifluoromethyl dioxolane, of which peroxy acids are preferred, and meta-chloroperbenzoic acid is more preferred.

The epoxidizing agent may be used in an amount of 0.5 to 10.0 mol based on 1 mol of the compound (30b).

The epoxidation in the step (31b) may be performed in a solvent. The solvent is preferably an organic solvent, and examples thereof include ketones, ethers, halogenated hydrocarbons, aromatic hydrocarbons, nitriles, pyridines, nitrogen-containing polar organic compounds, and dimethyl sulfoxide, of which dichloromethane is preferred.

Examples of the ketones include acetone, methyl ethyl ketone, methyl isobutyl ketone, cyclohexanone, and diacetone alcohol, of which acetone is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N- dimethylformamide, N,N-dimethylacetamide, and N-methyl-2-pyrrolidone are preferred.

The epoxidation temperature in the step (31b) is preferably −78 to 200° C., and more preferably −40 to 150° C.

The epoxidation pressure in the step (31b) is preferably 0 to 5.0 MPa, and more preferably 0.1 to 1.0 MPa.

The epoxidation duration in the step (31b) is preferably 0.1 to 72 hours, and more preferably 0.1 to 48 hours.

In the step (32b), the lithium dialkylcopper may be used in an amount of 0.5 to 10.0 mol based on 1 mol of the compound (31b).

The reaction in the step (32b) may be performed in a solvent. The solvent is preferably an organic solvent, and examples thereof include ethers, halogenated hydrocarbons, and aromatic hydrocarbons.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature in the step (32b) is preferably −78 to 200° C., and more preferably −40 to 150° C.

The reaction pressure in the step (32b) is preferably 0 to 5.0 MPa, and more preferably 0.1 to 1.0 MPa.

The reaction duration in the step (32b) is preferably 0.1 to 72 hours, and more preferably 0.1 to 48 hours.

Examples of the method of oxidizing the compound (32b) in the step (33b) include (a) a method of using Jones reagent ($CrO_2/H_2SO_4$) (Jones oxidation), (b) a method of using Dess-Martin periodinane (DMP) (Dess-Martin oxidation), (c) a method of using pyridinium chlorochromate (PCC), (d) a method of causing a bleaching agent (about 5% to 6% aqueous solution of NaOCl) to act in the presence of a nickel compound such as $NiCl_2$, and (e) a method of causing a hydrogen acceptor such as an aldehyde or a ketone to act in the presence of an aluminum catalyst such as $Al(CH_3)_3$ or $Al[OCH(CH_3)_2]_3$ (Oppenauer oxidation).

The oxidation in the step (33b) may be performed in a solvent. The solvent is preferably water or an organic solvent, and examples thereof include water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol, of which acetone is preferred.

Examples of the alcohol include methanol, ethanol, 1-propanol, and isopropanol. Of these, methanol and ethanol are preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

The oxidation temperature in the step (33b) is preferably −78 to 200° C., and may appropriately be selected in accordance with the method used.

The oxidation pressure in the step (33b) is preferably 0 to 5.0 MPa, and may appropriately be selected in accordance with the method used.

The oxidation duration in the step (33b) is preferably 0.1 to 72 hours, and may appropriately be selected in accordance with the method used.

The sulfate esterification in the step (34b) may be performed by reacting the compound (33b) and the sulfating reagent under the same conditions as in the sulfuric-esterification in the step (13b).

The surfactant (b) may also be produced by a production method including:

a step (41b) of oxidizing the compound (10b) represented by the following formula:

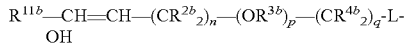

(wherein L, $R^{2b}$ to $R^{4b}$, $R^{11b}$, n, p, and q are defined as described above) to provide a compound (41b) represented by the following formula:

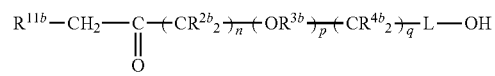

(wherein L, $R^{2b}$ to $R^{4b}$, L, $R^{11b}$, n, p, and q are defined as described above); and a step (42b) of sulfuric-esterifying the compound (41b) to provide a compound (42b) represented by the following formula:

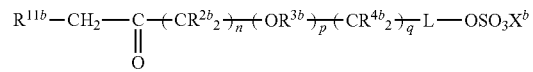

(wherein L, $R^{2b}$ to $R^{4b}$, $R^{11b}$, n, p, q, and $X^b$ are defined as described above).

The oxidation in the step (41b) may be performed by causing an oxidizing agent to act on the compound (10b) in the presence of water and a palladium compound.

Examples of the oxidizing agent include monovalent or divalent copper salts such as copper chloride, copper acetate, copper cyanide, and copper trifluoromethanethiolate, iron salts such as iron chloride, iron acetate, iron cyanide, iron trifluoromethanethiolate, and hexacyanoferrates, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen. Of these, copper salts, iron salts, and benzoquinones are preferred, and copper chloride, iron chloride, and 1,4-benzoquinone are more preferred.

The oxidizing agent may be used in an amount of 0.001 to 10 mol based on 1 mol of the compound (10b).

The water may be used in an amount of 0.5 to 1,000 mol based on 1 mol of the compound (10b).

An example of the palladium compound is palladium dichloride. The palladium compound may be used in a catalytic amount, and may be used in an amount of 0.0001 to 1.0 mol based on 1 mol of the compound (10b).

The oxidation in the step (41b) may be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethyl sulfoxide, and sulfolane.

Examples of the esters include ethyl acetate, butyl acetate, ethylene glycol monomethyl ether acetate, and propylene glycol monomethyl ether acetate (PGMEA, also known as 1-methoxy-2-acetoxypropane), of which ethyl acetate is preferred.

Examples of the aliphatic hydrocarbons include hexane, cyclohexane, heptane, octane, nonane, decane, undecane, dodecane, and mineral spirits, of which cyclohexane and heptane are preferred.

Examples of the aromatic hydrocarbon include benzene, toluene, and xylene, of which benzene and toluene are preferred.

Examples of the alcohol include methanol, ethanol, 1-propanol, and isopropanol.

Examples of the carboxylic acids include acetic acid and propionic acid. Of these, acetic acid is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

Examples of the nitrile include acetonitrile, propionitrile, butyronitrile, isobutyronitrile, and benzonitrile, of which acetonitrile is preferred.

The oxidation temperature in the step (41b) is preferably −78 to 200° C., and more preferably −20 to 150° C.

The oxidation pressure in the step (41b) is preferably 0 to 10 MPa, and more preferably 0.1 to 5.0 MPa.

The oxidation duration in the step (41b) is preferably 0.1 to 72 hours, and more preferably 0.1 to 48 hours.

The sulfate esterification in the step (42b) may be performed by reacting the compound (41b) and the sulfating reagent under the same conditions as in the sulfuric-esterification in the step (13b).

The surfactant (b) may also be produced by a production method including:

a step (51) of reacting a compound (50) represented by the following formula:

$$R^{11b}-CH=CH-(CR^{2b}_2)_a-OH$$

(wherein $R^{2b}$, $R^{11b}$, and n are defined as described above) and a halogenating agent to provide a compound (51) represented by the following formula:

$$R^{11b}-CH=CH-(CR^{2b}_2)_n-Z^{51b}$$

(wherein $R^{2b}$, $R^{11b}$, and n are defined as described above; and $Z^{51b}$ is a halogen atom);

a step (52) of reacting the compound (51) and an alkylene glycol represented by HO—$R^{3b}$-L-OH (wherein L and $R^{3b}$ are defined as described above) to provide a compound (52) represented by the following formula:

$$R^{11b}-CH=CH-(CR^{2b}_2)_n-O-R^{3b}-L-OH$$

(wherein L, $R^{2b}$, $R^{3b}$, $R^{11b}$, and n are defined as described above);

a step (53) of oxidizing the compound (52) to provide a compound (53) represented by the following formula:

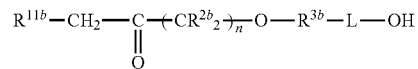

(wherein L, $R^{2b}$, $R^{3b}$, $R^{11b}$, and n are defined as described above); and a step (54) of sulfuric-esterifying the compound (53) to provide a compound (54) represented by the following formula:

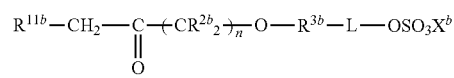

(wherein L, $R^{2b}$, $R^{3b}$, $R^{11b}$, n, and $X^b$ are defined as described above).

$Z^{51b}$ is preferably F, Cl, Br or I, and more preferably Br.

Examples of the halogenating agent used in the step (51) include N-bromosuccinimide and N-chlorosuccinimide.

The halogenating agent may be used in an amount of 0.5 to 10.0 mol based on 1 mol of the compound (50).

The reaction of step (51) may be performed in the presence of phosphines such as triphenylphosphine.

The phosphines may be used in an amount of 0.5 to 10.0 mol based on 1 mol of the compound (50).

The reaction in the step (51) may be performed in a solvent. The solvent is preferably an organic solvent, and examples thereof include ethers, halogenated hydrocarbons, and aromatic hydrocarbons.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature in the step (51) is preferably −78 to 200° C., and more preferably −40 to 150° C.

The reaction pressure in the step (51) is preferably 0 to 5.0 MPa, and more preferably 0.1 to 1.0 MPa.

The reaction duration in the step (51) is preferably 0.1 to 72 hours, and more preferably 0.1 to 48 hours.

In the step (52), the alkylene glycol may be used in an amount of 0.5 to 10.0 mol based on 1 mol of the compound (51).

The reaction in the step (52) may be performed in the presence of a base. Examples of the base include sodium hydride, sodium hydroxide, and potassium hydroxide.

The base may be used in an amount of 0.5 to 10.0 mol based on 1 mol of the compound (51).

The reaction in the step (52) may be performed in a solvent. The solvent is preferably an organic solvent, and examples thereof include nitrogen-containing polar organic compounds, ethers, halogenated hydrocarbons, and aromatic hydrocarbons.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N- dimethylformamide, N,N-dimethylacetamide, and N-methyl-2-pyrrolidone are preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature in the step (52) is preferably −78 to 200° C., and more preferably −40 to 150° C.

The reaction pressure in the step (52) is preferably 0 to 5.0 MPa, and more preferably 0.1 to 1.0 MPa.

The reaction duration in the step (52) is preferably 0.1 to 72 hours, and more preferably 0.1 to 48 hours.

The oxidation in the step (53) may be performed by causing an oxidizing agent to act on the compound (52) in the presence of water and a palladium compound under the same conditions as in the oxidation in the step (41).

The sulfate esterification in the step (54) may be performed by reacting the compound (53) and the sulfating reagent under the same conditions as in the sulfuric-esterification in the step (13).

In any of the production methods described above, after the completion of each step, the solvent may be distilled off, or distillation, purification or the like may be performed to increase the purity of the resulting compounds. Further, when the obtained compound has a group represented by —OSO₃H (that is, when $X^b$ is H), the compounds may be brought into contact with an alkali such as sodium carbonate or ammonia to covert —OSO₃H into a sulfate group.

Among the methods for producing the surfactant (b), production methods including the steps (41b) and (42b) are preferred.

The surfactant (c) will be described.

In the formula (c), $R^{1c}$ is a linear or branched alkyl group having 1 or more carbon atoms or a cyclic alkyl group having 3 or more carbon atoms.

When having 3 or more carbon atoms, the alkyl group optionally contains a carbonyl group (—C(=O)—) between two carbon atoms. When having 2 or more carbon atoms, the alkyl group optionally contains the carbonyl group at an end of the alkyl group. In other words, acyl groups such as an acetyl group represented by CH₃—C(=O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1c}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by CH₃—C(=O)—CH₂— is 3, the number of carbon atoms in the group represented by CH₃—C(=O)—C₂H₄—C(=O)—C₂H₄— is 7, and the number of carbon atoms in the group represented by CH₃—C(=O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—R¹⁰¹ᶜ, wherein $R^{101c}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (c), $R^{2c}$ and $R^{3c}$ are each independently a single bond or a divalent linking group.

Preferably, $R^{2c}$ and $R^{3c}$ are each independently a single bond, a linear or branched alkylene group having 1 or more carbon atoms, or a cyclic alkylene group having 3 or more carbon atoms.

The alkylene group constituting $R^{2c}$ and $R^{3c}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—R¹⁰²ᶜ, wherein $R^{102c}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1c}$, $R^{2c}$, and $R^{3c}$ is 5 or more. The total number of carbon atoms is preferably 7 or more, more preferably 9 or more, and preferably 20 or less, more preferably 18 or less, still more preferably 15 or less.

Any two of $R^{1c}$, $R^{2c}$, and $R^{3c}$ optionally bind to each other to form a ring.

In the formula (c), $A^c$ is —COOX$^c$ or —SO₃X$^c$, wherein $X^c$ is H, a metal atom, NR⁴ᶜ₄, imidazolium optionally having a substituent, pyridinium optionally having a substituent, or phosphonium optionally having a substituent, wherein $R^{4c}$ is H or an organic group and may be the same or different. $R^{4c}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li.

$X^c$ is preferably H, an alkali metal (Group 1), an alkaline earth metal (Group 2), or NR⁴ᶜ₄, more preferably H, Na, K, Li, or NH₄ because they are easily dissolved in water, still more preferably Na, K, or NH₄ because they are more easily dissolved in water, particularly preferably Na or NH₄, and most preferably NH₄ because it can be easily removed. When $X^c$ is NH₄, the solubility of the surfactant in an aqueous medium is excellent, and the metal component is unlikely to remain in the PTFE or the final product.

$R^{1c}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1c}$ is more preferably a group represented by the following formula:

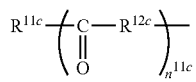

wherein $n^{11c}$ is an integer of 0 to 10; $R^{11c}$ is a linear or branched alkyl group having 1 to 5 carbon atoms or a cyclic alkyl group having 3 to 5 carbon atoms; $R^{12c}$ is an alkylene group having 0 to 3 carbon atoms; and when $n^{11c}$ is an integer of 2 to 10, each $R^{12c}$ may be the same or different.

In the formula, $n^{11c}$ is preferably an integer of 0 to 5, more preferably an integer of 0 to 3, and still more preferably an integer of 1 to 3.

The alkyl group for $R^{11c}$ is preferably free from a carbonyl group.

In the alkyl group for $R^{11c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103c}$, wherein $R^{103c}$ is an alkyl group.

In the alkyl group for $R^{11b}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12c}$ is an alkylene group having 0 to 3 carbon atoms. The alkylene group preferably has 1 to 3 carbon atoms.

The alkylene group for $R^{12c}$ may be either linear or branched.

The alkylene group for $R^{12c}$ is preferably free from a carbonyl group. $R^{12c}$ is more preferably an ethylene group (—$C_2H_4$—) or a propylene group (—$C_3H_6$—).

In the alkylene group for $R^{12c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104c}$, wherein $R^{104c}$ is an alkyl group.

In the alkylene group for $R^{12c}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2c}$ and $R^{3c}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_3H_6$—).

Examples of the surfactant (c) include the following surfactants. In each formula, $A^c$ is defined as described above.

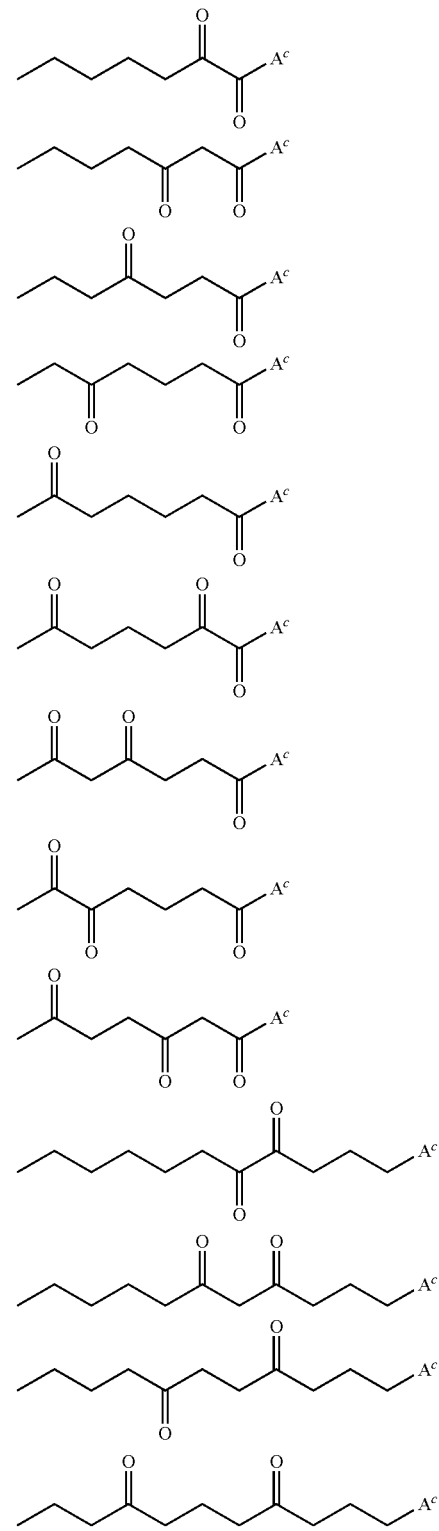

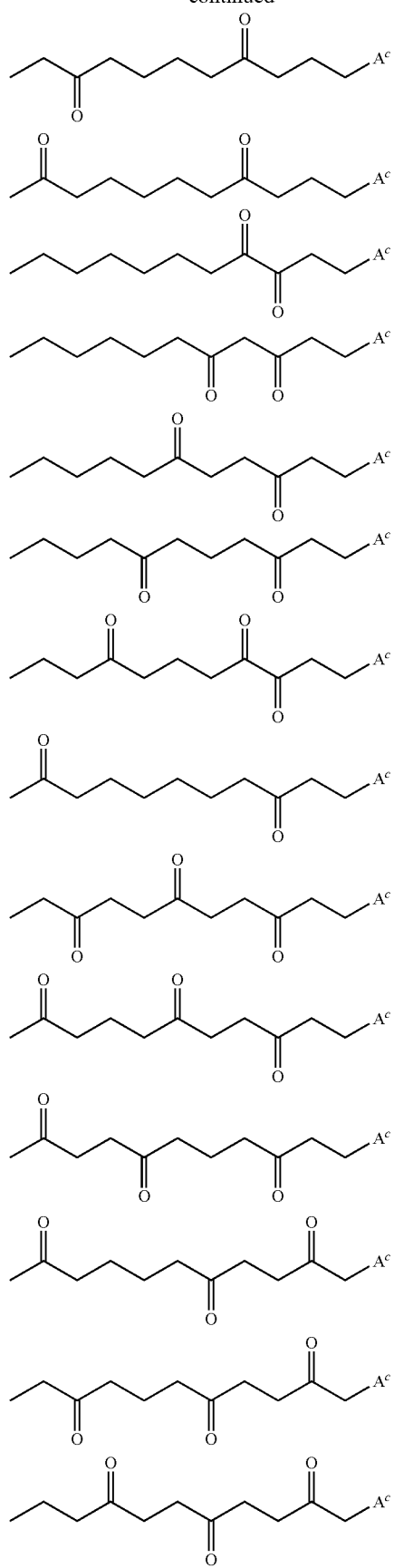
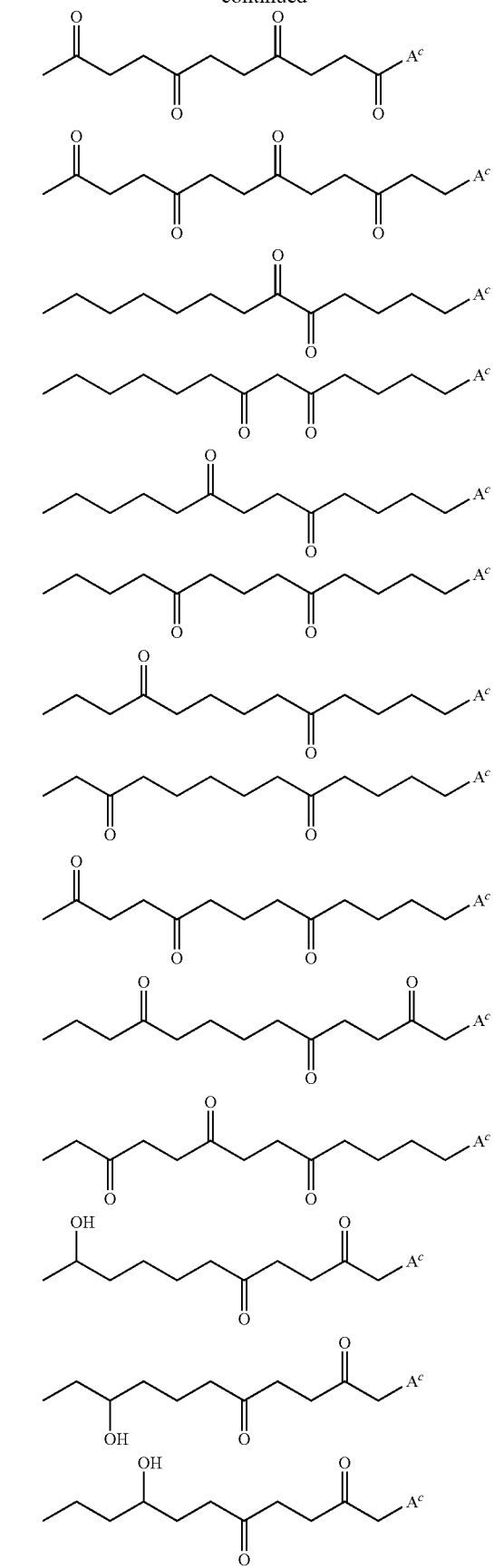

87
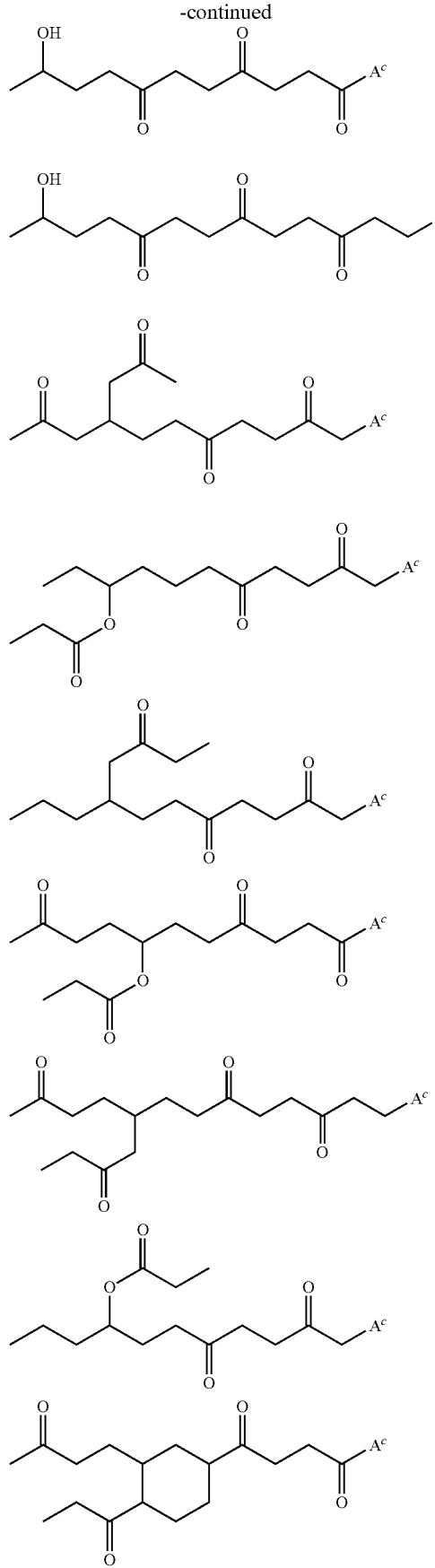
88
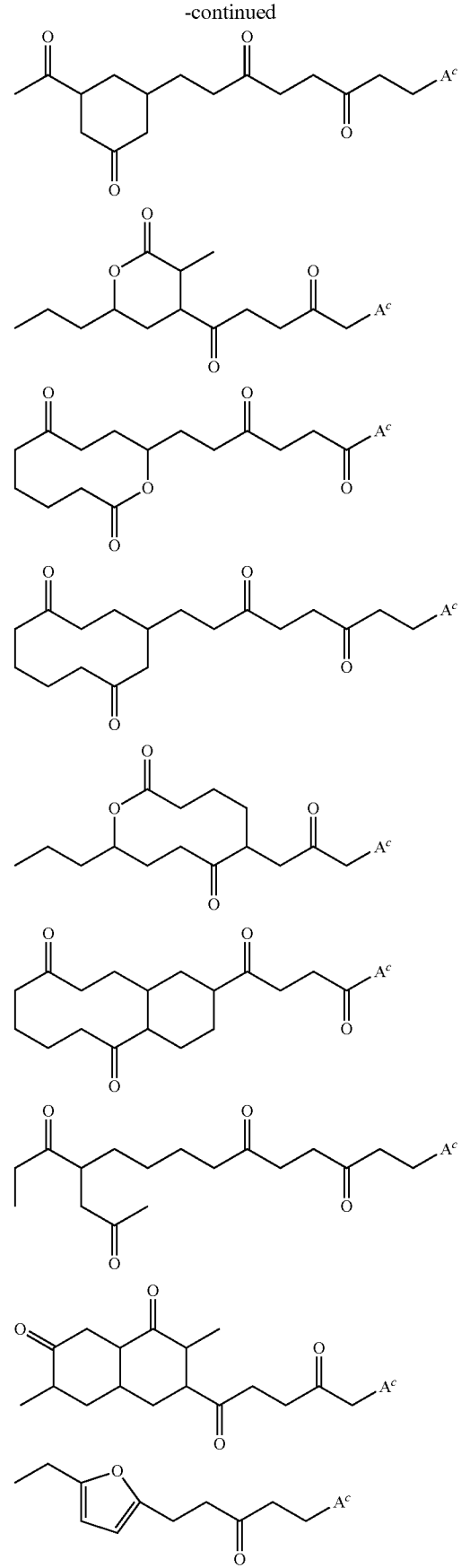

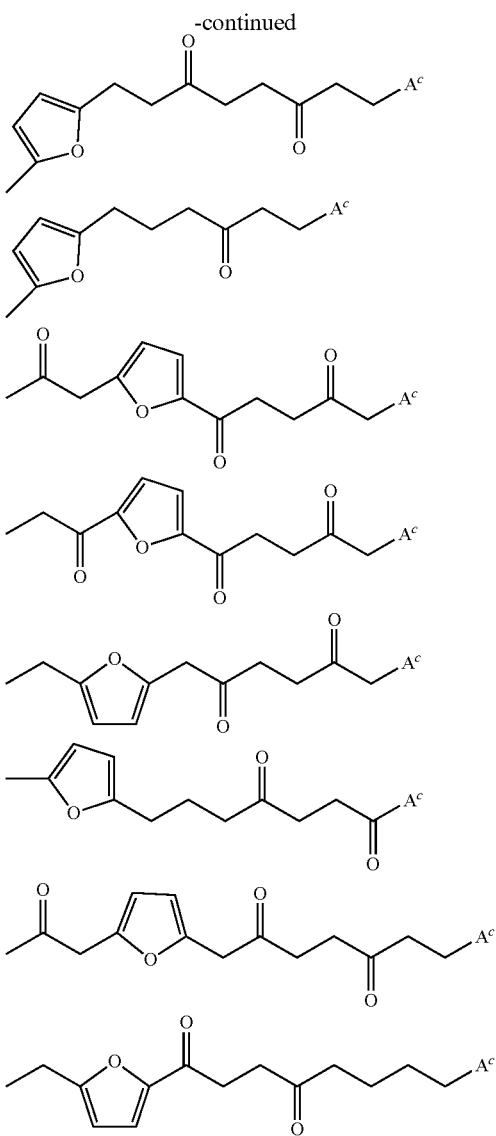

The surfactant (c) is a novel compound, and may be produced by any of the following production methods, for example.

The surfactant (c) may be suitably produced by a production method including:

a step (11c) of reacting a compound (10c) represented by the formula:

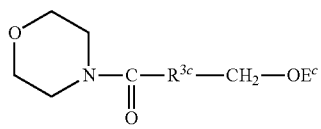

(wherein $R^{3c}$ is defined as described above; and $E^c$ is a leaving group), lithium, and a chlorosilane compound represented by the formula: $R^{201c}{}_3Si$—Cl (wherein each $R^{201c}$ is independently an alkyl group or an aryl group) to provide a compound (11c) represented by the formula:

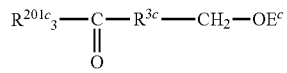

(wherein $R^{3c}$, $R^{201c}$, and $E^c$ are defined as described above);

a step (12c) of reacting the compound (11c) and an olefin represented by the formula:

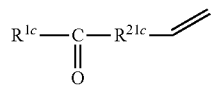

(wherein $R^{1c}$ is defined as described above; and $R^{21c}$ is a single bond or a divalent linking group) to provide a compound (12a) represented by the formula:

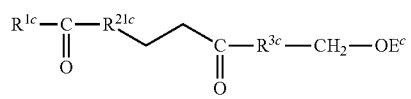

(wherein $R^{1c}$, $R^{21c}$, $R^{3c}$, and $E^c$ are defined as described above);

a step (13c) of eliminating the leaving group in the compound (12c) to provide a compound (13c) represented by the formula:

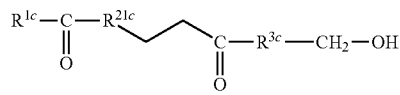

(wherein $R^{1c}$, $R^{21c}$, and $R^{3c}$ are defined as described above); and a step (14c) of oxidizing the compound (13c) to provide a compound (14a) represented by the formula:

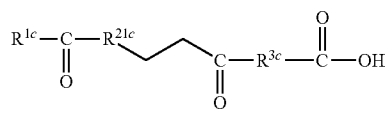

(wherein $R^{1c}$, $R^{21c}$, and $R^{3c}$ are defined as described above).

When $R^{1c}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

In the step (11c), it is preferable that lithium and the chlorosilane compound are reacted in advance to obtain a syroxylithium compound, and then the syroxylithium compound and the compound (10c) are reacted to obtain the compound (11c).

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{21c}$ is preferably a single bond or a linear or branched alkylene group having 1 or more carbon atoms.

Examples of the chlorosilane compound include:

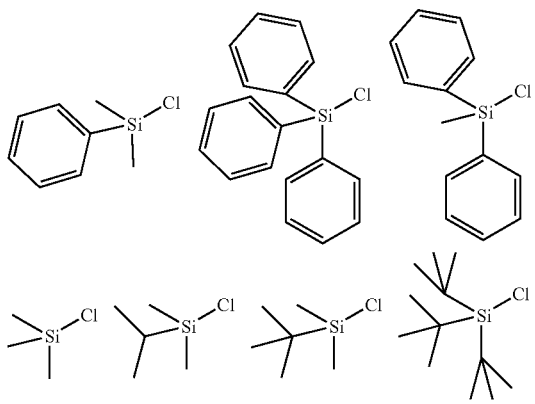

Any of the reactions in the step (11c) may be performed in a solvent. The solvent is preferably an organic solvent, more preferably an aprotic polar solvent, and still more preferably an ether. Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature of lithium and the chlorosilane compound in the step (11c) is preferably −78 to 100° C., more preferably 10 to 40° C.

The reaction temperature of the siloxylithium compound and the compound (10c) in the step (11c) is preferably −100 to 0° C., more preferably −80 to −50° C.

The reaction pressure of lithium and the chlorosilane compound in the step (11c) is preferably 0.1 to 5 MPa, and more preferably 0.1 to 1 MPa.

The reaction pressure of the siloxylithium compound and the compound (10c) in the step (11c) is preferably 0.1 to 5 MPa, and more preferably 0.1 to 1 MPa.

The reaction time of lithium and the chlorosilane compound in the step (11c) is preferably 0.1 to 72 hours, and more preferably 6 to 10 hours.

The reaction time of the siloxylithium compound and the compound (10c) in the step (11c) is preferably 0.1 to 72 hours, and more preferably 1 to 2 hours.

Regarding the reaction ratio between the compound (11c) and the olefin in the step (12c), the amount of the olefin is preferably 1 to 2 mol, and more preferably 1 to 1.1 mol, based on 1 mol of the compound (11c) in consideration of the improvement of the yield and the reduction of the waste.

The reaction in the step (12c) may be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent is preferably an organic solvent, more preferably an aprotic polar solvent, and still more preferably an alcohol or ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (12c) is preferably 40 to 60° C., and more preferably 50 to 55° C.

The reaction pressure in the step (12c) is preferably 0.1 to 5 MPa, and more preferably 0.1 to 1 MPa.

The reaction duration in the step (12c) is preferably 0.1 to 72 hours, and more preferably 6 to 10 hours.

The elimination reaction for the leaving group in the step (13c) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (13c) may be performed in a polar solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (13c) is preferably 0 to 40° C., and more preferably 0 to 20° C.

The reaction pressure in the step (13c) is preferably 0.1 to 5 MPa, and more preferably 0.1 to 1 MPa.

The reaction duration in the step (13c) is preferably 0.1 to 72 hours, and more preferably 3 to 8 hours.

The oxidation in the step (14c) may be performed in a solvent in the presence of sodium chlorite.

The solvent may be an alcohol, such as methanol, ethanol, 1-propanol, isopropanol, 1-butanol, or tert-butyl alcohol, or water. A disodium hydrogen phosphate solution may be used as the buffer.

The compound (14c) may be brought into contact with an alkali to convert —COOH into a salt form. Examples of the alkali include sodium hydroxide, potassium hydroxide, lithium hydroxide, and ammonia; for example, an aqueous solution of ammonia is preferably used.

After the completion of each step, the solvent may be distilled off, or distillation, purification or the like may be performed to increase the purity of each resulting compound.

The surfactant (c) may also be suitably produced by a production method including:

a step (21c) of reacting a ketone represented by the formula:

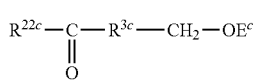

(wherein $R^{3c}$ is defined as described above; $R^{22c}$ is a monovalent organic group; and $E^c$ is a leaving group) and a carboxylate represented by the formula:

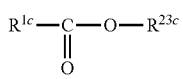

(wherein $R^{1c}$ is defined as described above; and $R^{23c}$ is a monovalent organic group) to provide a compound (21c) represented by the formula:

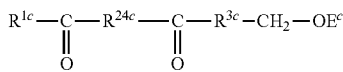

(wherein $R^{1c}$, $R^{3c}$, and $E^c$ are defined as described above; and $R^{24c}$ is a single bond or a divalent linking group);

a step (22c) of eliminating the leaving group in the compound (21c) to provide a compound (22c) represented by the formula:

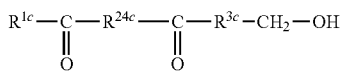

(wherein $R^{1c}$, $R^{24c}$, and $R^{3c}$ are defined as described above); and a step (23c) of oxidizing the compound (22c) to provide a compound (23c) represented by the formula:

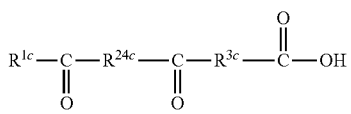

wherein $R^{1c}$, $R^{24c}$, and $R^{3c}$ are defined as described above.

When $R^{1c}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{22c}$ is preferably a linear or branched alkyl group having 1 or more carbon atoms, and more preferably a methyl group.

$R^{23c}$ is preferably a linear or branched alkyl group having 1 or more carbon atoms, and more preferably a methyl group.

$R^{24c}$ is preferably a linear or branched alkylene group having 1 or more carbon atoms, and more preferably a methylene group (—$CH_2$—).

The reaction in the step (21c) may be performed in a solvent in the presence of a base.

Examples of the base include sodium amide, sodium hydride, sodium methoxide, and sodium ethoxide.

The solvent is preferably an organic solvent, more preferably an aprotic polar solvent, and still more preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (21c) is preferably 0 to 40° C., and more preferably 0 to 20.

The reaction pressure in the step (21c) is preferably 0.1 to 5 MPa, and more preferably 0.1 to 1 MPa.

The reaction duration in the step (21c) is preferably 0.1 to 72 hours, and more preferably 3 to 8 hours.

The elimination reaction for the leaving group in the step (22c) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (22c) may be performed in a solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (22c) is preferably 0 to 40° C., and more preferably 0 to 20° C.

The reaction pressure in the step (22c) is preferably 0 to 5 MPa, and more preferably 0.1 to 1 MPa.

The reaction duration in the step (22c) is preferably 0.1 to 72 hours, and more preferably 3 to 8 hours.

The oxidation in the step (23c) may be performed in a solvent in the presence of sodium chlorite.

The solvent may be an alcohol or water. A disodium hydrogen phosphate solution may be used as the buffer.

The compound (23c) may be brought into contact with an alkali to convert —COOH into a salt form. Examples of the alkali include sodium hydroxide, potassium hydroxide, lithium hydroxide, and ammonia; for example, an aqueous solution of ammonia is preferably used.

After the completion of each step, the solvent may be distilled off, or distillation, purification or the like may be performed to increase the purity of each resulting compound.

The surfactant (c) may also be suitably produced by a production method including:

a step (31c) of reacting an alkyl halide represented by the formula: $Y^c$—$R^{3c}$—$CH_2$—$OE^c$
(wherein $R^{3c}$ is defined as described above; $Y^c$ is a halogen atom; and $E^c$ is a leaving group) and lithium acetylide represented by the formula:

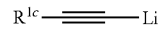

(wherein $R^{1c}$ is defined as described above) to provide a compound (31c) represented by the formula:

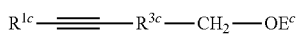

(wherein $R^{1c}$, $R^{3c}$, and $E^c$ are defined as described above); a step (32c) of oxidizing the compound (31c) to provide a compound (32c) represented by the formula:

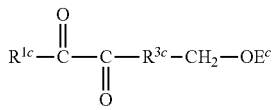

(wherein $R^{1c}$, $R^{3c}$, and $E^c$ are defined as described above); a step (33c) of eliminating the leaving group in the compound (32c) to provide a compound (33c) represented by the formula:

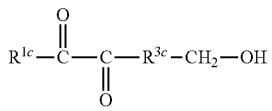

(wherein $R^{1c}$ and $R^{3c}$ are defined as described above); and a step (34c) of oxidizing the compound (33c) to provide a compound (34c) represented by the formula:

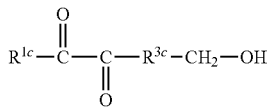

(wherein $R^{1c}$ and $R^{3c}$ are defined as described above).

When $R^{1c}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

Regarding the reaction ratio between the alkyl halide and the lithium acetylide in the step (31c), the lithium acetylide is preferably used in an amount of 1 to 2 mol, and more preferably 1 to 1.2 mol, based on 1 mol of the alkyl halide in consideration of the improvement of the yield and the reduction of the waste.

The reaction in the step (31c) may be performed in a solvent. Hexane is preferable as the solvent.

The reaction temperature in the step (31c) is preferably −100 to −40° C., and more preferably −80 to −50° C.

The reaction pressure in the step (31c) is preferably 0.1 to 5 MPa, and more preferably 0.1 to 1 MPa.

The reaction duration in the step (31c) is preferably 0.1 to 72 hours, and more preferably 6 to 10 hours.

The oxidation in the step (32c) may be performed in a nitrile solvent using a complex generated by treating [(Cn*)Ru$^{III}$(CF$_3$CO$_2$)$_3$]·H$_2$O (wherein Cn* is 1,4,7-trimethyl-1,4,7-triazabicyclononane) with (NH$_4$)$_2$Ce(NO$_3$)$_6$ and trifluoroacetic acid and then adding sodium perchlorate thereto.

After the completion of the oxidation, the product may be neutralized with an alkali, and then an organic solvent such as an ether may be used to extract the compound (32c).

The reaction temperature in the step (32c) is preferably −30 to 100° C., and more preferably 40 to 90° C.

The reaction pressure in the step (32c) is preferably 0.1 to 5 MPa, and more preferably 0.1 to 1 MPa.

The reaction duration in the step (32c) is preferably 0.1 to 72 hours, and more preferably 3 to 8 hours.

The elimination reaction for the leaving group in the step (33c) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate (LiBF$_4$), or ammonium fluoride; and a method using an organic salt such as tetrabutylammonium fluoride (TBAF).

The elimination reaction for the leaving group in the step (33c) may be performed in a solvent. The solvent is preferably an organic solvent, more preferably an aprotic polar solvent, and still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ether (15-crown-5, 18-crown-6), of which tetrahydrofuran and diethyl ether is preferred.

The reaction temperature in the step (33c) is preferably 0 to 40° C., and more preferably 0 to 20° C.

The reaction pressure in the step (33c) is preferably 0.1 to 5 MPa, and more preferably 0.1 to 1 MPa.

The reaction duration in the step (33c) is preferably 0.1 to 72 hours, and more preferably 3 to 8 hours.

The oxidation in the step (34c) may be performed in a solvent in the presence of sodium chlorite.

The solvent may be an alcohol or water. A disodium hydrogen phosphate solution may be used as the buffer.

The compound (34c) may be brought into contact with an alkali to convert —COOH into a salt form. Examples of the alkali include sodium hydroxide, potassium hydroxide, lithium hydroxide, and ammonia; for example, an aqueous solution of ammonia is preferably used.

After the completion of each step, the solvent may be distilled off, or distillation, purification or the like may be performed to increase the purity of each resulting compound.

The surfactant (c) may also be suitably produced by a production method including:

a step (51c) of reacting divinyl ketone represented by the formula:

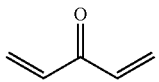

and 2-methylfuran represented by the formula:

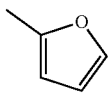

to provide a compound (51c) represented by the formula:

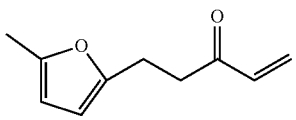

a step (52c) of reacting the compound (51c) and furan represented by the formula:

to provide a compound (52c) represented by the formula:

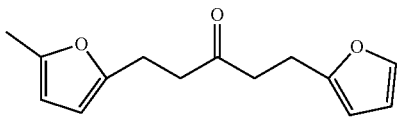 [SMILES: Cc1ccc(CCC(=O)CCc2ccco2)o1]

a step (53c) of heating the compound (52c) in the presence of an acid to provide a compound (53c) represented by the formula:

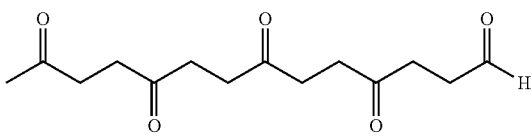 [SMILES: CC(=O)CCC(=O)CCC(=O)CCC(=O)CCC=O]

and
a step (54c) of oxidizing the compound (53c) to provide a compound (54c) represented by the formula:

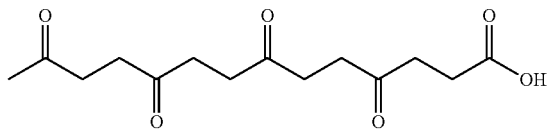 [SMILES: CC(=O)CCC(=O)CCC(=O)CCC(=O)CCC(=O)O]

Regarding the reaction ratio between divinyl ketone and 2-methyl furan in the step (51c), 2-methyl furan is preferably used in an amount of 0.5 to 1 mol, and more preferably 0.6 to 0.9 mol, based on 1 mol of divinyl ketone in consideration of the improvement of the yield and the reduction of the waste.

The reaction in the step (51c) is preferably performed in the presence of an acid. Examples of the acid include acetic acid, hydrochloric acid, and p-toluene sulfone, of which acetic acid is preferred.

The amount of the acid used in the step (51c) is preferably 0.1 to 2 mol, and more preferably 0.1 to 1 mol, based on 1 mol of the divinyl ketone in consideration of the improvement of the yield and the reduction of the waste.

The reaction in the step (51c) may be performed in a polar solvent. The solvent is preferably water or acetonitrile.

The reaction temperature in the step (51c) is preferably 20 to 100° C., and more preferably 40 to 100° C.

The reaction pressure in the step (51c) is preferably 0.1 to 5 MPa, and more preferably 0.1 to 1 MPa.

The reaction duration in the step (51c) is preferably 0.1 to 72 hours, and more preferably 4 to 8 hours.

Regarding the reaction ratio between the compound (51c) and the furan in the step (52c), the amount of the furan is preferably 1 to 2 mol, and more preferably 1 to 1.1 mol, based on 1 mol of the compound (51c) in consideration of the improvement of the yield and the reduction of the waste.

The reaction in the step (52c) is preferably performed in the presence of an acid. Examples of the acid include acetic acid, hydrochloric acid, and p-toluene sulfone, of which acetic acid is preferred.

The amount of the acid used in the step (52c) is preferably 0.1 to 2 mol, and more preferably 0.1 to 1 mol, based on 1 mol of the compound (51c) in consideration of the improvement of the yield and the reduction of the waste.

The reaction in the step (52c) may be performed in a polar solvent. Water is preferable as the solvent.

The reaction temperature in the step (52c) is preferably 20 to 100° C., and more preferably 40 to 100° C.

The reaction pressure in the step (52c) is preferably 0.1 to 5 MPa, and more preferably 0.1 to 1 MPa.

The reaction duration in the step (52c) is preferably 0.1 to 72 hours, and more preferably 4 to 8 hours.

In the step (53c), the furan ring is cleaved by heating the compound (52c) in the presence of an acid.

The acid is preferably hydrochloric acid or sulfuric acid.

The reaction in the step (53c) may be performed in a polar solvent. Water is preferable as the solvent.

The reaction temperature in the step (53c) is preferably 50 to 100° C., and more preferably 70 to 100° C.

The reaction pressure in the step (53c) is preferably 0.1 to 5 MPa, and more preferably 0.1 to 1 MPa.

The reaction duration in the step (53c) is preferably 0.1 to 72 hours, and more preferably 1 to 12 hours.

The oxidation in the step (54c) may be performed in a solvent in the presence of sodium chlorite.

The solvent may be tert-butyl alcohol or water. A disodium hydrogen phosphate solution may be used as the buffer.

The compound (54c) may be brought into contact with an alkali to convert —COOH into a salt form. Examples of the alkali include sodium hydroxide, potassium hydroxide, lithium hydroxide, and ammonia; for example, an aqueous solution of ammonia is preferably used.

After the completion of each step, the solvent may be distilled off, or distillation, purification or the like may be performed to increase the purity of each resulting compound.

The surfactant (c) may also be suitably produced by a production method including:
a step (61c) of reacting an alkene represented by the formula:

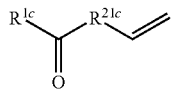

(wherein $R^{1c}$ is defined as described above; and $R^{21c}$ is a single bond or a divalent linking group) and an alkyne represented by the formula:

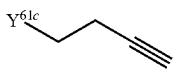

(wherein $Y^{61c}$ is an alkyl ester group) to provide a compound (61c) represented by the formula:

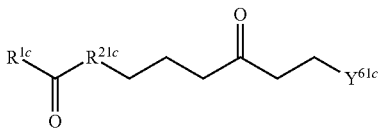

(wherein $R^{1c}$, $R^{21c}$, and $Y^{61c}$ are defined as described above); and a step (62c) of causing an alkali to act on the compound (61c) and then causing an acid to act thereon to provide a compound (62c) represented by the formula:

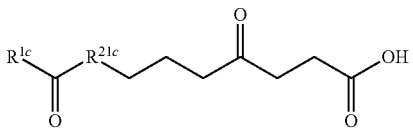

(wherein $R^{1c}$ and $R^{21c}$ are defined as described above).

When $R^{1c}$ contains a furan ring, the furan ring may be cleaved by an acid and converted into a dicarbonyl derivative, for example. Examples of the acid include acetic acid, hydrochloric acid, and p-toluene sulfone, of which acetic acid is preferred.

$R^{21c}$ is preferably a single bond or a linear or branched alkylene group having 1 or more carbon atoms.

Regarding the reaction ratio between the alkene and the alkyne in the step (61c), the alkene is preferably used in an amount of 0.5 to 2 mol, and more preferably 0.6 to 1.2 mol, based on 1 mol of the alkyne in consideration of the improvement of the yield and the reduction of the waste.

The reaction in the step (61c) is preferably performed in the presence of a metal catalyst. An example of the metal is ruthenium.

The amount of the metal catalyst used in the step (61c) is preferably 0.01 to 0.4 mol, and more preferably 0.05 to 0.1 mol, based on 1 mol of the alkene in consideration of the improvement of the yield and the reduction of the waste.

The reaction in the step (61c) may be performed in a polar solvent. The solvent is preferably water, acetonitrile, dimethylacetamide, or dimethylformamide.

The reaction temperature in the step (61c) is preferably 20 to 160° C., and more preferably 40 to 140° C.

The reaction pressure in the step (61c) is preferably 0.1 to 5 MPa, and more preferably 0.1 to 1 MPa.

The reaction duration in the step (61c) is preferably 0.1 to 72 hours, and more preferably 4 to 8 hours.

Regarding the reaction ratio between the compound (61c) and the alkali in the step (62c), the amount of the alkali is preferably 0.6 to 2 mol, and more preferably 0.8 to 1.1 mol, based on 1 mol of the compound (61c) in consideration of the improvement of the yield and the reduction of the waste.

The amount of the acid used in the step (62c) is preferably 1.0 to 20.0 mol, and more preferably 1.0 to 10.0 mol, based on 1 mol of the compound (61c) in consideration of the improvement of the yield and the reduction of the waste.

The reaction in the step (62c) may be performed in a polar solvent. Water is preferable as the solvent.

The reaction temperature in the step (62c) is preferably 0 to 100° C., and more preferably 20 to 100° C.

The reaction pressure in the step (62c) is preferably 0.1 to 5 MPa, and more preferably 0.1 to 1 MPa.

The reaction duration in the step (62c) is preferably 0.1 to 72 hours, and more preferably 4 to 8 hours.

The compound (62c) may be brought into contact with an alkali to convert —COOH into a salt form. Examples of the alkali include sodium hydroxide, potassium hydroxide, lithium hydroxide, and ammonia; for example, an aqueous solution of ammonia is preferably used.

After the completion of each step, the solvent may be distilled off, or distillation, purification or the like may be performed to increase the purity of each resulting compound.

The surfactant (d) will be described.

In the formula (d), $R^{1d}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In Rid, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1d}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1d}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{1d}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

In the formula (d), $R^{2d}$ and $R^{4d}$ are each independently H or a substituent. A plurality of $R^{2d}$ and $R^{4d}$ may be the same or different.

The substituent for each of $R^{2d}$ and $R^{4d}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2d}$ and $R^{4d}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

The alkyl group for each of $R^{2d}$ and $R^{4d}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group ($-CH_3$) or an ethyl group ($-C_2H_5$).

$R^{2d}$ and $R^{4d}$ are preferably each independently H or a linear or branched alkyl group having 1 to 10 carbon atoms and free from a carbonyl group, more preferably H or a linear or branched alkyl group having 1 to 3 carbon atoms and not having a substituent, still more preferably H, a methyl group ($-CH_3$), or an ethyl group ($-C_2H_5$), and particularly preferably H.

In the formula (d), $R^{3d}$ is an alkylene group having 1 to 10 carbon atoms and optionally having a substituent. When a plurality of $R^{3d}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group ($-CH_2-$), an ethylene group ($-C_2H_4-$), an isopropylene group ($-CH(CH_3)CH_2-$), or a propylene group ($-C_3H_6-$).

Any two of $R^{1b}$, $R^{2b}$, $R^{3b}$, and $R^{4b}$ optionally bind to each other to form a ring.

In the formula (d), n is an integer of 1 or more. In the formula, n is preferably an integer of 1 to 40, more preferably an integer of 1 to 30, and still more preferably an integer of 5 to 25.

In the formula (d), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (d), $A^d$ is $-SO_3X^d$ or $-COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different. $R^{5d}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^d$ may be a metal atom or $NR^{5d}_4$, wherein $R^{5d}$ is defined as described above. $X^d$ may be a metal atom or $NR^{5d}_4$, wherein $R^{5d}$ is defined as described above.

$X^d$ is preferably H, an alkali metal (Group 1), an alkaline earth metal (Group 2), or $NR^{5d}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^d$ is $NH_4$, the solubility of the surfactant in an aqueous medium is excellent, and the metal component is unlikely to remain in the PTFE or the final product.

In the formula (d), L is a single bond, $-CO_2-B-*$, $-OCO-B-*$, $-CONR^{6d}-B-*$, $-NR^{6d}CO-B-*$, or $-CO-$ other than the carbonyl groups in $-CO_2-B-$, $-OCO-B-$, $-CONR^{6d}-B-$, and $-NR^{6d}CO-B-$, wherein B is a single bond or an alkylene group having 1 to 10 carbon atoms and optionally having a substituent, $R^{6d}$ is H or an alkyl group having 1 to 4 carbon atoms and optionally having a substituent. The alkylene group more preferably has 1 to 5 carbon atoms. $R^{6d}$ is more preferably H or a methyl group. indicates the side bonded to $A^d$ in the formula.

L is preferably a single bond.

The surfactant preferably has a $^1$H-NMR spectrum in which all peak intensities observed in a chemical shift range of 2.0 to 5.0 ppm give an integral value of 10 or higher.

The surfactant preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (d) include:
$CH_3C(O)CH_2CH_2CH_2CH_2CH_2CH_2CH_2CH_2COOK$,
$CH_3C(O)CH_2CH_2CH_2CH_2CH_2CH_2CH_2COONa$,
$CH_3C(O)CH_2CH_2CH_2CH_2CH_2CH_2COONa$,
$CH_3C(O)CH_2CH_2CH_2CH_2CH_2COONa$,
$CH_3C(O)CH_2CH_2CH_2CH_2COONa$,
$CH_3C(O)CH_2CH_2CH_2COONa$,
$CH_3C(O)CH_2CH_2CH_2CH_2CH_2CH_2CH_2CH_2CH_2$ $CH_2CH_2CH_2COONa$, CH$_3$C(O)CH$_2$CH$_2$CH$_2$CH$_2$CH$_2$CH$_2$CH$_2$CH$_2$CH$_2$CH$_2$ CH$_2$ CH$_2$CH$_2$CH$_2$CH$_2$CH$_2$CH$_2$CH$_2$COONa,
(CH$_3$)$_3$CC(O)CH$_2$CH$_2$CH$_2$CH$_2$CH$_2$CH$_2$CH$_2$CH$_2$ COONa,
(CH$_3$)$_2$CHC(O)CH$_2$CH$_2$CH$_2$CH$_2$CH$_2$CH$_2$CH$_2$CH$_2$ COONa,
(CH$_2$)$_5$CHC(O)CH$_2$CH$_2$CH$_2$CH$_2$CH$_2$CH$_2$CH$_2$CH$_2$ COONa,
CH$_3$CH$_2$C(O)CH$_2$CH$_2$CH$_2$CH$_2$CH$_2$CH$_2$CH$_2$COONa,
CH$_3$CH$_2$CH$_2$C(O)CH$_2$CH$_2$CH$_2$CH$_2$CH$_2$CH$_2$COONa,
CH$_3$CH$_2$CH$_2$CH$_2$C(O)CH$_2$CH$_2$CH$_2$CH$_2$CH$_2$COONa,
CH$_3$CH$_2$CH$_2$CH$_2$CH$_2$C(O)CH$_2$CH$_2$CH$_2$CH$_2$COONa,
CH$_3$CH$_2$CH$_2$CH$_2$CH$_2$CH$_2$C(O)CH$_2$CH$_2$CH$_2$COONa,
CH$_3$CH$_2$CH$_2$CH$_2$CH$_2$CH$_2$CH$_2$C(O)CH$_2$CH$_2$COONa,
CH$_3$CH$_2$CH$_2$CH$_2$CH$_2$CH$_2$CH$_2$CH$_2$C(O)CH$_2$COONa,
CH$_3$C(O) CH$_2$CH$_2$CH$_2$CH$_2$CH$_2$CH$_2$CH$_2$CH$_2$OCH$_2$CH$_2$COONa,
CH$_3$C(O)CH$_2$CH$_2$CH$_2$CH$_2$CH$_2$CH$_2$CH$_2$CH$_2$C(O) NHCH$_2$COOK,
CH$_3$C(O)CH$_2$CH$_2$CH$_2$CH$_2$CH$_2$CH$_2$CH$_2$CH$_2$NHC(O) CH$_2$COOK,
CH$_3$C(O)CH$_2$CH$_2$CH$_2$CH$_2$CH$_2$CH$_2$CH$_2$CH$_2$C(O) OCH$_2$COONa,
CH$_3$C(O)CH$_2$CH$_2$CH$_2$CH$_2$CH$_2$CH$_2$CH$_2$CH$_2$OC(O) CH$_2$COONa,
CH$_3$C(O)CH$_2$CH$_2$CH$_2$CH$_2$CH$_2$CH$_2$CH$_2$CH$_2$C(O) COONa,
CH$_3$C(O)CH$_2$CH$_2$CH$_2$CH$_2$CH$_2$CH$_2$CH$_2$CH$_2$C(O) COOH,
CH$_3$C(O)CH$_2$CH$_2$CH$_2$CH$_2$CH$_2$CH$_2$CH$_2$CH$_2$C(O) COOLi,
CH$_3$C(O)CH$_2$CH$_2$CH$_2$CH$_2$CH$_2$CH$_2$CH$_2$CH$_2$C(O) COONH$_4$,
CH$_3$C(O)CH$_2$CH$_2$CH$_2$CH$_2$CH$_2$CH$_2$CH$_2$CH$_2$C(O) COONa, CH$_3$C(O)CH$_2$CH$_2$CH$_2$CH$_2$C H$_2$CH$_2$CH$_2$C(CH$_3$)$_2$COOK,
CH$_3$C(O)CH$_2$CH$_2$CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$SO$_3$Na,
CH$_3$C(O)CH$_2$CH$_2$CH$_2$CH$_2$CH$_2$SO$_3$Na,
CH$_3$C(O)CH$_2$CH$_2$CH$_2$CH$_2$SO$_3$Na,
CH$_3$C(O)CH$_2$CH$_2$CH$_2$CH$_2$CH$_2$CH$_2$CH$_2$CH$_2$CH$_2$CH$_2$ CH$_2$ CH$_2$CH$_2$SO$_3$Na,
CH$_3$C(O)CH$_2$CH$_2$CH$_2$CH$_2$CH$_2$CH$_2$CH$_2$CH$_2$CH$_2$CH$_2$ CH$_2$ CH$_2$CH$_2$CH$_2$CH$_2$CH$_2$CH$_2$SO$_{3Na}$,
CH$_3$C(O)CH$_2$CH$_2$CH$_2$CH$_2$CH$_2$CH$_2$CH$_2$CH$_2$CH$_2$CH$_2$ SO$_3$Na,
(CH$_3$)$_3$CC(O)CH$_2$CH$_2$CH$_2$CH$_2$CH$_2$CH$_2$CH$_2$CH$_2$ SO$_3$Na,
(CH$_3$)$_2$CHC(O)CH$_2$CH$_2$CH$_2$CH$_2$CH$_2$CH$_2$CH$_2$CH$_2$CH$_2$ SO$_3$Na,
(CH$_2$)$_5$CHC(O) CH$_2$CH$_2$CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$CH$_2$SO$_3$Na,
CH$_3$C(O)CH$_2$CH$_2$CH$_2$CH$_2$CH$_2$CH$_2$SO$_3$Na,
CH$_3$C(O)CH$_2$CH$_2$CH$_2$CH$_2$CH$_2$SO$_3$Na,
CH$_3$C(O)CH$_2$CH$_2$CH$_2$CH$_2$SO$_3$Na,
CH$_3$C(O)CH$_2$CH$_2$CH$_2$SO$_3$Na,
CH$_3$C(O)CH$_2$CH$_2$SO$_3$Na,
CH$_3$C(O)CH$_2$SO$_3$Na,
CH$_3$C(O)CH$_2$CH$_2$CH$_2$CH$_2$CH$_2$CH$_2$CH$_2$CH$_2$OCH$_2$ CH$_2$SO$_3$Na,
CH$_3$C(O)CH$_2$CH$_2$CH$_2$CH$_2$CH$_2$CH$_2$CH$_2$CH$_2$C(O) NHCH$_2$SO$_3$Na,
CH$_3$C(O)CH$_2$CH$_2$CH$_2$CH$_2$CH$_2$CH$_2$CH$_2$CH$_2$NHC (O)CH$_2$SO$_3$Na,
CH$_3$C(O)CH$_2$CH$_2$CH$_2$CH$_2$CH$_2$CH$_2$CH$_2$CH$_2$C(O) SO$_3$Na,
CH$_3$C(O)CH$_2$CH$_2$CH$_2$CH$_2$CH$_2$CH$_2$CH$_2$CH$_2$C(O) OCH$_2$SO$_3$Na,
CH$_3$C(O)CH$_2$CH$_2$CH$_2$CH$_2$CH$_2$CH$_2$CH$_2$CH$_2$OC(O) CH$_2$SO$_3$Na,
CH$_3$C(O)CH$_2$CH$_2$CH$_2$CH$_2$CH$_2$CH$_2$CH$_2$CH$_2$SO$_3$H,
CH$_3$C(O)CH$_2$CH$_2$CH$_2$CH$_2$CH$_2$CH$_2$CH$_2$CH$_2$SO$_3$K,
CH$_3$C(O)CH$_2$CH$_2$CH$_2$CH$_2$CH$_2$CH$_2$CH$_2$CH$_2$SO$_3$Li,
CH$_3$C(O)CH$_2$CH$_2$CH$_2$CH$_2$CH$_2$CH$_2$CH$_2$CH$_2$CH$_2$ SO$_3$NH$_4$, and
CH$_3$C(O)CH$_2$CH$_2$CH$_2$CH$_2$CH$_2$CH$_2$CH$_2$CH$_2$C(CH$_3$) 2SO$_3$Na.

The surfactant (d) is a novel compound, and may be produced by any of the following production methods, for example.

The surfactant (d) may be suitably produced by a production method including:
a step (11d) of reacting a compound (10d) represented by the following formula:

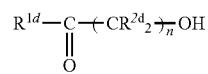

(wherein R$^{1d}$, R$^{2d}$, and n are defined as described above) and a sultone represented by the following formula:

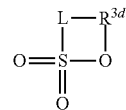

(wherein R$^{3d}$ is defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, R$^{6d}$ is H or an alkyl group having 1 to 4 carbon atoms and optionally having a substituent; and indicates the side bonded to —S(=O)$_2$— in the formula) to provide a compound (11d) represented by the following formula:

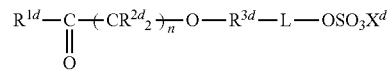

wherein R$^{1d}$ to R$^{3d}$, n, and X$^d$ are defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, R$^{6d}$ is H or an alkyl group having 1 to 4 carbon atoms and optionally having a substituent; and indicates the side bonded to —OSO$_3$X$^d$ in the formula.

The reaction in the step (11d) may be performed in the presence of a base.

Examples of the base include sodium hydride, sodium hydroxide, potassium hydroxide, and triethylamine. The base may be used in an amount of 0.5 to 20 mol based on 1 mol of the compound (10d).

The reaction in the step (11d) may be performed in a solvent.

The solvent is preferably an organic solvent, and more preferably an aprotic polar solvent. Examples of the organic solvent include ethers, aromatic compounds, nitriles, and halogenated hydrocarbons.

Examples of the ether include diethyl ether, tetrahydrofuran, dioxane, and diethylene glycol diethyl ether, of which diethyl ether and tetrahydrofuran are preferred.

Examples of the aromatic compound include benzene, toluene, and xylene, of which benzene is preferred.

Examples of the nitrile include acetonitrile, propionitrile, butyronitrile, isobutyronitrile, and benzonitrile, of which acetonitrile is preferred.

Examples of the halogenated hydrocarbon include dichloromethane, dichloroethane, chloroform, chlorobenzene, and o-dichlorobenzene, of which dichloromethane and chloroform are preferred.

The reaction temperature in the step (11d) is preferably −78 to 150° C., and more preferably −20 to 100° C.

The reaction pressure in the step (11d) is preferably 0 to 10 MPa, and more preferably 0 to 1.0 MPa.

The reaction duration in the step (11d) is preferably 0.1 to 72 hours, and more preferably 0.1 to 48 hours.

The surfactant (d) may also be suitably produced by a production method including:

a step (21d) of oxidizing a compound (20d) represented by the following formula:

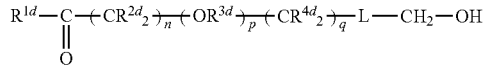

(wherein $R^{1d}$ to $R^{4d}$, n, p, and q are defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, $R^{6d}$ is H or an alkyl group having 1 to 4 carbon atoms and optionally having a substituent; and indicates the side bonded to —CH$_2$—OH in the formula)

to provide a compound (21d) represented by the following formula:

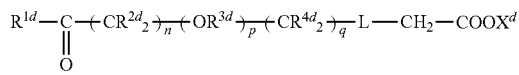

wherein $R^{1d}$ to $R^{4d}$, n, p, q, and $X^d$ are defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, $R^{6d}$ is H or an alkyl group having 1 to 4 carbon atoms and optionally having a substituent; and indicates the side bonded to —CH$_2$—COOX$^d$ in the formula.

The oxidation in the step (21d) may performed by causing a nitrosating agent to act on the compound (20d).

The nitrosating agent may be sodium nitrite, nitrosyl sulfuric acid, isoamyl nitrite or the like.

The nitrosating agent may be used in an amount of 0.5 to 10 mol based on 1 mol of the compound (20d).

The oxidation in the step (21d) may be performed in a solvent. The solvent may be trifluoroacetic acid, acetonitrile, or the like.

The oxidation temperature in the step (21d) is preferably −78 to 200° C., and more preferably −20 to 100° C.

The oxidation pressure in the step (21d) is preferably 0 to 10 MPa, and more preferably 0 to 1.0 MPa.

The oxidation duration in the step (21d) is preferably 0.1 to 72 hours, and more preferably 0.1 to 24 hours.

The compound (10d) and the compound (20d) may be produced by a production method including:

a step (101d) of hydroxylating a compound (100d) represented by the following formula:

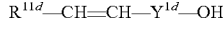

(wherein $R^{11d}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; $Y^{1d}$ is —(CR$^{2d}_2$)$_n$— or —(CR$^{2d}_2$)$_n$—(OR$^{3d}$)$_p$—(CR$^{4d}_2$)$_q$-L-CH$_2$—, wherein $R^{2d}$ to $R^{4d}$, n, L, p, and q are defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, $R^{6d}$ is H or an alkyl group having 1 to 4 carbon atoms and optionally having a substituent; and indicates the side bonded to —CH$_2$— in the formula) to provide a compound (101d) represented by the following formula:

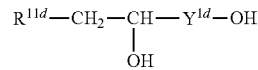

(wherein $R^{11d}$ and $Y^{1d}$ are defined as described above); and a step (102d) of oxidizing the compound (101d) to provide a compound (102d) represented by the following formula:

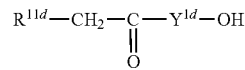

(wherein $R^{11d}$ and $Y^{1d}$ are defined as described above).

The alkyl group for $R^{11d}$ is preferably free from a carbonyl group.

In the alkyl group for $R^{11d}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{11d}$ is preferably H, a linear or branched alkyl group having 1 to 9 carbon atoms and optionally having a substituent, or a cyclic alkyl group having 3 to 9 carbon atoms and optionally having a substituent, more preferably H, a linear or branched alkyl group having 1 to 9 carbon atoms and free from a carbonyl group, or a cyclic alkyl group having 3 to 9 carbon atoms and free from a carbonyl group, still more preferably H or a linear or branched alkyl group having 1 to 9 carbon atoms and not having a substituent, further preferably H, a methyl group (—$CH_3$), or an ethyl group (—$C_2H_5$). particularly preferably H or a methyl group (—$CH_3$), and most preferably H.

The hydroxylation in the step (101b) may be performed by a method (1d) in which iron(II) phthalocyanine (Fe(Pc)) and sodium borohydride are caused to act on the compound (100d) in an oxygen atmosphere or a method (2d) in which isopinocampheylborane (IpcBH$_2$) is caused to act on the compound (100d) and then the resulting intermediate (dialkyl borane) is oxidized.

In the method (1d), iron(II) phthalocyanine may be used in a catalytic amount, and may be used in an amount of 0.001 to 1.2 mol based on 1 mol of the compound (100b).

In the method (1d), sodium borohydride may be used in an amount of 0.5 to 20 mol based on 1 mol of the compound (100d).

The reaction in the method (1d) may be performed in a solvent. The solvent is preferably an organic solvent, and examples thereof include ethers, halogenated hydrocarbons, aromatic hydrocarbons, nitriles, and nitrogen-containing polar organic compounds.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

The reaction temperature in the method (1d) is preferably −78 to 200° C., and more preferably 0 to 150° C.

The reaction pressure in the method (1d) is preferably 0 to 5.0 MPa, and more preferably 0.1 to 1.0 MPa.

The reaction duration in the method (1d) is preferably 0.1 to 72 hours, and more preferably 0.1 to 48 hours.

In the method (2d), isopinocampheylborane may be used in an amount of 1.0 to 10.0 mol based on 1 mol of the compound (100d).

The reaction of the compound (100d) and isopinocampheylborane may be performed in a solvent. The solvent is preferably an organic solvent, and examples thereof include ethers, halogenated hydrocarbons, and aromatic hydrocarbons.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature of the compound (100d) and isopinocampheylborane is preferably −78 to 200° C., and more preferably 0 to 150° C.

The reaction pressure of the compound (100d) and isopinocampheylborane is preferably 0 to 5.0 MPa, and more preferably 0.1 to 1.0 MPa.

The duration of the reaction of the compound (100d) and isopinocampheylborane is preferably 0.1 to 72 hours, and more preferably 0.1 to 48 hours.

The oxidation in the method (2d) may be performed by causing an oxidizing agent to act on the intermediate. An example of the oxidizing agent is hydrogen peroxide. The oxidizing agent may be used in an amount of 0.7 to 10 mol based on 1 mol of the intermediate.

The oxidation in the method (2d) may be performed in a solvent. Examples of the solvent include water, methanol, and ethanol, of which water is preferred.

The oxidation temperature in the step (2d) is preferably 0 to 100° C., and more preferably 0 to 80° C.

The oxidation pressure in the method (2d) is preferably 0 to 5.0 MPa, and more preferably 0.1 to 1.0 MPa.

The oxidation duration in the step (2d) is preferably 0.1 to 72 hours, and more preferably 0.1 to 48 hours.

Examples of the method of oxidizing the compound (101d) in the step (102d) include (α) a method of using Jones reagent (CrO$_3$/H$_2$SO$_4$) (Jones oxidation), (d) a method of using Dess-Martin periodinane (DMP) (Dess-Martin oxidation), (c) a method of using pyridinium chlorochromate (PCC), (d) a method of causing a bleaching agent (about 5% to 6% aqueous solution of NaOCl) to act in the presence of a nickel compound such as NiCl$_2$, and (e) a method of causing a hydrogen acceptor such as an aldehyde or a ketone to act in the presence of an aluminum catalyst such as Al(CH$_3$)$_3$ or Al[OCH(CH$_3$)$_2$]$_3$ (Oppenauer oxidation).

The oxidation in the step (102d) may be performed in a solvent. The solvent is preferably water or an organic solvent, and examples thereof include water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol, of which acetone is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

The oxidation temperature in the step (102d) is preferably −78 to 200° C., and may appropriately be selected in accordance with the method used.

The oxidation pressure in the step (102d) is preferably 0 to 5.0 MPa, and may appropriately be selected in accordance with the method used.

The oxidation duration in the step (102d) is preferably 0.1 to 72 hours, and may appropriately be selected in accordance with the method used.

The compound (10d) and the compound (20d) may also be produced by a production method including a step (201d) of ozonolyzing a compound (200d) represented by the following formula:

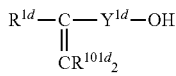

(wherein $R^{1d}$ and $Y^{1d}$ are defined as described above; and $R^{101b}$ is an organic group); and to provide a compound (201d) represented by the following formula:

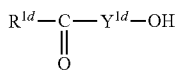

wherein $R^{1d}$ and $Y^{1d}$ are defined as described above.

$R^{101d}$ is preferably an alkyl group having 1 to 20 carbon atoms. The two $R^{101d}$ may be the same as or different from each other.

The ozonolysis in the step (201d) may be performed by causing ozone to act on the compound (200d), followed by post-treatment with a reducing agent.

The ozone may be generated by dielectric barrier discharge in oxygen gas.

Examples of the reducing agent used in the post-treatment include zinc, dimethyl sulfide, thiourea, and phosphines, of which phosphines are preferred.

The ozonolysis in the step (201d) may be performed in a solvent. The solvent is preferably water or an organic solvent, and examples thereof include water, alcohols, carboxylic acids, ethers, halogenated hydrocarbons, and aromatic hydrocarbons.

Examples of the alcohol include methanol, ethanol, 1-propanol, and isopropanol. Of these, methanol and ethanol are preferred.

Examples of the carboxylic acids include acetic acid and propionic acid. Of these, acetic acid is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The ozonolysis temperature in the step (201d) is preferably −78 to 200° C., and more preferably 0 to 150° C.

The ozonolysis pressure in the step (201d) is preferably 0 to 5.0 MPa, and more preferably 0.1 to 1.0 MPa.

The ozonolysis duration in the step (201d) is preferably 0.1 to 72 hours, and more preferably 0.1 to 48 hours.

The compound (10d) and the compound (20d) may also be produced by a production method including:
a step (301d) of epoxidizing a compound (300d) represented by the following formula:

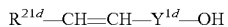

(wherein $Y^{1d}$ is defined as described above; and $R^{21d}$ is H, a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms) to provide a compound (301d) represented by the following formula:

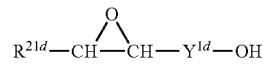

(wherein $R^{21d}$ and $Y^{1d}$ are defined as described above);
a step (302d) of reacting the compound (301d) with a lithium dialkylcopper represented by $R^{22d}{}_2CuLi$ (wherein $R^{22b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms) to provide a compound (302b) represented by the following formula:

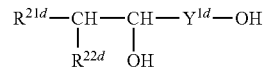

(wherein $R^{21d}$, $R^{22d}$, and $Y^{1d}$ are defined as described above); and
a step (303d) of oxidizing the compound (302d) to provide a compound (303d) represented by the following formula:

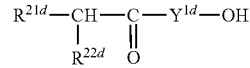

(wherein $R^{21d}$, $R^{22d}$, and $Y^{1d}$ are defined as described above).

The alkyl group for $R^{21d}$ is preferably free from a carbonyl group.

In the alkyl group for $R^{21d}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^{21d}$ is preferably H, a linear or branched alkyl group having 1 to 8 carbon atoms and optionally having a substituent, or a cyclic alkyl group having 3 to 8 carbon atoms and optionally having a substituent, more preferably H, a linear or branched alkyl group having 1 to 8 carbon atoms and free from a carbonyl group, or a cyclic alkyl group having 3 to 8 carbon atoms and free from a carbonyl group, still more preferably H or a linear or branched alkyl group having 1 to 8 carbon atoms and not having a substituent, particularly preferably H or a methyl group (—CH$_3$), and most preferably H.

The alkyl group for R$^{22d}$ is preferably free from a carbonyl group.

In the alkyl group for R$^{22d}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

R$^{22d}$ is preferably a linear or branched alkyl group having 1 to 9 carbon atoms and optionally having a substituent or a cyclic alkyl group having 3 to 9 carbon atoms and optionally having a substituent, more preferably a linear or branched alkyl group having 1 to 9 carbon atoms and free from a carbonyl group or a cyclic alkyl group having 3 to 9 carbon atoms and free from a carbonyl group, still more preferably a linear or branched alkyl group having 1 to 9 carbon atoms and not having a substituent, particularly preferably a methyl group (—CH$_3$) or an ethyl group (—C$_2$H$_5$), and most preferably a methyl group (—CH$_3$).

The two R$^{22d}$ may be the same as or different from each other.

The total number of carbon atoms of R$^{21d}$ and R$^{22d}$ is preferably 1 to 7, more preferably 1 to 2, and most preferably 1.

The epoxidation in the step (301d) may be performed by causing an epoxidizing agent to act on the compound (300d).

Examples of the epoxidizing agent include peroxy acids such as meta-chloroperbenzoic acid (m-CPBA), perbenzoic acid, hydrogen peroxide, and tert-butyl hydroperoxide, dimethyl dioxolane, and methyl trifluoromethyl dioxolane, of which peroxy acids are preferred, and meta-chloroperbenzoic acid is more preferred.

The epoxidizing agent may be used in an amount of 0.5 to 10.0 mol based on 1 mol of the compound (300d).

The epoxidation in the step (301d) may be performed in a solvent. The solvent is preferably an organic solvent, and examples thereof include ketones, ethers, halogenated hydrocarbons, aromatic hydrocarbons, nitriles, pyridines, nitrogen-containing polar organic compounds, and dimethyl sulfoxide, of which dichloromethane is preferred.

Examples of the ketones include acetone, methyl ethyl ketone, methyl isobutyl ketone, cyclohexanone, and diacetone alcohol, of which acetone is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

The epoxidation temperature in the step (301d) is preferably −78 to 200° C., and more preferably −40 to 150° C.

The epoxidation pressure in the step (301d) is preferably 0 to 5.0 MPa, and more preferably 0.1 to 1.0 MPa.

The epoxidation duration in the step (301d) is preferably 0.1 to 72 hours, and more preferably 0.1 to 48 hours.

In the step (302d), the lithium dialkylcopper may be used in an amount of 0.5 to 10.0 mol based on 1 mol of the compound (301d).

The reaction in the step (302d) may be performed in a solvent. The solvent is preferably an organic solvent, and examples thereof include ethers, halogenated hydrocarbons, and aromatic hydrocarbons.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

The reaction temperature in the step (302d) is preferably −78 to 200° C., and more preferably −40 to 150° C.

The reaction pressure in the step (302d) is preferably 0 to 5.0 MPa, and more preferably 0.1 to 1.0 MPa.

The reaction duration in the step (302d) is preferably 0.1 to 72 hours, and more preferably 0.1 to 48 hours.

Examples of the method of oxidizing the compound (302d) in the step (303d) include (α) a method of using Jones reagent (CrO$_3$/H$_2$SO$_4$) (Jones oxidation), (b) a method of using Dess-Martin periodinane (DMP) (Dess-Martin oxidation), (c) a method of using pyridinium chlorochromate (PCC), (d) a method of causing a bleaching agent (about 5% to 6% aqueous solution of NaOCl) to act in the presence of a nickel compound such as NiCl$_2$, and (e) a method of causing a hydrogen acceptor such as an aldehyde and a ketone to act in the presence of an aluminum catalyst such as Al(CH$_3$)$_3$ or Al[OCH(CH$_3$)$_2$]$_3$ (Oppenauer oxidation).

The oxidation in the step (303d) may be performed in a solvent. The solvent is preferably water or an organic solvent, and examples thereof include water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol, of which acetone is preferred.

Examples of the alcohol include methanol, ethanol, 1-propanol, and isopropanol. Of these, methanol and ethanol are preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the aromatic hydrocarbon include benzene, toluene, and xylene, of which benzene and toluene are preferred.

Examples of the nitrile include acetonitrile, propionitrile, butyronitrile, isobutyronitrile, and benzonitrile, of which acetonitrile is preferred.

The oxidation temperature in the step (303d) is preferably −78 to 200° C., and may appropriately be selected in accordance with the method used.

The oxidation pressure in the step (303d) is preferably 0 to 5.0 MPa, and may appropriately be selected in accordance with the method used.

The oxidation duration in the step (303d) is preferably 0.1 to 72 hours, and may appropriately be selected in accordance with the method used.

The compound (10d) and the compound (20d) may also be produced by a production method including a step (401d) of oxidizing a compound (100d) represented by the following formula:

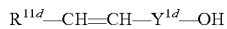

(wherein $R^{11d}$ and $Y^{1d}$ are defined as described above) to provide a compound (401d) represented by the following formula:

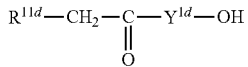

(wherein $R^{11d}$ and $Y^{1d}$ are defined as described above).

The oxidation in the step (401d) may be performed by causing an oxidizing agent to act on the compound (100d) in the presence of water and a palladium compound.

Examples of the oxidizing agent include monovalent or divalent copper salts such as copper chloride, copper acetate, copper cyanide, and copper trifluoromethanethiolate, iron salts such as iron chloride, iron acetate, iron cyanide, iron trifluoromethanethiolate, and hexacyanoferrates, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen. Of these, copper salts, iron salts, and benzoquinones are preferred, and copper chloride, iron chloride, and 1,4-benzoquinone are more preferred.

The oxidizing agent may be used in an amount of 0.001 to 10 mol based on 1 mol of the compound (100d).

The water may be used in an amount of 0.5 to 1,000 mol based on 1 mol of the compound (100d).

An example of the palladium compound is palladium dichloride. The palladium compound may be used in a catalytic amount, and may be used in an amount of 0.0001 to 1.0 mol based on 1 mol of the compound (100d).

The oxidation in the step (401d) may be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethyl sulfoxide, and sulfolane.

Examples of the esters include ethyl acetate, butyl acetate, ethylene glycol monomethyl ether acetate, and propylene glycol monomethyl ether acetate (PGMEA, also known as 1-methoxy-2-acetoxypropane), of which ethyl acetate is preferred.

Examples of the aliphatic hydrocarbons include hexane, cyclohexane, heptane, octane, nonane, decane, undecane, dodecane, and mineral spirits, of which cyclohexane and heptane are preferred.

Examples of the aromatic hydrocarbon include benzene, toluene, and xylene, of which benzene and toluene are preferred.

Examples of the alcohol include methanol, ethanol, 1-propanol, and isopropanol.

Examples of the carboxylic acids include acetic acid and propionic acid. Of these, acetic acid is preferred.

Examples of the ether include diethyl ether, tetrahydrofuran, dioxane, and diethylene glycol diethyl ether, of which diethyl ether and tetrahydrofuran are preferred.

Examples of the halogenated hydrocarbon include dichloromethane, dichloroethane, chloroform, chlorobenzene, and o-dichlorobenzene, of which dichloromethane and chloroform are preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone, of which N,N-dimethylformamide, N,N-dimethylacetamide, and N-methyl-2-pyrrolidone are preferred.

Examples of the nitrile include acetonitrile, propionitrile, butyronitrile, isobutyronitrile, and benzonitrile, of which acetonitrile is preferred.

The oxidation temperature in the step (401d) is preferably −78 to 200° C., and more preferably −20 to 150° C.

The oxidation pressure in the step (401d) is preferably 0 to 10 MPa, and more preferably 0.1 to 5.0 MPa.

The oxidation duration in the step (401d) is preferably 0.1 to 72 hours, and more preferably 0.1 to 48 hours.

The surfactant (d) may also be produced by a production method including:

a step (31d) of oxidizing a compound (30d) represented by the following formula:

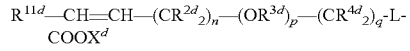

(wherein $R^{2d}$ to $R^{4d}$, $R^{11d}$, n, p, q, and $X^d$ are defined as described above; L is a single bond, —CO$_2$—B—*, —OCO—B—*, —CONR$^{6d}$—B—*, —NR$^{6d}$CO—B—*, or —CO— other than the carbonyl groups in —CO$_2$—B—, —OCO—B—, —CONR$^{6d}$—B—, and —NR$^{6d}$CO—B—, wherein B is a single bond or an alkylene group having 1 to 10 carbon atoms and optionally having a substituent, $R^{6d}$ is H or an alkyl group having 1 to 4 carbon atoms and optionally having a substituent; and the alkylene group more preferably has 1 to 5 carbon atoms; $R^{6d}$ is more preferably H or a methyl group; and indicates the side bonded to —COOX$^d$ in the formula) to provide a compound (31d) represented by the following formula:

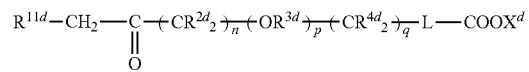

(wherein $R^{2d}$ to $R^{4d}$, L, $R^{11d}$, n, p, q, and $X^d$ are defined as described above).

The oxidation in the step (31d) may be performed by causing an oxidizing agent to act on the compound (30d) in the presence of water and a palladium compound under the same conditions as in the oxidation in the step (401d).

In any of the production methods described above, after the completion of each step, the solvent may be distilled off, or distillation, purification or the like may be performed to increase the purity of the resulting compounds. For the resulting compounds in which $X^d$ is H, such as those containing —SO$_3$H, —COOH, or the like, the compounds may be brought into contact with an alkali such as sodium carbonate or ammonia to covert these groups into the form of a salt.

In the production method of the present disclosure, two or more of the hydrocarbon anionic surfactants may be used at the same time.

The polymerization step is a step of polymerizing tetrafluoroethylene alone or tetrafluoroethylene and a modifying monomer in an aqueous medium in the presence of a specific hydrocarbon anionic surfactant, and the step also preferably includes a step of continuously adding the specific hydrocarbon anionic surfactant.

Adding the specific hydrocarbon anionic surfactant continuously means, for example, adding the specific hydrocarbon anionic surfactant not all at once, but adding over time and without interruption or adding in portions.

The specific hydrocarbon anionic surfactant is, for example, the surfactant described above (1), the hydrocarbon anionic surfactant having one or more carbonyl groups which are not in a carboxyl group described above, or a hydrocarbon anionic surfactant obtained by radically treating or oxidizing the hydrocarbon anionic surfactant having one or more carbonyl groups which are not in a carboxyl group. The specific hydrocarbon anionic surfactant is also preferably the hydrocarbon anionic surfactant having one or more carbonyl groups which are not in a carboxyl group described above or a hydrocarbon anionic surfactant obtained by radically treating or oxidizing the hydrocarbon anionic surfactant having one or more carbonyl groups which are not in a carboxyl group.

By including the method described above, it is possible to obtain an aqueous dispersion having a smaller average primary particle size and superior stability. Also, an aqueous dispersion having a smaller amount of uncoagulated polymer can be obtained.

The present disclosure also provides a polytetrafluoroethylene obtained by a production method including a step of polymerizing tetrafluoroethylene alone or tetrafluoroethylene and a modifying monomer in an aqueous medium in the presence of a specific hydrocarbon anionic surfactant, and a step of continuously adding the specific hydrocarbon anionic surfactant in the step.

In the production method, the step of continuously adding the specific hydrocarbon anionic surfactant is preferably a step of adding the specific hydrocarbon anionic surfactant to the aqueous medium when the concentration of PTFE formed in the aqueous medium is 0.5% by mass or less. Further, the specific hydrocarbon anionic surfactant is more preferably started to be added when the concentration is 0.50% by mass or less, still more preferably started to be added when the concentration is 0.36% by mass or less, further preferably started to be added when the concentration is 0.30% by mass or less, still further preferably started to be added when the concentration is 0.20% by mass or less, particularly preferably started to be added when the concentration is 0.10% by mass or less, and most preferably started to be added when the polymerization is initiated. The concentration is a concentration based on the total of the aqueous medium and PTFE.

In the step of continuously adding the specific hydrocarbon anionic surfactant, the amount of the specific hydrocarbon anionic surfactant added is preferably 0.01 to 10% by mass based on 100% by mass of the aqueous medium. The lower limit thereof is more preferably 0.05% by mass, still more preferably 0.1% by mass while the upper limit thereof is more preferably 5% by mass, and still more preferably 1% by mass.

In the step of polymerizing tetrafluoroethylene alone or tetrafluoroethylene and a modifying monomer in an aqueous medium in the presence of a specific hydrocarbon anionic surfactant, the amount of the specific hydrocarbon anionic surfactant is preferably large, and is preferably 0.0001 to 10% by mass based on 100% by mass of the aqueous medium. The lower limit thereof is more preferably 0.001% by mass, while the upper limit thereof is more preferably 1% by mass.

The specific hydrocarbon anionic surfactant is preferably at least one selected from the group consisting of the surfactant (1) represented by the general formula (1), the surfactant (a) represented by formula (a), the surfactant (b) represented by formula (b), the surfactant (c) represented by formula (c), the surfactant (d) represented by formula (d), and the surfactant obtained by radically treating or oxidizing the surfactants (a) to (d), and more preferably at least one selected from the group consisting of the surfactant (a) represented by formula (a), the surfactant (b) represented by formula (b), the surfactant (c) represented by formula (c), the surfactant (d) represented by formula (d), and the surfactant obtained by radically treating or oxidizing the surfactants (a) to (d).

The hydrocarbon anionic surfactant used in the production method of the present disclosure is also preferably a carboxylic acid-type hydrocarbon surfactant. Carboxylic acid-type hydrocarbon surfactants tend to have a shorter coagulation completion time than sulfate surfactants. However, according to the production method of the present disclosure, an aqueous dispersion having a long coagulation completion time can be produced even when a carboxylic acid-type hydrocarbon surfactant is used.

That is, the production method of the present disclosure is particularly suitable when the hydrocarbon anionic surfactant is a carboxylic acid-type hydrocarbon surfactant.

The carboxylic acid-type hydrocarbon surfactant is usually an anionic hydrocarbon surfactant having a hydrophilic moiety formed of carboxylate and a hydrophobic moiety which is a long chain hydrocarbon moiety such as alkyl. In particular, the carboxylic acid-type hydrocarbon anionic surfactant is not limited as long as it has a carboxyl group or a group in which the hydrogen atom of the carboxyl group is substituted with an inorganic cation (for example, metal atoms, ammonium, etc.), and for example, a hydrocarbon anionic surfactant having a carboxyl group or a group in which the hydrogen atom of the carboxyl group is substituted with an inorganic cation can be used from among the hydrocarbon anionic surfactants described above.

The carboxylic acid-type hydrocarbon surfactant may be an aliphatic-type carboxylic acid-type hydrocarbon surfactant or a carboxylic acid-type hydrocarbon surfactant other than the aliphatic-type.

As used herein, the term "aliphatic-type carboxylic acid-type hydrocarbon surfactant" means a carboxylic acid type hydrocarbon surfactant free from a carbonyl group which is not in a carboxyl group or an ester group.

The ester group means a group represented by —COO— or —OCO—.

The carboxylic acid-type hydrocarbon surfactant used may be, for example, a hydrocarbon anionic surfactant having a group in which the hydrogen atom of the carboxyl group or the carboxyl group is substituted with an inorganic cation among the specific hydrocarbon anionic surfactants described above.

The hydrocarbon surfactant of a carboxylic acid-type that may be used in the polymerization step and the adding step is preferably at least one selected from a group consisting of a surfactant having a carboxyl group (—COOH) or a group in which the hydrogen atom of the carboxyl group is replaced with an inorganic cation (for example, metal atoms, ammonium, etc.) among the surfactant (1), the anionic surfactant represented by $R^{6Z}(\text{-L-M})_2$ described above, the anionic surfactant represented by $R^{7Z}(\text{-L-M})_3$ described above, the compound ($\alpha$), the surfactant (1-0A), and those obtained by radically treating or oxidizing these surfactants. The carboxylic acid-type hydrocarbon surfactant may be used alone or in a mixture of two or more.

The compound ($\alpha$) includes not only the anionic hydrocarbon surfactant represented by the formula: $R^{10}$—COOM (wherein $R^{10}$ and M are the same as above) (preferably, the compound represented by the formula (A)), but also those having a carboxyl group (—COOH) or a group in which the hydrogen atom of the carboxyl group is substituted with an inorganic cation (for example, metal atoms, ammonium, etc.) among the anionic surfactant represented by the formula: R-L-M (wherein R, L, and M are the same as above), the surfactant (c), and the surfactant (d).

The carboxylic acid-type hydrocarbon surfactant is preferably the compound ($\alpha$), and more preferably at least one selected from the group consisting of a compound represented by the formula (A), a compound in which $A^c$ is —COOX$^c$ in the formula (c), a compound in which $A^d$ is —COOX$^d$ in the formula (d), a compound in which A is —COOM in the formula (1), a compound in which A is —COOM in the formula (1-0A), and those obtained by radically treating or oxidizing these surfactants, and still more preferably at least one selected from the group consisting of a compound represented by the formula (A) and a compound obtained by radically treating or oxidizing the compound.

In particular, preferred is at least one selected from the group consisting of lauric acid, capric acid, myristic acid, pentadecylic acid, palmitic acid, salts thereof, and those obtained by radically treating or oxidizing these compounds, more preferred is at least one selected from the group consisting of lauric acid and salts thereof, and those obtained by radically treating or oxidizing these compounds, still more preferred is at least one selected from the group consisting of lauric acid salts and those obtained by radically treating or oxidizing these, and still more preferred is at least one selected from the group consisting of sodium laurate and those obtained by radically treating or oxidizing sodium laurate. Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

The carboxylic acid-type hydrocarbon surfactant is preferably at least one selected from the group consisting of the surfactant (1-0A) represented by the general formula (1-0A), the compound ($\alpha$), the surfactant (c) represented by the formula (c), and the surfactant (d) represented by the formula (d).

Further, a hydrocarbon anionic surfactant obtained by radically treating or oxidizing the carboxylic acid-type hydrocarbon surfactant can also be used as the hydrocarbon anionic surfactant. The carboxylic acid-type hydrocarbon surfactant is preferably the compound ($\alpha$).

The radical treatment may be any treatment that generates radicals in the carboxylic acid-type hydrocarbon surfactant, for example, a treatment in which deionized water and the carboxylic acid type hydrocarbon surfactant are added to the reactor, the reactor is sealed, the system is purged with nitrogen, the reactor is heated and pressurized, a polymerization initiator is charged, the reactor is stirred for a certain time, and then the pressure is released until the pressure in the reactor decreases to the atmospheric pressure, and the reactor is cooled. The oxidation treatment is a treatment in which an oxidizing agent is added to the carboxylic acid-type hydrocarbon surfactant. Examples of the oxidizing agent include oxygen, ozone, hydrogen peroxide solution, manganese(IV) oxide, potassium permanganate, potassium dichromate, nitric acid, and sulfur dioxide.

The method for producing PTFE of the present disclosure may further include a step of adjusting the pH of the aqueous medium containing the hydrocarbon anionic surfactant to basic. Regarding the basicity, the pH is preferably 7.1 or higher, more preferably 7.5 or higher, still more preferably 8.0 or higher, particularly preferably 8.5 or higher, and still further preferably 9.0 or higher. By adjusting the pH to basic, the surfactant abilities can be increased. The step of adjusting the pH may be performed before or after the step of performing the radical treatment or the oxidation treatment on the carboxylic acid-type hydrocarbon surfactant, but is preferably performed thereafter. Examples of the method of adjusting the pH include, but are not limited to, a method of adding a pH adjuster to the aqueous medium. Examples of the pH adjuster include ammonia, NaOH aqueous solution, potassium hydroxide aqueous solution, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate. The pH can be measured by a pH meter manufactured by orion.

The polymerization step is also preferably a step in which the polymerization is performed in an aqueous medium having a pH of 4.0 or more in the presence of a hydrocarbon anionic surfactant and a polymerization initiator. The polymerization step is preferably performed in an aqueous medium having a pH of 4.0 or higher. Conventionally, the pH of the aqueous medium used in the polymerization was less than 4.0 because an acidic polymerization initiator was used in the polymerization step for producing polytetrafluoroethylene. As a result of diligent studies by the present disclosers, surprisingly, it has been found that by setting the pH of the aqueous medium used for polymerization to 4.0 or more, the stability of polymerization is improved and polytetrafluoroethylene having a high molecular weight can be produced.

The pH may be 4.0 or more, preferably more than 4.0, more preferably 4.5 or more, still more preferably 5.0 or more, further preferably 5.5 or more, still further preferably more than 6.0 or more, particularly preferably 6.5 or more, particularly preferably 7.0 or more, particularly preferably 7.5 or more, and particularly preferably 8.0 or more. The upper limit value of the pH is not limited, but may be, for example, 13.0 or less. From the viewpoint of corrosion of the polymerization tank, it is preferably 12.0 or less, more preferably 11.5 or less, and still more preferably 11.0 or less.

The pH can be measured with a pH meter.

The method of adjusting the pH of the aqueous medium to 4.0 or more is not limited, but the pH can be made 4.0 or more by using, for example, an alkaline aqueous solution, an alkaline aqueous dispersion, or a pH adjuster, but the method is not limited. Further, even in a case where a polymerization initiator that shows acidity when dissolved in an aqueous medium is used, the pH can be adjusted to 4.0 or more by further adding an alkaline compound such as sodium hydroxide. The alkali compound may be any compound which dissolves in water and ionizes to produce OH⁻, and examples thereof include, but not limited to, a hydroxide of an alkali metal such as sodium hydroxide or potassium hydroxide; a hydroxide of alkaline earth metals; ammonia; and amines. The polymerization step may include a step of adding an alkaline compound to an aqueous medium.

The pH of the aqueous medium may be 4.0 or more during the entire period of the polymerization step. Further, the pH may be 4.0 or more in the middle of the polymerization step, or the pH may be 4.0 or more in the final stage of the polymerization step. Further, the pH may be 4.0 or more in the middle and the final stage of the polymerization step.

For example, in the polymerization step, the pH of the aqueous medium is preferably 4.0 or more when the polymer solid concentration is 3% by mass or more. In other words, the polymerization step is a step of polymerizing a fluoromonomer in an aqueous medium in the presence of a hydrocarbon anionic surfactant to obtain a fluoropolymer, and in the polymerization step, the pH is preferably 4.0 or more when the polymer solid concentration is 3% by mass or more. The aqueous medium preferably has a pH of 4.0 or more when the polymer solid concentration is more p 5% by mass or more, still more preferably has a pH of 4.0 or more when the polymer solid concentration is 8% by mass or more, further preferably has a pH of 4.0 or more when the polymer solid concentration is 10% by mass or more, still further preferably has a pH of 4.0 or more when the polymer solid concentration is 15% by mass or more, particularly preferably has a pH of 4.0 or more when the polymer solid concentration is 18% by mass or more, more preferably has a pH of 4.0 or more when the polymer solid concentration is 20% by mass or more, and still more preferably has a pH of 4.0 or more when the polymer solid concentration is 25% by mass or more.

Further, in the polymerization step, the pH of the aqueous medium is preferably maintained at 4.0 or more from the time when the polymer solid concentration becomes 25% by mass to the completion of polymerization, more preferably maintained at 4.0 or more from the time when the polymer solid concentration becomes 20% by mass to the completion of polymerization, still more preferably maintained at 4.0 or more from the time when the polymer solid concentration becomes 18% by mass to the completion of polymerization, further preferably maintained at 4.0 or more from the time when the polymer solid concentration becomes 15% by mass to the completion of polymerization, still further preferably maintained at 4.0 or more from the time when the polymer solid concentration becomes 10% by mass to the completion of polymerization, particularly preferably maintained at 4.0 or more from the time when the polymer solid concentration becomes 8% by mass to the completion of polymerization, more preferably maintained at 4.0 or more from the time when the polymer solid concentration becomes 5% by mass to the completion of polymerization, and still more preferably maintained at 4.0 or more from the time when the polymer solid concentration becomes 3% by mass to the completion of polymerization.

In the polymerization step, the pH of the aqueous medium is also preferably 4.0 or more when the polymer solid concentration is less than 15% by mass. In the polymerization step, the pH of the aqueous medium is more preferably 4.0 or more when the polymer solid concentration is 3% by mass or more and less than 15% by mass, the pH of the aqueous medium is more preferably 4.0 or more when the polymer solid concentration is 5% by mass or more and less than 15% by mass, the pH of the aqueous medium is still more preferably 4.0 or more when the polymer solid concentration is 8% by mass or more and less than 15% by mass, and the pH of the aqueous medium is further preferably 4.0 or more when the polymer solid concentration is 10% by mass or more and less than 15% by mass.

In the polymerization step, the pH of the aqueous medium is preferably maintained at 4.0 or more while the polymer solid concentration is 10% by mass or more and up to 15% by mass, the pH of the aqueous medium is preferably maintained at 4.0 or more while the polymer solid concentration is at 8% by mass or more and up to 15% by mass, and the pH of the aqueous medium is further preferably maintained at 4.0 or more while polymer solid concentration is 5% by mass or more and up to 15% by mass.

The pH of the aqueous medium is preferably more than 4.0 in any case, more preferably 4.5 or more, still more preferably 5.0 or more, further preferably 5.5 or more, still further preferably 6.0 or more, particularly preferably 6.5 or more, more preferably 7.0 or more, still more preferably 7.5 or more, and further preferably 8.0 or more.

In the polymerization step, from the time of the initiation of the polymerization to the time when the polymer solid concentration is 3% by mass (preferably 5% by mass, more preferably 8% by mass, still more preferably 10% by mass, further preferably 15% by mass, still further preferably 18% by mass, yet still further preferably 20% by mass, particularly preferably 25% by mass), the pH of the aqueous medium is preferably 4.0 or more during a period of 60% or more (preferably 70% or more, more preferably 80% or more, still more preferably 90% or more, further preferably 95% or more, still further preferably 99% or more, particularly preferably 100%).

In the polymerization step, during a period of 60% or more (preferably 70% or more, more preferably 80% or more, still more preferably 90% or more, further preferably 95% or more, still further preferably 99% or more, particularly preferably 100%) from the time when the polymer solid concentration is 10% by mass (preferably 8% by mass, more preferably 5% by mass, still more preferably 3% by mass, further preferably polymerization initiation) to the time when the polymer solid concentration is 15% by mass, the pH of the aqueous medium is preferably 4.0 or more.

In the polymerization step, during a period of 60% or more (preferably 70% or more, more preferably 80% or more, still more preferably 90% or more, further preferably 95% or more, still further preferably 99% or more, particularly preferably 100%) from the time when the polymer solid concentration is 15% by mass to the time when the polymer solid concentration is 18% by mass (preferably 20% by mass, more preferably 25% by mass), the pH of the aqueous medium is preferably 4.0 or more.

In the polymerization step, during a period of 60% or more (preferably 70% or more, more preferably 80% or more, still more preferably 90% or more, further preferably 95% or more, more preferably 99% or more, particularly preferably 100%) from the time when the polymer solid concentration is 25% by mass (preferably 20 mass % by mass, more preferably 18% by mass, still more preferably 15% by mass, further preferably 10% by mass, still further preferably 8% by mass, particularly preferably 5% by mass, more preferably 3% by mass, and still more preferably polymerization initiation) to the time when the polymerization is completed, the pH of the aqueous medium is preferably 4.0 or more.

The pH of the aqueous medium is preferably more than 4.0 in any case, more preferably 4.5 or more, still more preferably 5.0 or more, further preferably 5.5 or more, still further preferably 6.0 or more, particularly preferably 6.5 or more, more preferably 7.0 or more, still more preferably 7.5 or more, and further preferably 8.0 or more.

The polymerization step also preferably includes a polymerization step of polymerizing a fluoromonomer in an aqueous medium in the presence of a hydrocarbon anionic surfactant and a polymerization initiator to obtain a fluoropolymer, in which the hydrocarbon anionic surfactant contains a salt of the hydrocarbon anionic surfactant. In other words, at least a part of the hydrocarbon anionic surfactant in the polymerization step is in the form of a salt.

As a result of diligent studies by the present disclosers and others, surprisingly, it has been found that since the hydrocarbon anionic surfactant contains a salt of the hydrocarbon anionic surfactant, the stability of polymerization is improved and fluoropolymer having a high molecular weight can be produced.

It can be confirmed by measuring the conductivity that the hydrocarbon anionic surfactant contains a salt of the hydrocarbon anionic surfactant.

The hydrocarbon anionic surfactant preferably has a salt concentration of 50% by mass or more, more preferably 60% by mass or more, still more preferably 70% by mass or more, further preferably 80% by mass or more, still further preferably 90% by mass or more, and particularly preferably 95% by mass or more, based on the total mass of the hydrocarbon anionic surfactant.

The ratio of the salt can be measured by the solution concentration and the conductivity.

In the polymerization step, the hydrocarbon anionic surfactant is more preferably a carboxylic acid-type hydrocarbon surfactant.

In the salt of a hydrocarbon anionic surfactant, the cation that replaces the hydrogen atom of the acid (excluding hydrogen atom) are, for example, a metal atom, $NR^y_4$ (each $R^y$ may be the same or different and H or an organic group), imidazolium optionally having a substituent, pyridinium optionally having a substituent, or phosphonium optionally having a substituent. The $R^Y$ is preferably H or an alkyl group, more preferably H or an alkyl group having 1 to 10 carbon atoms, and still more preferably H or an alkyl group having 1 to 4 carbon atoms.

The cation in the salt of the hydrocarbon anionic surfactant is preferably a metal atom or $NR^y_4$, more preferably $NR^y_4$, and still more preferably $NH_4$.

Since the conductivity varies greatly depending on the temperature, the conductivity is measured using a thermostatic bath while keeping the sample liquid temperature at 25° C. and the cell temperature of the pH meter at the same temperature.

The polymerization step is preferably performed substantially in the absence of the hydrocarbon anionic surfactant in the form of an organic acid. By polymerizing substantially in the absence of the hydrocarbon anionic surfactant in the form of an organic acid, the stability of the polymerization is further improved and a high-molecular-weight fluoropolymer can be obtained.

Substantially in the absence of the hydrocarbon anionic surfactant in the form of an organic acid, the concentration of the organic acid is preferably 1.0% by mass or less, more preferably 0.5% by mass or less, still more preferably 0.1% by mass or less, still further preferably 0.05% by mass or less, and particularly preferably 0.01% by mass or less, based on the mass of the resulting aqueous dispersion.

As used herein, the term "organic acid" means an organic compound that exhibits acidity. Examples of the organic acid include a carboxylic acid having a —COOH group, and a sulfonic acid having a —$SO_3H$ group, and preferred is a carboxylic acid from the viewpoint that the pH of an aqueous solution containing the organic acid can be easily adjusted.

Further, "form of an organic acid" is a form in which H is not free from the acidic group contained in the organic acid (for example, —COOH group, —$SO_3H$ group).

The polymerization step preferably includes an addition step of adding a composition containing a hydrocarbon anionic surfactant after the initiation of the polymerization. By the addition step, the stability of polymerization is further improved, and a higher-molecular-weight PTFE can be obtained.

The hydrocarbon anionic surfactant may be, for example, in the form of a solid (for example, powder of a hydrocarbon anionic surfactant) or in the form of a liquid.

The composition may be any one containing a hydrocarbon anionic surfactant, may be composed of only a hydrocarbon anionic surfactant, or may be a solution or dispersion of a hydrocarbon anionic surfactant containing a hydrocarbon anionic surfactant and a liquid medium. Therefore, the addition step can also be said to be a step of adding a hydrocarbon surfactant alone or a composition containing the hydrocarbon anionic surfactant after the initiation of polymerization.

The hydrocarbon anionic surfactant is not limited to one type, and may be a mixture of two or more types.

The liquid medium may be either an aqueous medium or an organic solvent, or may be a combination of an aqueous medium and an organic solvent.

Specific examples of the composition include an aqueous solution in which a hydrocarbon anionic surfactant is dissolved in an aqueous medium and an aqueous dispersion in which a hydrocarbon anionic surfactant is dispersed in an aqueous medium.

The hydrocarbon anionic surfactant added in the addition step is preferably 0.0001 to 10% by mass based on the aqueous medium. It is more preferably 0.001% by mass or more, still more preferably 0.01% by mass or more, and particularly preferably 0.05% by mass or more based on the aqueous medium. Further, it is more preferably 5% by mass or less, still more preferably 3% by mass or less, and particularly preferably 1% by mass or less based on the aqueous medium.

Since the stability of polymerization is improved and a higher-molecular-weight PTFE can be obtained, the composition is preferably an aqueous solution containing a hydrocarbon anionic surfactant and having a pH of 5.0 or more.

The pH of the aqueous solution is more preferably 6.0 or more, still more preferably 6.5 or more, further preferably 7.0 or more, still further preferably 7.5 or more, and particularly preferably 8.0 or more. The upper limit of pH is not limited, but may be 12.0 or less, or may be 11.0 or less.

The hydrocarbon anionic surfactant in the addition step is more preferably a carboxylic acid-type hydrocarbon surfactant.

The hydrocarbon anionic surfactant and the carboxylic acid-type hydrocarbon anionic surfactant are not limited, but for example, the hydrocarbon anionic surfactants and the carboxylic acid-type hydrocarbon surfactants exemplified as the hydrocarbon anionic surfactants can be preferably used.

The method for producing PTFE of the present disclosure can be efficiently performed by using at least one of the hydrocarbon anionic surfactants. The PTFE of the present disclosure may be produced by simultaneously using two or more of the hydrocarbon anionic surfactants, or may be produced by simultaneously using a surfactant other than the hydrocarbon anionic surfactants, as long as the compound has volatility or may remain in a molded body or the like made of PTFE.

In the production method of the present disclosure, compounds having a surfactant function other than the hydrocarbon anionic surfactants and nonionic surfactants may be used. For example, a cationic surfactant, a nonionic siloxane surfactant, or the like may be used.

Cationic hydrocarbon surfactants usually have a positively charged hydrophilic moiety such as alkylated ammonium halide such as alkylated ammonium bromide and a hydrophobic moiety such as long chain fatty acids.

The hydrophilic moiety of the nonionic siloxane hydrocarbon surfactant may also contain a combination of ionic and nonionic moieties. Such moieties include, for example, ionically end-functionalized or randomly functionalized polyether or polyol. Preferred for carrying out the present disclosure is a siloxane having a nonionic moiety, i.e., a nonionic siloxane surfactant.

Also, in the production method of the present disclosure, in addition to the hydrocarbon anionic surfactant and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the PTFE aqueous emulsion after polymerization of TFE, and does not serve as a contaminating component.

The polymerization in the production method may be performed by charging a polymerization reactor with an aqueous medium, the nucleating agent, the hydrocarbon anionic surfactant, a monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the surfactant may additionally be added depending on the purpose. The hydrocarbon anionic surfactant may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target PTFE, and the reaction rate.

The concentration of the polymerization initiator is appropriately determined depending on the types of the monomers, the molecular weight of the target PTFE, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di($\omega$-hydro-dodecafluoroheptanoyl)peroxide, di($\omega$-hydro-tetradecafluoroheptanoyl)peroxide, di($\omega$-hydro-hexadecafluorononanoyl)peroxide, di(perfluorobutyryl)peroxide, di(perfluorovaleryl)peroxide, di(perfluoro hexanoyl)peroxide, di(perfluoroheptanoyl)peroxide, di(perfluorooctanoyl)peroxide, di(perfluorononanoyl)peroxide, di($\omega$-chloro-hexafluorobutyryl)peroxide, di($\omega$-chloro-decafluorohexanoyl)peroxide, di($\omega$-chloro-tetradecafluorooctanoyl)peroxide, $\omega$-hydro-dodecafluoroheptanoyl-$\omega$-hydro-hexadecafluorononanoyl-peroxide, $\omega$-chloro-hexafluorobutyryl-$\omega$-chloro-decafluorohexanoyl-peroxide, $\omega$-hydro-dodecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl) peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. A reducing agent such as a sulfite or a sulfurous acid salt may be contained together, and the amount thereof may be 0.1 to 20 times the amount of the peroxide.

In the production method of the present disclosure, the polymerization initiator is preferably a redox initiator. The use of a redox initiator allows for increasing the molecular weight of the obtained PTFE.

For example, in a case where the polymerization is performed at a low temperature of 30° C. or lower, the polymerization initiator used is preferably a redox initiator obtained by combining an oxidizing agent and a reducing agent.

Examples of the oxidizing agent include persulfates such as ammonium persulfate and potassium persulfate; organic peroxides such as disuccinic acid peroxide and diglutaric acid peroxide; permanganic acid, permanganates such as ammonium permanganate, alkali metal salts of permanganate (potassium permanganate or the like), and alkali earth metal salts of permanganate; manganese triacetate ($C_6H_9MnO_6$); cerium (IV) salts such as cerium ammonium nitrate and cerium ammonium sulfate; and bromic acid or salts thereof such as bromic acid, ammonium bromate, alkali metal salts of bromate, and alkaline earth metal salts of bromate.

Examples of the reducing agent include dicarboxylic acids such as oxalic acid, malonic acid, succinic acid, and glutaric acid or salts thereof; bromic acid or salts thereof; and diimines. The dicarboxylic acid or a salt thereof is preferably oxalic acid or a salt thereof. The bromic acid or a salt thereof is preferably potassium bromate.

In order to increase the decomposition rate of the initiator, the combination of the redox initiator may preferably contain a copper salt or an iron salt. An example of the copper salt is copper(II) sulfate and an example of the iron salt is iron(II) sulfate.

In the redox initiator, the oxidizing agent is preferably a permanganic acid or a salt thereof, persulfate, manganese triacetate, a cerium (IV) salt, or bromic acid or a salt thereof, and the reducing agent is preferably a dicarboxylic acid or a salt thereof or diimine.

The oxidizing agent is more preferably a permanganic acid or a salt thereof, persulfate, or bromic acid or a salt thereof, and the reducing agent is more preferably a dicarboxylic acid or a salt thereof.

Examples of the redox initiator include potassium permanganate/oxalic acid, ammonium persulfate/bisulfite/iron sulfate (II), ammonium persulfate/sulfite/iron sulfate (II), ammonium persulfate/sulfite, ammonium persulfate/iron sulfate (II), manganese triacetate/oxalic acid, ammonium cerium nitrate/oxalic acid, bromate/sulfite, and bromate/bisulfite, and potassium permanganate/oxalic acid or ammonium persulfate/sulfite/iron sulfate (II) is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

Examples of the redox initiator include potassium permanganate/oxalic acid, potassium permanganate/ammonium oxalate, manganese triacetate/oxalic acid, manganese triacetate/ammonium oxalate, ammonium cerium nitrate/oxalic acid, ammonium cerium nitrate/ammonium oxalate, and bromate, and potassium permanganate/oxalic acid or potassium permanganate/ammonium oxalate is preferred.

In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

When the term "potassium permanganate/ammonium oxalate" is used in the redox initiator of the present specification, it means a combination of potassium permanganate and ammonium oxalate. The same applies to other compounds.

The redox initiator used is preferably an oxidizing agent or a reducing agent capable of adjusting the pH of the redox initiator aqueous solution to 4.0 or more. The redox initiator aqueous solution means a 0.50% by mass aqueous solution of an oxidizing agent or a 0.50% by mass aqueous solution of a reducing agent.

That is, at least one of the 0.50% by mass aqueous solution of the oxidizing agent and the 0.50% by mass aqueous solution of the reducing agent may have a pH of 4.0 or more, and it is preferable that both the 0.50% by mass aqueous solution of the oxidizing agent and the 0.50% by mass aqueous solution of the reducing agent have a pH of 4.0 or more.

The pH of the redox initiator aqueous solution (0.50% by mass aqueous solution of oxidizing agent or 0.50% by mass aqueous solution of reducing agent) is more preferably 5.0 or more, and still more preferably 5.5 or more, and particularly preferably 6.0 or more.

The redox initiator is particularly preferably a combination of an oxidizing agent which is a salt and a reducing agent which is a salt.

For example, the oxidizing agent which is a salt is more preferably at least one selected from the group consisting of a persulfate, a permanganate, a cerium (IV) salt and a bromate, still more preferably the permanganate, and particularly preferably potassium permanganate.

Further, the reducing agent which is a salt more preferably at least one selected from the group consisting of oxalate, malonic acid, succinate, glutarate, and bromate, and still more preferably oxalate, and particularly preferably ammonium oxalate.

Specifically, the redox initiator is preferably at least one selected from the group consisting of potassium permanganate/ammonium oxalate, potassium bromate/ammonium sulfite, manganese triacetate/ammonium oxalate, and ammonium cerium nitrate/ammonium oxalate, more preferably at least one selected from the group consisting of potassium permanganate/ammonium oxalate, potassium bromate/ammonium sulfite, and ammonium cerium nitrate/ammonium oxalate.

By using the redox initiator in the polymerization step, the SSG of the obtained PTFE can be reduced and the PTFE is made stretchable.

Further, by using the redox initiator in the polymerization step, the number of PTFE particles generated in the aqueous dispersion can be increased. The yield of PTFE can also be increased.

When a redox initiator is used, the oxidizing agent and the reducing agent may be added all at once at the initial stage of polymerization, or the reducing agent may be added all at once at the initial stage of polymerization and the oxidizing agent may be added continuously, or the oxidizing agent may be added all at once at the initial stage of polymerization and the reducing agent may be added continuously, or both the oxidizing agent and the reducing agent may be added continuously.

When a redox initiator is used as the polymerization initiator, the amount of the oxidizing agent added to the aqueous medium is preferably 5 to 10,000 ppm, more preferably 10 to 1,000 ppm, and the amount of the reducing agent added is preferably 5 to 10,000 ppm, more preferably from 10 to 1,000 ppm.

When a redox initiator is used in the polymerization step, the polymerization temperature is preferably 100° C. or lower, more preferably 95° C. or lower, and still more preferably 90° C. or lower. The polymerization temperature is preferably 10° C. or higher, more preferably 20° C. or higher, and still more preferably 30° C. or higher.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

A radical polymerization initiator can also be used as the polymerization initiator. The radical polymerization initiator is preferably a peroxide. Examples of the radical polymerization initiator include the oil-soluble radical polymerization initiator and the water-soluble radical polymerization initiator described above, and the water-soluble radical polymerization initiator is preferred. The water-soluble radical polymerization initiator is more preferably a peroxide, and still more preferably a persulfate, an organic peroxide, or a mixture thereof. Examples of the persulfate include ammonium persulfate and potassium persulfate. Examples of the organic peroxide include disuccinic acid peroxide and diglutaric acid peroxide. Still more preferred are ammonium persulfate and disuccinic acid peroxide. In the polymerization step, for example, 5 ppm or more of ammonium persulfate is preferably added to the aqueous medium, more preferably 10 ppm or more, still more preferably 20 ppm or more, further preferably 30 ppm or more, still further preferably 40 ppm or more, yet still further preferably 50 ppm or more, particularly preferably 80 ppm or more, and very particularly preferably 100 ppm or more. In the polymerization step, the radical polymerization initiator may be added continuously or intermittently after the polymerization is initiated.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the polymerization step, the tetrafluoroethylene is preferably polymerized substantially in the absence of a fluorine-containing surfactant.

Conventionally, fluorine-containing surfactants have been used for the polymerization of polytetrafluoroethylene, but the production method of the present disclosure allows for obtaining polytetrafluoroethylene without using the fluorine-containing surfactants.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a fluorine-containing surfactant having an anionic moiety having a molecular weight of 1000 or less, more preferably 800 or less, and still more preferably 600 or less.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, Tosoh Corp.) as a column and acetonitrile/0.6% by mass HClO4 aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}-Rf^{n0}-Y^0) \quad (N^0)$$

wherein $X^{n0}$ is H, Cl, or F; $Rf^{n0}$ is a linear, branched, or cyclic alkylene group having 3 to 20 carbon atoms in which some or all of Hs are replaced by F; the alkylene group optionally containing one or more ether bonds in which some of Hs are replaced by Cl; and $Y^0$ is an anionic group.

The anionic group $Y^0$ may be $-COOM$, $-SO_2M$, or $-SO_3M$, and may be $-COOM$ or $-SO_3M$.

M is H, a metal atom, $NR^{8y}_4$, imidazolium optionally having a substituent, pyridinium optionally having a substituent, or phosphonium optionally having a substituent, wherein $R^{8y}$ is H or an organic group.

Examples of the metal atom include alkali metals (Group 1) and alkaline earth metals (Group 2), such as Na, K, or Li.

The alkyl group is preferable as the organic group in $R^{8y}$.

$R^{8y}$ may be H or a $C_{1-10}$ organic group, may be H or a $C_{1-4}$ organic group, and may be H or a $C_{1-4}$ alkyl group.

M may be H, a metal atom, or $NR^{8y}_4$, may be H, an alkali metal (Group 1), an alkaline earth metal (Group 2), or $NR^{8y}_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}-(CF_2)_{m1}-Y^0 \quad (N^1)$$

wherein $X^{n0}$ is H, Cl, and F; m1 is an integer of 3 to 15; and $Y^0$ is as defined above;

a compound represented by the following general formula ($N^2$):

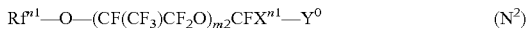

$$Rf^{n1}-O-(CF(CF_3)CF_2O)_{m2}CFX^{n1}-Y^0 \quad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}-(Rf^{n3})_q-Y^0 \quad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}-O-(CY^{n1}Y^{n2})_pCF_2-Y^0 \quad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

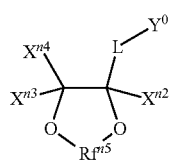

($N^5$)

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1-O-(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4-O-CY^1Y^2CF_2-COOM \quad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω-H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7-O-Rf^8-O-CF_2-COOM \quad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9-O-CY^1Y^2CF_2-SO_3M \quad\quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^9$ are the same or different and are each H or F; and M is as defined above.

The compound (XII) is represented by the following general formula (XII):

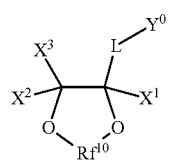

(XII)

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2$M, or —$SO_3$M, and may be —$SO_3$M or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

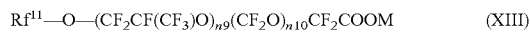

$$Rf^{11}-O-(CF_2CF(CF_3)O)_{n9}(CF_2O)_{n10}CF_2COOM \quad\quad (XIII)$$

wherein $Rf^{11}$ is a fluoroalkyl group having 1 to 5 carbon atoms containing chlorine, n9 is an integer of 0 to 3, n10 is an integer of 0 to 3, and M is the same as defined above. Examples of the compound (XIII) include $CF_2ClO(CF_2CF(CF_3)O)_{n9}(CF_2O)_{n10}CF_2COONH_4$ (mixture having an average molecular weight of 750, in the formula, n9 and n10 are defined above).

As described above, examples of the anionic fluorine-containing surfactant include a carboxylic acid-based surfactant and a sulfonic acid-based surfactant.

In the production method of the present disclosure, in particular, it is preferable that the nucleating agent is at least one selected from the group consisting of a fluoropolyether, a nonionic surfactant, and a chain transfer agent, the polymerization temperature is 10 to 150° C., and the production method includes a step of adding the nucleating agent to the aqueous medium before the initiation of polymerization or when the concentration of polytetrafluoroethylene formed in the aqueous medium is 5.0% by mass or less, preferably 3.0% by mass or less, more preferably 1.0% by mass or less, still more preferably 0.5% by mass or less, and particularly preferably at the same time as the initiation of the polymerization.

A PTFE aqueous dispersion can be obtained by the method for producing PTFE of the present disclosure. The solid concentration of the PTFE aqueous dispersion is not limited, but may be, for example, 1.0 to 70% by mass. The solid concentration is preferably 8.0% by mass or more, more preferably 10.0% by mass or more, and more preferably 60.0% by mass or less, more preferably 50.0% by mass or less.

In the production method of the present disclosure, the adhesion amount to the finally obtained PTFE is preferably 3.0% by mass or less, preferably 2.0% by mass or less, preferably 1.0% by mass or less, preferably 0.8% by mass or less, preferably 0.7% by mass or less, and preferably 0.6% by mass or less.

Examples of the applications of the PTFE aqueous dispersion include, but are not limited to, those in which the aqueous dispersion is directly used, such as coating achieved by applying the aqueous dispersion to a base material, drying the dispersion, and optionally firing the workpiece; impregnation achieved by impregnating a porous support such as nonwoven fabric or a resin molded article with the aqueous dispersion, drying the dispersion, and preferably firing the workpiece; and casting achieved by applying the aqueous dispersion to a base material such as glass, drying the dispersion, optionally immersing the workpiece into water to remove the base material and to thereby provide a thin film. Examples of such applications include aqueous dispersion-type coating materials, tent membranes, conveyor belts, printed circuit boards (CCL), binders for electrodes, and water repellents for electrodes.

The PTFE aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppressing treatment application for preventing floating of sand and dust.

The PTFE aqueous dispersion is also preferably used as a dust control treatment agent. The dust control treatment agent can be used in a method for suppressing dust of a dust-generating substance by fibrillating PTFE by mixing the mixture with the dust-generating substance and applying a compression-shearing action to the mixture at a temperature of 20 to 200° C., for example, methods disclosed in Japanese Patent No. 2827152 and Japanese Patent No. 2538783.

The PTFE aqueous dispersion can be suitably used for, for example, the dust control treatment agent composition described in International Publication No. WO2007/004250, and can be suitably used for the dust control treatment method described in International Publication No. WO2007/000812.

The dust control treatment agent is suitably used in the fields of building-products, soil stabilizers, solidifying materials, fertilizers, landfill of incineration ash and harmful substance, explosion proof equipment, cosmetics, and sands for pet excretion represented by cat sand.

The method for producing PTFE of the present disclosure suitably further includes at least one step among a step of recovering the PTFE aqueous dispersion obtained by the method described above, a step of agglomerating the PTFE in the PTFE aqueous dispersion, a step of recovering the agglomerated PTFE, and a step of drying the recovered PTFE at 100 to 250° C. By including such a step, PTFE powder can be obtained.

A powder can be produced by agglomerating PTFE contained in the aqueous dispersion. The aqueous dispersion of PTFE can be used as a powder for various purposes after being agglomerated, washed, and dried. Agglomeration of the aqueous dispersion of the PTFE is usually performed by diluting the aqueous dispersion obtained by polymerization of polymer latex, for example, with water to a polymer concentration of 10 to 20% by mass, optionally adjusting the pH to a neutral or alkaline, and stirring the polymer more vigorously than during the reaction in a vessel equipped with a stirrer. The agglomeration may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The agglomeration may be continuously performed using a device such as an inline mixer.

The PTFE aqueous dispersion obtained by the production method of the present disclosure has an average primary particle size of PTFE fine particles of preferably 50 to 340 nm, more preferably 100 to 340 nm, still more preferably 130 to 340 nm, further preferably 180 to 340 nm, still further preferably 190 to 340 nm, yet still further preferably 200 to 340 nm, yet still further preferably 210 to 340 nm, yet still further preferably 220 to 340 nm, yet still further preferably 220 to 320 nm, and yet still further preferably 240 to 320 nm.

When the average primary particle size of the PTFE fine particles is small, the stability of the PTFE aqueous dispersion is improved. However, when the PTFE aqueous dispersion is excessively stabilized, time and labor are required to concentrate the PTFE aqueous dispersion or to agglomerate the PTFE fine particles by applying stirring shearing force to the PTFE aqueous dispersion to obtain the PTFE fine powder, and thus the production efficiency is often impaired. Further, there are problem in that when the average primary particle size of the PTFE fine particles is large, the stability of the PTFE aqueous dispersion decreases and the amount of the agglomerate during the polymerization of TFE increases, which is disadvantageous in terms of productivity; when the PTFE aqueous dispersion is concentrated after the polymerization of TFE, a large amount of the agglomerate is generated in the concentration tank; the sedimentation stability of the concentration liquid is impaired and the storage stability is lowered; when the PTFE aqueous dispersion is agitated by applying an stirring shearing force to the PTFE aqueous dispersion to agglomerate the PTFE fine particles to obtain the PTFE fine powder, a large amount of the agglomerate is generated before reaching the aggregation tank from the polymerization tank and the piping is clogged; and the yield is greatly reduced. When the average primary particle size of the PTFE fine particles is within the above range, the stability of the PTFE aqueous dispersion is excellent to such an extent that the subsequent processability, moldability and the like are not deteriorated, and molded article excellent in heat resistance and the like are easily obtained.

In the PTFE aqueous dispersion obtained by the production method of the present disclosure, the coagulation completion time measured by the method described in Examples to be described later is preferably improved by 20% or more and is within 900 seconds, more preferably within 800 seconds, and more preferably within 700 seconds, compared with the value of the PTFE aqueous emulsion obtained by polymerization under exactly the same conditions except that no modifying monomer is added.

When the improvement of the coagulation completion time is less than 20%, the effect of stabilizing the aqueous dispersion of PTFE is insufficient. Further, when the coagulation completion time exceeds 700 seconds, the coagulation hydrophobization time until the PTFE fine powder is obtained becomes longer, which is disadvantageous in terms of productivity.

The aqueous dispersion may be any of an aqueous dispersion obtained by the polymerization, a dispersion obtained by concentrating this aqueous dispersion or subjecting the aqueous dispersion to dispersion stabilization treatment, and an aqueous dispersion obtained by dispersing powder of the polytetrafluoroethylene into an aqueous medium in the presence of the surfactant.

The aqueous dispersion may also be produced as a purified aqueous dispersion by a method including a step (I) of bringing the aqueous dispersion obtained by the polymerization into contact with an anion exchange resin or a mixed bed containing an anion exchange resin and a cation exchange resin in the presence of a nonionic surfactant (I), and/or a step (II) of concentrating the aqueous dispersion obtained by this step such that the solid concentration is 30 to 70% by mass based on 100% by mass of the aqueous dispersion (II).

The nonionic surfactant may be, but is not limited to, any of those to be described later. The anion exchange resin to be used may be, but is not limited to, a known one. The contact with the anion exchange resin may be performed by a known method.

A method for producing the aqueous dispersion may include subjecting the aqueous dispersion obtained by the polymerization to the step (I), and subjecting the aqueous dispersion obtained in the step (I) to the step (II) to produce a purified aqueous dispersion. The step (II) may also be performed without carrying out the step (I) to produce a purified aqueous dispersion. Further, the step (I) and the step (II) may be repeated or combined.

Examples of the anion exchange resin include known ones such as a strongly basic anion exchange resin containing as a functional group a —$N^+X^-(CH_3)_3$ group (wherein X is Cl or OH) or a strongly basic anion exchange resin containing a —$N^+X^-(CH_3)_3(C_2H_4OH)$ group (wherein X is as described above). Specific examples thereof include those described in International Publication No. WO99/62858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a —$SO_3^-$ group and a weakly acidic cation exchange resin containing as a functional group a —$COO^-$ group. Of these, from the viewpoint of achieving good removal efficiency, a strongly acidic cation exchange resin is preferred, a $H^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be performed by a known method. Specific examples include those described in International Publication No. WO2007/046482 and International Publication No. WO2014/084399. Examples thereof include phase separation, centrifugal sedimentation, cloud point concentration, electric concentration, electrophoresis, filtration treatment using ultrafiltration, filtration treatment using a reverse osmosis membrane (RO membrane), and nanofiltration treatment. The above concentration can concentrate the polytetrafluoroethylene concentration to 30 to 70% by mass depending on the application. The concentration may impair the stability of the dispersion. In such a case, a dispersion stabilizer may be further added.

The dispersion stabilizer added may be the aforementioned nonionic surfactant or various other surfactants.

The nonionic surfactant is the same as the nonionic surfactant exemplified as the nucleating agent described above, and can be appropriately selected from the nonionic surfactants described above. The nonionic surfactant is preferably free from an aromatic moiety.

Also, the cloud point of the nonionic surfactant is a measure of its solubility in water. The surfactant used in the aqueous dispersion of the present disclosure has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The surfactant may be removed by the concentration operation.

The aqueous dispersion obtained by the polymerization may also be subjected to a dispersion stabilization treatment without concentration depending on the application, to prepare an aqueous dispersion having a long pot life. Examples of the dispersion stabilizer used include the same as those described above.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., hydrocarbon anionic surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, and salts thereof.

Preferred examples of the alkyl sulfates and salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anionic surfactant and other compounding agents, but is preferably 10 ppm to 5,000 ppm based on the mass of the solid content of the polytetrafluoroethylene.

The lower limit of the amount of the anionic surfactant added is more preferably 50 ppm or more, still more preferably 100 ppm or more. Too small amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The aqueous dispersion may optionally contain other water soluble polymer compounds to an extent that does not impair the characteristics of the aqueous dispersion.

Examples of the other water soluble polymer compound include, but are not limited to, polyethylene oxide (dispersion stabilizer), polyethylene glycol (dispersion stabilizer), polyvinylpyrrolidone (dispersion stabilizer), phenol resin, urea resin, epoxy resin, melamine resin, polyester resin, polyether resin, silicone acrylic resin, silicone resin, silicone polyester resin, and polyurethane resin. The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

In the present disclosure, the PTFE aqueous dispersion used for coagulation stirring (hereinafter, also referred to as the PTFE dispersion for coagulation) preferably has a PTFE solid concentration of 10 to 25% by mass. The PTFE solid concentration is preferably 10 to 22% by mass, more preferably 10 to 20% by mass. In order to increase the bulk density of the PTFE fine powder, the concentration of the PTFE solid concentration in the PTFE aqueous dispersion for coagulation is preferably high. When the PTFE solid concentration in the PTFE aqueous dispersion for coagulation is high, the degree of association of the primary particles of PTFE increases, and the primary particles of PTFE are densely associated and agglomerated to form granules. When the PTFE solid concentration of the PTFE aqueous dispersion for coagulation is less than 10% by mass, the agglomeration density of the primary particles of PTFE tends to become sparse, and it is difficult to obtain the PTFE fine powder having a high bulk density. On the other hand, if the PTFE solid concentration in the PTFE aqueous dispersion for coagulation is too high, the concentration of unagglomerated PTFE increases and the unagglomerated PTFE solid concentration in the coagulated discharge water increases. When the unagglomerated PTFE solid concentration in the coagulated discharge water is high, the piping clogging and discharge water treatment are costly and time-consuming. In addition, the yield of PTFE fine powder decreases. The unagglomerated PTFE solid concentration in the coagulated discharge water is preferably low from the viewpoint of productivity of the PTFE fine powder, more preferably less than 0.4% by mass, still more preferably less than 0.3% by mass, and particularly preferably less than 0.2% by mass. When the PTFE solid concentration of the PTFE aqueous dispersion for coagulation exceeds 25% by mass, it is difficult to reduce the unagglomerated PTFE solid concentration of the coagulated discharge water to less than 0.4% by mass. Since the PTFE solid concentration in the PTFE aqueous dispersion obtained in the step 1 is about 10 to 45% by mass when the concentration of the solid PTFE is high, a diluent such as water is added to adjust the concentration to 10 to 25% by mass. Further, when the PTFE solid concentration in the PTFE aqueous dispersion after polymerization is 10 to 25% by mass, the PTFE aqueous dispersion can be used as it is as the PTFE aqueous dispersion for coagulation.

Pigment-containing or filler-containing PTFE powder in which pigments and fillers are uniformly mixed can be obtained by adding pigments for coloring and various fillers for improving mechanical properties before or during the aggregation.

The wet powder obtained by agglomerating the PTFE in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the PTFE in the form of fine powder. This is because the particles made of such PTFE are easily formed into fibrils even with a small shearing force and lose its original, stable particulate structure. The drying is performed at a drying temperature of 10 to 300° C. (preferably 10 to 250° C.), preferably 100 to 300° C. (preferably 100 to 250° C.)

The PTFE powder preferably has an average particle size (average secondary particle size) of 100 to 2,000 µm. The lower limit of the average secondary particle size is more preferably 200 µm or more, and still more preferably 300 µm or more. The upper limit of the average secondary particle size is preferably 1,000 µm or less, more preferably 800 µm or less, and particularly preferably 700 µm or less. The average particle size is a value measured in conformity with JIS K 6891.

The PTFE powder is preferable for molding, and suitable applications include hydraulic systems such as aircraft and automobiles, fuel system tubes and the like, flexible hoses such as chemicals and steam, and electric wire coating applications. The PTFE powder can also be used as a binder for batteries and as a dustproof material. It is also possible to produce a stretched body from the PTFE powder.

The stretched body can be produced by paste-extruding and rolling PTFE that can be obtained in the production method of the present disclosure, in particular, in which the polymerization step is a step of polymerizing in an aqueous medium having a pH of 4.0 or more in the presence of a hydrocarbon surfactant and a polymerization initiator, followed by non-firing or semi-firing and stretching it in at least one direction (preferably roll-stretched in the rolling direction and then stretched in the transverse direction by a tenter). As the drawing conditions, a speed of 5 to 1,000%/sec and a drawing magnification of 500% or more are preferably employed. Stretching allows easy formation of fibrils of PTFE, resulting in a stretched body including nodes and fibers.

The following provides examples of specific applications.

—Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

—Sealant Field

Examples of the applications in this field include gaskets, packings, pump diaphragms, pump tubes, and sealants for aircraft.

—Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

—Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

—Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial discharge water).

—Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

—Textile Field

Examples of the applications in this field include PTFE fibers (fiber materials), machine threads (textiles), weaving yarns (textiles), and ropes.

—Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

EXAMPLES the present disclosure is described with reference to examples, but the present disclosure is not intended to be limited by these examples.

In Examples, physical properties were measured by the following method.

(1) Standard Specific Gravity (SSG)

Using a sample molded in conformity with ASTM D 4895-89, the SSG was determined by the water replacement method in conformity with ASTM D 792.

(2) Thermal Instability Index (TII)

Measured in conformity with ASTM D 4895-89.

(3) Polymer Solid Concentration

In an air dryer, 1 g of PTFE aqueous dispersion was dried at a condition of 150° C. for 60 minutes, and the ratio of the mass of the non-volatile matter to the mass of the aqueous dispersion (1 g) was expressed by percentage and taken as the solid concentration thereof.

(4) Average Primary Particle Size

The average primary particle size is determined by preparing a PTFE aqueous dispersion adjusted to a solid concentration of about 1.0% by mass, and using ELSZ-1000S (manufactured by Otsuka Electronics Co., Ltd.) at 25° C. with 70 measurement processes. The refractive index of the solvent (water) was 1.3328, and the viscosity of the solvent (water) was 0.8878 mPa·s. The values measured by the method (4) are shown as the average primary particle sizes in Table 1.

(4') Average Primary Particle Size

The PTFE aqueous dispersion was diluted with water to a solid concentration of 0.15% by mass. The transmittance of incident light at 550 nm relative to the unit length of the resulting diluted latex was determined and the number-based length average particle size was determined by measuring the Feret diameter with a transmission electron microscope image. Based on these values, a calibration curve is drawn. Using this calibration curve, the average primary particle size is determined from the measured transmittance of the projected light at 550 nm of each sample.

(5) Aspect Ratio

The aspect ratio was determined by observing the PTFE aqueous dispersion diluted to have a solid concentration of about 1% by mass with a scanning electron microscope (SEM), performing image processing on 400 or more particles selected at random, and averaging the ratios of the major axis to the minor axis.

(6) Number of PTFE Particles

The number of PTFE particles can be calculated from the polymer solid concentration, assuming that PTFE particles are spherical particles having the average primary particle size measured by the method (4) as a diameter and the specific gravity of the spherical particle is 2.28. When the primary particle size is Anm and the polymer solid concentration is B % by mass, the number of particles X of PTFE can be calculated by the following formula.

$$X=((B/100)/(1-B/100))/(4/3\times3.14\times((A/2)\times10^{-7})^{\wedge}3\times2.28)$$

(7) Extrusion Pressure

To 100 g of PTFE powder obtained from the PTFE aqueous dispersion, 21.7 g of a lubricant (trade name: Isopar H (R), manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min). The value obtained by measuring the load when the extrusion load became balanced in the paste extrusion and dividing the measured load by the cross-sectional area of the cylinder used in the paste extrusion was taken as the extrusion pressure.

(8) Adhesion Amount

After completion of the reaction, the resulting PTFE aqueous dispersion was taken out from the inside of a reactor made of SUS with an internal volume of 6 L and equipped with a stirrer, and then the wet PTFE agglomerate adhering to the reactor and the agitator were removed, the paraffin wax was separated, and the remaining adhered agglomerates were dried at 150° C. for 18 hours to measure the mass of the adhered dried matter. Further, the resulting PTFE aqueous dispersion was coagulated, the coagulated product was dried, and the mass of the dried coagulated powder was measured. The ratio of the mass of the adhered dried matter to the coagulated powder was calculated and used as the adhesion amount (% by mass).

(9) Coagulation Completion Time

For the resulting PTFE aqueous dispersion, a cylindrical container made of SUS 304 having an inner diameter of 17 cm was used in which 2 baffles having a thickness of 2.0 mm, a width of 2.0 cm, and a length of 15 cm were placed 8.0 cm from the bottom and symmetrically welded.

The solid concentration of the PTFE aqueous dispersion was adjusted to 15%, a total amount of 2700 g was charged, and the temperature was adjusted to 25±1° C. Then, an anchor blade having a thickness of 2.0 mm, an outer diameter of 9.0 cm, an inner diameter of 5.0 cm, and a height of 5.0 cm attached to a shaft having an inner diameter of 8.0 mm was placed 50 mm above the bottom, 16 g of 10% nitric acid was added, and stirring was immediately started under the condition of 500 rpm, and the time (R) until the PTFE aqueous dispersion was broken and hydrophobized PTFE was produced was measured and taken as the coagulation completion time. The coagulation completion time is a boundary between a coagulating zone in which the stirring torque is rapidly decreased and a coagulating completion zone in which the stirring torque is stable, and is a time showing a torque 5% higher than the stable stirring torque at the completion of the coagulation.

The FIGURE is a diagram schematically showing a change over time in the stirring torque of PTFE aqueous dispersion before and after coagulation. The coagulation completion time is the time indicated by R in the FIGURE. and taken as the coagulation completion time. The coagulation completion time is a boundary between a coagulating zone in which the stirring torque is rapidly decreased and a coagulating completion zone in which the stirring torque is stable, and is a time showing a torque 5% higher than the stable stirring torque at the completion of the coagulation.

FIG. 1 is a diagram schematically showing a change over time in the stirring torque of PTFE aqueous dispersion before and after coagulation. The coagulation completion time is the time indicated by R in FIG. 1.

Synthesis Example 1

A mixture of 10-undecene-1-ol (16 g), 1,4-benzoquinone (10.2 g), DMF (160 mL), water (16 mL), and $PdCl_2$ (0.34 g) was heated and stirred at 90° C. for 12 hours.

The solvent was then distilled off under reduced pressure. The resulting residue was purified by liquid separation and column chromatography to obtain 11-hydroxyundecane-2-one (15.4 g).

The spectral data of the resulting 11-hydroxyundecane-2-one is shown below.

$^1$H-NMR (CDCl$_3$) δ ppm: 1.29-1.49 (m, 14H), 2.08 (s, 3H), 2.45 (J=7.6, t, 2H), 3.51 (J=6.5, t, 2H)

A mixture of 11-hydroxyundecane-2-one (13 g), sulfur trioxide triethylamine complex (13.9 g) and tetrahydrofuran (140 mL) was stirred at 50° C. for 12 hours. A solution of sodium methoxide (3.8 g)/methanol (12 mL) was added dropwise to the reaction solution.

The precipitated solid was filtered under reduced pressure and washed with ethyl acetate to obtain sodium 10-oxoundecyl sulfate (15.5 g) (hereinafter referred to as surfactant A). The spectral data of the resulting sodium 10-oxoundecyl sulfate is shown below.

$^1$H-NMR (CDCl$_3$) δ ppm: 1.08 (J=6.8, m, 10H), 1.32 (m, 2H), 1.45 (m, 2H), 1.98 (s, 3H), 2.33 (J=7.6, t, 2H), 3.83 (J=6.5, t, 2H)

Synthesis Example 2

To a glass reactor with an internal volume of 1 L and equipped with a stirrer, 588.6 g of deionized water and 70.0 g of the surfactant A were added. The reactor was sealed, and the system was purged with nitrogen, so that oxygen was removed. The reactor was heated up to 90° C. and pressurized to 0.4 MPa with nitrogen. Then, 41.4 g of ammonium persulfate (APS) was charged thereinto and stirred for 3 hours. The stirring was stopped, the pressure was released until the reactor was adjusted to the atmospheric pressure, and the reactor was cooled to obtain an aqueous surfactant solution B.

Example 1

To a reactor made of SUS with an internal volume of 6 L and equipped with a stirrer, 3,600 g of deionized degassed water, 180 g of paraffin wax, and 0.540 g of surfactant A were added. The reactor was sealed and the system was purged with nitrogen, so that oxygen was removed. Furthermore, the system was purged with TFE, the pressure of the reactor was set to 0.1 MPa, the reactor was heated up to 90° C., and TFE was filled into the reactor such that the reactor was adjusted to 2.70 MPa. At the same time as 0.36 mg of polyethylene glycol-polypropylene glycol-polyethylene glycol block copolymer (average molecular weight 1,670) was charged into the reactor, 0.031 g of ammonium persulfate (APS) and 1.488 g of disuccinic acid peroxide (DSP) serving as polymerization initiators were charged thereinto. TFE was charged so as to keep the reaction pressure constant at 2.70 MPa. At the same time as TFE was started to be charged, an aqueous surfactant solution B was continuously started to be charged. When 940 g of TFE was charged, the stirring was stopped and the pressure was released until the reactor was adjusted to the atmospheric pressure. By the end of the reaction, 103 g of the aqueous surfactant solution B was charged. The content was collected from the reactor and cooled so that the paraffin wax was separated, whereby a PTFE aqueous dispersion was obtained.

The solid concentration of the resulting PTFE aqueous dispersion was 20.7% by mass, and the average primary particle size was 260 nm. The average primary particle size measured by the method (4') was the same as the value measured by the method (4). The values measured by the method (4) are shown as the average primary particle sizes in Table 1.

The resulting PTFE aqueous dispersion was diluted with deionized water to have a solid concentration of 10% by mass and coagulated under a high-speed stirring condition. The coagulated wet powder was dried at 150° C. for 18 hours. Various physical properties of the resulting PTFE powder were measured. The results are shown in Tables 1 and 2.

TABLE 1

| | Solid concentration % by mass | Primary particle size nm | Number of particles $10^{13}$ particles/ml | Adhesion amount % by mass | Coagulation completion time sec |
|---|---|---|---|---|---|
| Example 1 | 20.7 | 260 | 1.2 | 1.4 | 403 |

TABLE 2

| | Amount of uncoagulated polymer % by mass | Aspect ratio | SSG — | TII — | Extrusion pressure MPa |
|---|---|---|---|---|---|
| Example 1 | 0.27 | 1.43 | 2.184 | 49 | 17.3 |

REFERENCE SIGNS LIST 1, 2: Curves showing a change over time in torque
A: Pre-coagulation zone
B: Coagulating zone
C: Post-coagulation zone
P: Turning point
P1: Viscosity peak
P2: Hydrophobization start point
R: Coagulation completion time

The invention claimed is:

1. A method for producing polytetrafluoroethylene comprising:
   polymerization of tetrafluoroethylene in an aqueous medium in the presence of a nucleating agent and a hydrocarbon anionic surfactant to obtain polytetrafluoroethylene particles,
   wherein a total amount of the nucleating agent and the hydrocarbon anionic surfactant at the initiation of polymerization is 60 ppm or more based on the aqueous medium, and
   wherein the nucleating agent is at least one selected from the group consisting of a fluoropolyether and a nonionic surfactant.

2. The production method according to claim 1, further comprising:
   adding the nucleating agent to the aqueous medium before the initiation of polymerization or when the concentration of polytetrafluoroethylene formed in the aqueous medium is 5.0% by mass or less.

3. The production method according to claim 2,
   wherein an amount of the nucleating agent added before the initiation of polymerization or when the concentration of polytetrafluoroethylene formed in the aqueous medium is 5.0% by mass or less is 0.001% by mass or more based on polytetrafluoroethylene to be obtained by the polymerization.

4. The production method according to claim 1, wherein in the polymerization, a number of polytetrafluoroethylene particles is 0.6×$10^{13}$ particles/mL or more.

5. The production method according to claim 1, wherein the polymerization includes continuously adding the hydrocarbon anionic surfactant.

6. The production method according to claim 5, wherein in the continuously adding of the hydrocarbon anionic surfactant, the hydrocarbon anionic surfactant is started to be added to the aqueous medium when the concentration of polytetrafluoroethylene formed in the aqueous medium is less than 0.6% by mass.

7. The production method according to claim 1, wherein in the polymerization, the polymerization temperature is 10 to 150° C.

8. The production method according to claim 1, wherein the fluoropolyether has a repeating unit selected from the group consisting of formulas (1a) to (1d):

$$(-CFCF_3-CF_2-O-)_n \quad (1a)$$

$$(-CF_2-CF_2-CF_2-O-)_n \quad (1b)$$

$$(-CF_2-CF_2-O-)_n-(-CF_2-O-)_m \quad (1c)$$

$$(-CF_2-CFCF_3-O-)_n-(-CF_2-O-)_m \quad (1d)$$

wherein m and n are integers of 1 or more.

9. The production method according to claim 1, wherein the nonionic surfactant is at least one selected from the group consisting of a compound represented by the following general formula (i):

$$R^3-O-A^1-H \quad (i)$$

wherein $R^3$ is a linear or branched primary or secondary alkyl group having 8 to 18 carbon atoms, and $A^1$ is a polyoxyalkylene chain, and a compound represented by the following general formula (ii):

$$R^4-C_6H_4-O-A^2-H \quad (ii)$$

wherein $R^4$ is a linear or branched primary or secondary alkyl group having 4 to 12 carbon atoms, and $A^2$ is a polyoxyalkylene chain.

10. The production method according to claim 1, wherein the polytetrafluoroethylene particles have an average primary particle size of 500 nm or less.

11. The production method according to claim 1, wherein a mass ratio of the hydrocarbon anionic surfactant to the nucleating agent, hydrocarbon anionic surfactant: nucleating agent, at the initiation of polymerization is 10:1 to $100 \times 10^4$:1.

12. The production method according to claim 1, wherein the polytetrafluoroethylene particles have a standard specific gravity of 2.280 or less.

* * * * *